(12) United States Patent
Shavit et al.

(10) Patent No.: US 12,499,303 B2
(45) Date of Patent: Dec. 16, 2025

(54) USING NEURAL NETWORKS TO ENCODE LOG DATA

(71) Applicant: Mellanox Technologies, Ltd., Yokneam (IL)

(72) Inventors: Yoli Shavit, Kibbutz Naan (IL); Eitan Zahavi, Zichron Yaakov (IL); Gary Mataev, Haifa (IL); Hanan Shteingart, Herzliya (IL); Jean-Francois Puget, Saint Raphael (FR); Zachi Binshtock, Hod Hasharon (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/658,362

(22) Filed: May 8, 2024

(65) Prior Publication Data

US 2025/0335694 A1    Oct. 30, 2025

Related U.S. Application Data

(60) Provisional application No. 63/640,061, filed on Apr. 29, 2024.

(51) Int. Cl.
*G06F 40/126* (2020.01)
*H03M 7/30* (2006.01)

(52) U.S. Cl.
CPC ........ *G06F 40/126* (2020.01); *H03M 7/3082* (2013.01); *H03M 7/6011* (2013.01)

(58) Field of Classification Search
CPC .. G06F 40/126; H03M 7/3082; H03M 7/6011
See application file for complete search history.

(56) References Cited

U.S. PATENT DOCUMENTS

| | | | | |
|---|---|---|---|---|
| 2023/0412627 | A1* | 12/2023 | Szilágyi | G06F 11/0793 |
| 2024/0202325 | A1* | 6/2024 | Kim | G06N 3/096 |

OTHER PUBLICATIONS

Max Landauer et al., "Deep Learning for Anomaly Detection in Log Data: A Survey", pp. 1-21 (Year: 2023).*
McCaffrey, "Data Anomaly Detection Using a Neural Autoencoder with C#", Apr. 15, 2024, pp. 1-17 (Year: 2024).*
Siyang Lu et al., "Detecting Anomaly in Big Data System Logs Using Convolutional Neural Network", IEEE, pp. 151-158 (Year: 2018).*
Ansari et al., "Chronos: Learning the Language of Time Series," Mar. 12, 2024, 40 pages.
Chen et al., Automatic Root Cause Analysis via Large Language Models for Cloud Incidents, 2023, 15 pages.

(Continued)

*Primary Examiner* — Jared M Bibbee
(74) *Attorney, Agent, or Firm* — Davis Wright Tremaine LLP

(57) ABSTRACT

Methods, systems, and machine-readable mediums to perform a neural network to encode log data. In at least one embodiment, a processor comprising one or more circuits to encode at least one log message, at least in part, by encoding a first type of information in the at least one log message to obtain a first encoding, encoding a second type of information in the at least one log message to obtain a second encoding, and obtaining a resultant encoding at least in part by combing at least the first and second encodings.

20 Claims, 23 Drawing Sheets

(56) References Cited

OTHER PUBLICATIONS

Chen et al., "LogTransfer: Cross-System Log Anomaly Detection for Software Systems with Transfer Learning," International Symposium on Software Reliability Engineering, Oct. 2020, 11 pages.
Du et al., "DeepLog: Anomaly Detection and Diagnosis from System Logs through Deep Learning," ACM SIGSAC conference on Computer and Communications Security, 2017, 14 pages.
Gorishniy et al., "Revisiting Deep Learning Models for Tabular Data," 2023, 25 pages.
Guo et al., "LogBERT: Log Anomaly Detection via Bert," International Joint Conference on Neural Networks, 2021, 13 pages.
Huang et al., "HitAnomaly: Hierarchical Transformers for Anomaly Detection in System Log," IEEE Transactions on Network and Service Management, 17(4): 2020, 13 pages.
Le et al., "Log-based Anomaly Detection without Log Parsing," IEEE/ACM International Conference on Automated Software Engineering, 2021, 13 pages.
Meng et al., "A Semantic-aware Representation Framework or Online Log Analysis," International Conference on Computer Communications and Networks, 2020, 7 pages.
Meng et al., "LogAnomaly: Unsupervised Detection of Sequential and Quantitative Anomalies in Unstructured Logs," Proceedings of the Twenty-Eighth International Joint Conference on Artificial Intelligence, 19(7): Aug. 2019, 7 pages.
Qi et al., LogGPT: Exploring ChatGPT for Log-Based Anomaly Detection, 2023, 10 pages.
Rahaman et al., "On the Spectral Bias of Neural Networks," International Conference on Machine Learning, 2019, 10 pages.
Rahimi et al., "Random Features for Large-Scale Kernel Machines," Advances in Neural Information Processing Systems, 2007, 8 pages.
Reimers et al., "Sentence-BERT: Sentence Embeddings using Siamese BERT-Networks," 2019, 11 pages.
Vaarandi et al., "Logcluster—a Data Clustering and Pattern Mining Algorithm for Event Logs," International Conference on Network and Service Management, 2015, 7 pages.
Vaswani et al., "Attention is All You Need," Advances in Neural Information Processing Systems, 2017, 11 pages.
Wu et al., "Google's Neural Machine Translation System: Bridging the Gap between Human and Machine Translation," 2016, 23 pages.
Xia et al., "LogGAN: a Log-level Generative Adversarial Network for Anomaly Detection using Permutation Event Modeling," Information Systems Frontiers, 2020, 14 pages.
Yang et al., "Semi-supervised Log-based Anomaly Detection via Probabilistic Label Estimation," IEEE/ACM 43rd International Conference on Software Engineering, 2021, 13 pages.
Zhang et al., "CloudRCA: A Root Cause Analysis Framework for Cloud Computing Platforms," ACM International Conference on Information & Knowledge Management, 2021, 10 pages.
Zhang et al., "PreFix: Switch Failure Prediction in Datacenter Networks," Proceedings of the ACM on Measurement and Analysis of Computing Systems, 2(1): 2018, 29 pages.
Zhu et al., "Loghub: A Large Collection of System Log Datasets for AI-driven Log Analytics," 2023, 12 pages.

* cited by examiner

USING NEURAL NETWORKS TO ENCODE LOG DATA

CLAIM OF PRIORITY

This application claims the benefit of U.S. Provisional Application No. 63/640,061 titled "USING CONTRASTIVE LEARNING TO TRAIN NEURAL NETWORKS," filed Apr. 29, 2024, the entire contents of which is incorporated herein by reference.

This application incorporates by reference for all purposes the full disclosure of co-pending U.S. patent application Ser. No. 18/658,284, filed concurrently herewith, entitled "USING CONTRASTIVE LEARNING TO TRAIN NEURAL NETWORKS", U.S. patent application Ser. No. 18/658,324, filed concurrently herewith, entitled "USING SIMILARITY LOSS TO TRAIN NEURAL NETWORKS", and U.S. patent application Ser. No. 18/658,508, filed concurrently herewith, entitled "USING NEURAL NETWORKS TO CLASSIFY LOGS".

TECHNICAL FIELD

At least one embodiment pertains to a neural network to encode at least one log message. For example, at least one embodiment pertains to encoding at least one log message, at least in part, by encoding a first type of information in the at least one log message to obtain a first encoding, encoding a second type of information in the at least one log message to obtain a second encoding, and obtaining a resultant encoding at least in part by combing at least the first and second encodings. In at least one embodiment, a computing system (e.g., within a data center) implements various novel techniques described herein.

BACKGROUND

Logs of systems and/or services may include information related to those systems and/or services, such as descriptors of events over time and/or other useful information. Techniques of recording logs are not universally standardized across different systems, such as different domains having different terminologies. This may make it challenging to automate parsing and/or analyzing logs to extract and/or detect information contained in the logs that may be used for a variety of tasks. Automatically parsing and/or analyzing logs can use significant memory, time, or computing resources. An amount of memory, time, sensory inputs, or computing resources used automatically parse and/or analyze logs can be improved.

DETAILED DESCRIPTION

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

Figure 1:
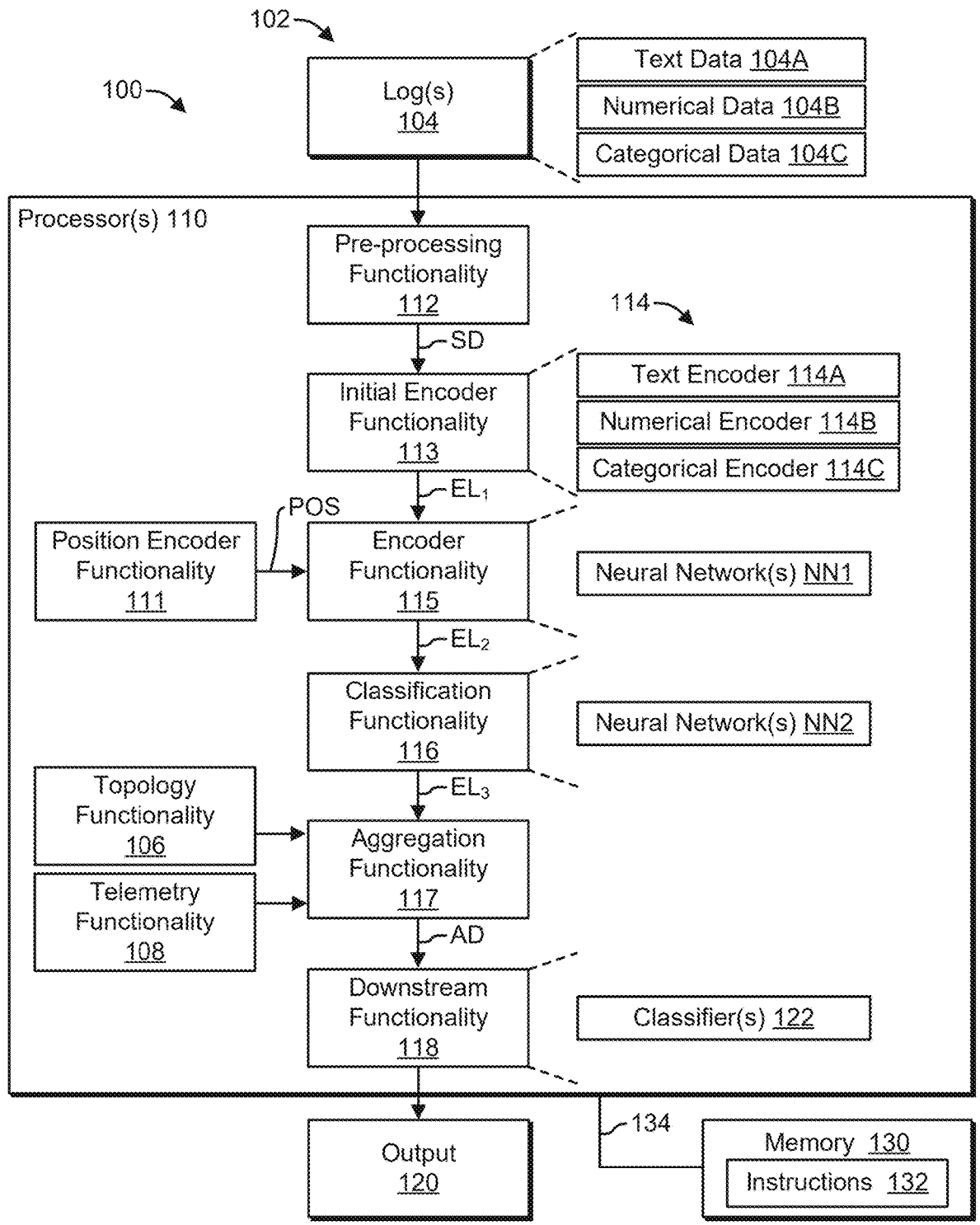
FIG. 1 is a block diagram illustrating a system to encode and/or classify log data, in accordance with at least one embodiment.

FIG. 1 is a block diagram illustrating a system 100 to encode, classify, and/or otherwise process log data, in accordance with at least one embodiment. System 100 may perform one or more neural networks (e.g., encoder(s) 114, neural network(s) NN1, neural network(s) NN2, and/or classifier(s) 122), such as to encode and/or classify log data. System 100 includes one or more processors 110 connected to memory 130 by one or more connections 134. In at least one embodiment, memory 130 (e.g., one or more non-transitory processor-readable medium) stores machine executable instructions 132 that when performed by processor(s) 110 implement topology functionality 106, telemetry functionality 108, preprocessing functionality 112, initial encoder functionality 113, encoder functionality 115, classification functionality 116, position encoder functionality 111, aggregation functionality 117, downstream functionality 118 and/or other functionality. Processor(s) 110 may receive or obtain input (e.g., one or more logs 104) and produce output 120 based at least in part on the input.

Logs of systems and/or services (e.g., within a data center) may include information related to those systems and/or services, such as descriptors of events, over time. For example, if an event occurs, a log message or entry may be entered into one or more logs. A log sequence may include more than one log entry (e.g., concatenated together). One or more log entries may be stored as text including one or more letters, numbers, and/or symbols, the combinations of which can indicate useful information (e.g., descriptions of an event, timestamps, numeric counter values, identifiers, etc.). Multiple combinations can be used to indicate different information in a single log. As an example, information contained in a log may be used for a variety of tasks, such as anomaly detection, incident prediction, root cause analysis, and observation generation. However, techniques of recording logs may not be universally standardized across different systems (e.g., different domain terminologies), making it challenging to automate parsing and/or analyzing logs to extract and/or detect information contained in the logs.

As mentioned above, log entries may be stored as text and can include multiple different types of information, such as one or more letters, one or more numbers, and/or one or more symbols. Further, at least a portion of a log may be categorized into one or more different categories. If a system excludes one or more types of available data when encoding logs, one or more downstream processes (e.g., anomaly detection, incident prediction, root cause analysis, and/or observation generation) may be negatively affected because the encodings may omit information that could be useful to the downstream process(es).

In the example illustrated in FIG. 1, log(s) 104 include text data 104A, numerical data 104B, and/or categorical data 104C. Preprocessing functionality 112 may remove information (e.g., punctuation, spaces, etc.) from the log(s) 104 that is not used to classify them and/or reformat (e.g., change letter case) of the log(s) 104. Preprocessing functionality 112 may associate a network device or node (e.g., a computing device, router, switch, etc.) with each log message included in the log(s) 104. For example, preprocessing functionality 112 may receive topology information from topology functionality 106 that includes a node identifier and may associate a node identifier with each log message. Preprocessing functionality 112 may divide each log line or entry into separate data SD (e.g., stored in a separate data structure) for individual processing by initial encoder functionality 113. For example, preprocessing functionality 112 may create a data structure (e.g., string) for each of text data 104A, numerical data 104B, and/or categorical data 104C, and provide the data structure(s) to initial encoder functionality 113. Preprocessing functionality 112 may use one or more neural networks to divide each log line or entry into data SD.

Initial encoder functionality 113 may encode data SD to create initial encodings $EL_1$ (e.g., one or more vectors) and the initial encodings $EL_1$ may be used as input to the encoder functionality 115, which further encodes the initial encodings $EL_1$ into encodings $EL_2$ for use by the classification functionality 116 (e.g., as input to one or more machine learning models, such as one or more neural networks NN2), which may use encodings $EL_2$ to perform one or more tasks (such as anomaly detection, incident prediction, root cause analysis, and/or observation generation). Initial encoder functionality 113 includes one or more encoders 114 (e.g., encoders 114A-114C) to encode data SD to obtain initial encodings $EL_1$. Encoders 114 may be implemented using one or more neural networks. For example, one or more of encoders 114A-114C may be implemented using one or more neural networks.

Initial encodings $EL_1$ of log(s) 104 produced by initial encoder functionality 113 may encode numeric data (e.g., numerical data 104B) included in the log(s) 104 and additional types of information (e.g., text data 104A, categorical data 104C, and/or other types of information). System 100 may use categorical data 104C, such as metadata, to encode the log(s) 104.

Figure 2:
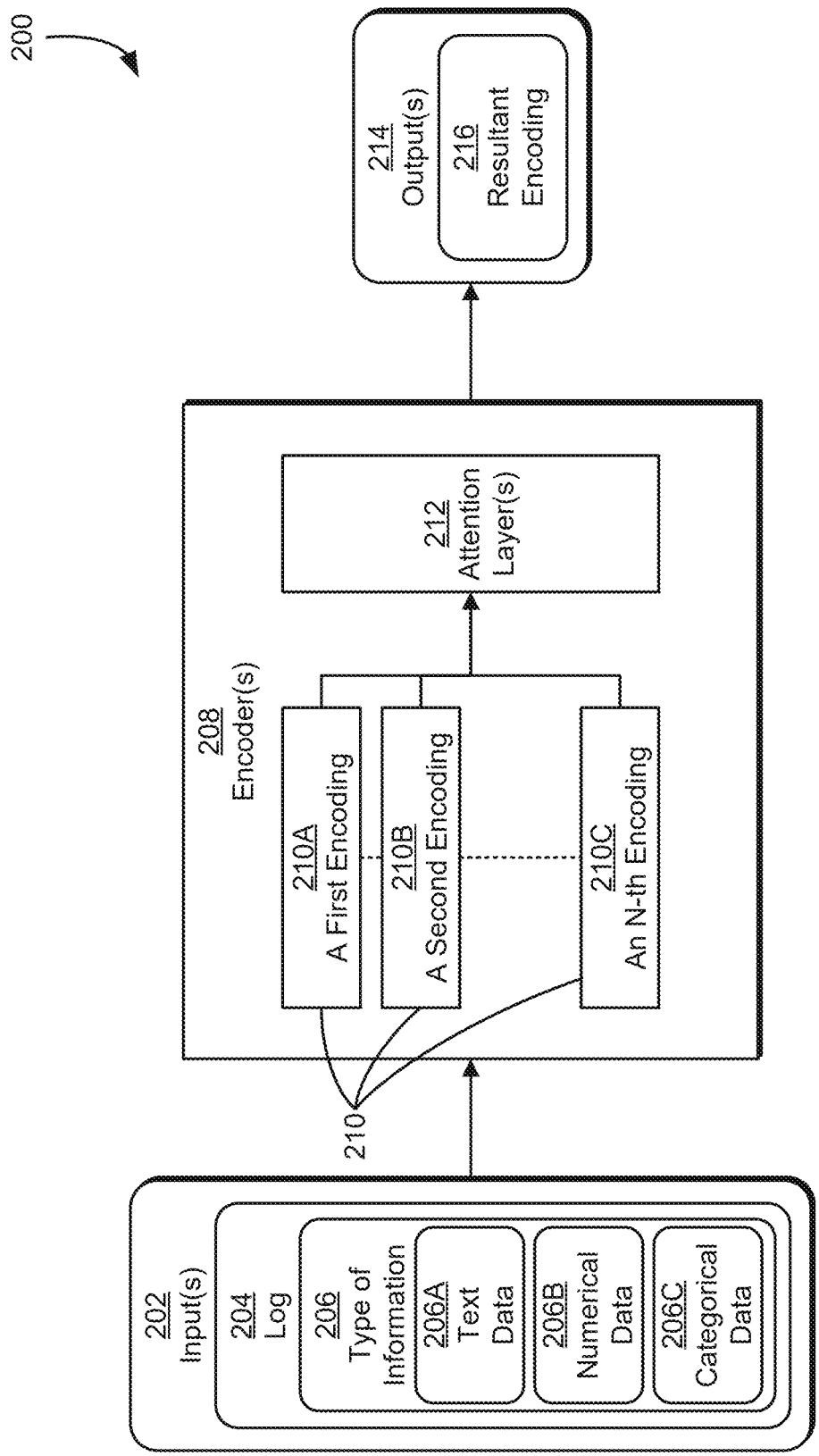
FIG. 2 is a block diagram illustrating a system to generate a resultant encoding to encode at least one log message.
Figure 3:
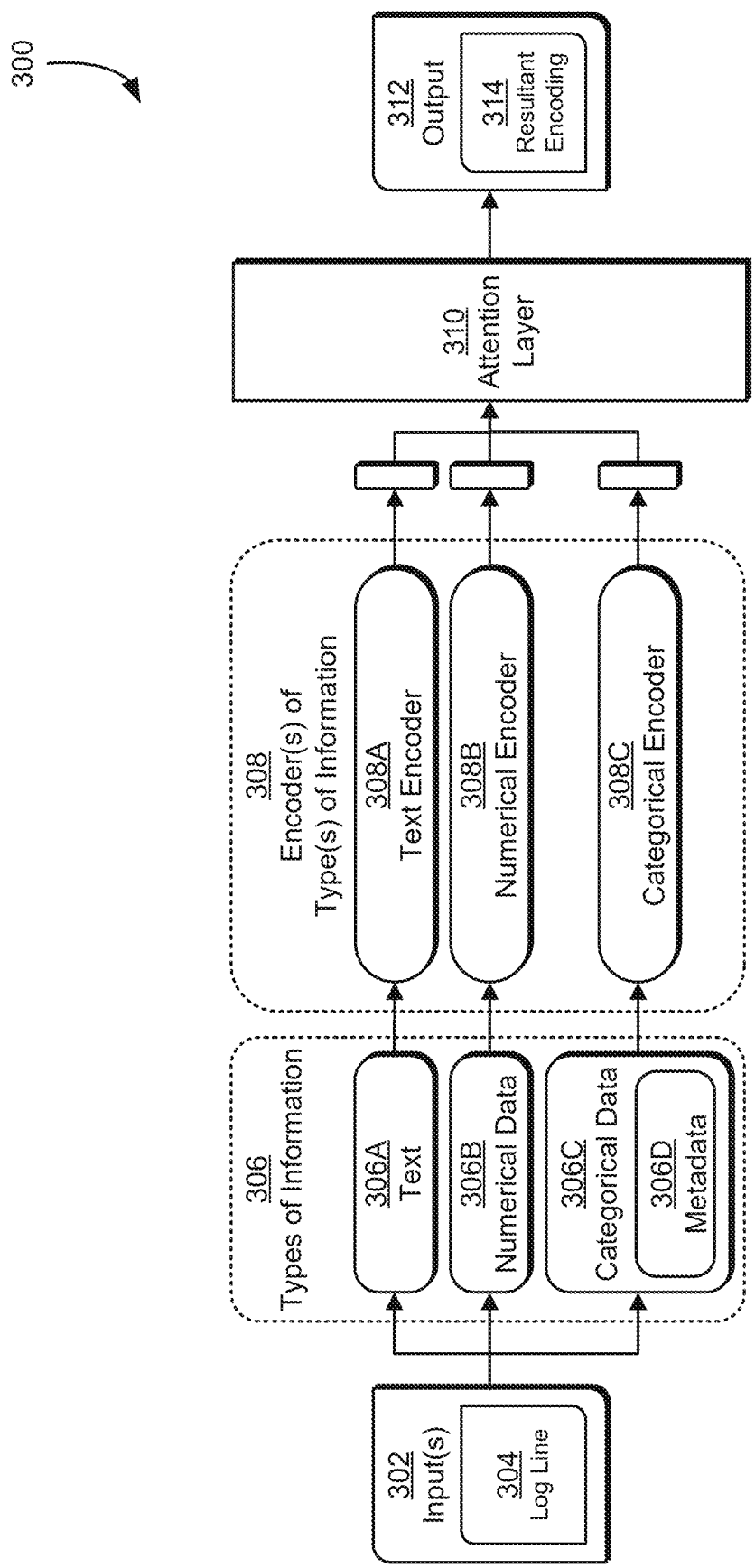
FIG. 3 is a block diagram illustrating a system to encode at least one log message based, at least in part, on one or more types of information, in accordance with at least one embodiment.
Figure 4:
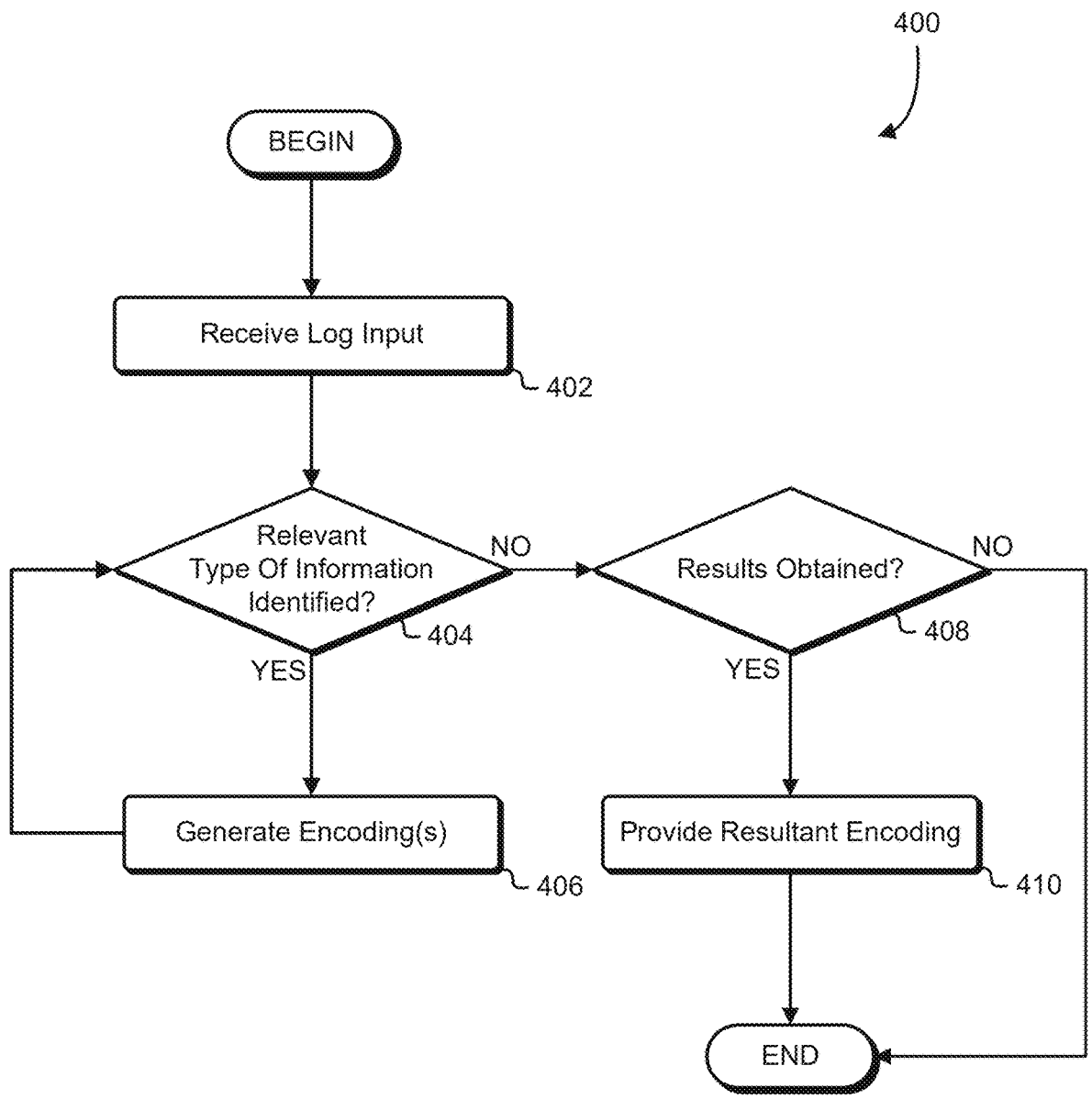
FIG. 4 is a process flow diagram illustrating providing a resultant encoding of a log, in accordance with at least one embodiment.

In at least one embodiment, system 100 includes, or otherwise is, one or more systems illustrated in FIGS. 2-4, such as to perform a process 400 (see FIG. 4). In at least one embodiment, initial encoder functionality 113 performs a process (e.g., process 400 illustrated in FIG. 4) of encoding text, numerical, and/or categorical data of each of one or more log entries using one or more encoders 114A-114C (e.g., in parallel, series, or a combination of both) and combines output of these encoder(s) 114A-114C to produce a unified representation or encoding (e.g., initial encodings $EL_1$) of the log entry. Text encoder 114A encodes any text data 104A information included in log(s) 104, numerical encoder 114B encodes information pertaining to any numerical data 104B in the log(s) 104, and categorical encoder 114C encodes any categorical information (e.g., categorical data 104C), which may include metadata. An example of metadata is an event's priority or message type.

Initial encodings $EL_1$ produced by initial encoder functionality 113 are provided to encoder functionality 115. Position encoder functionality 111 may provide position encodings POS for log(s) 104 to encoder functionality 115. Encoder functionality 115 encodes initial encodings $EL_1$ and position encodings POS to produce encodings $EL_2$ (e.g., one or more vectors). Encoder functionality 115 may use one or more neural networks NN1 (e.g., one or more transformer encoder) to produce encodings $EL_2$ based at least in part on initial encodings $EL_1$ and position encodings POS.

Classification functionality 116 receives or obtains encodings $EL_2$ and produces classifications or encodings $EL_3$ (e.g., classification of encodings $EL_2$ into one or more classes). Classification functionality 116 may use neural network(s)

NN2 (e.g., one or more large language models (LLMs)) to produce encodings $EL_3$ based at least in part on encodings $EL_2$.

Aggregation functionality 117 receives or obtains encodings $EL_3$ and combines information provided by topology functionality 106 and/or telemetry functionality 108 with encodings $EL_3$ (e.g., a classification indicating "IGNORE" or "ALERT") to create aggregated data AD. Aggregation functionality 117 may use one or more neural networks to produce aggregated data AD. Downstream functionality 118 receives or obtains aggregated data AD and produces output 120 based at least in part on the aggregated data AD. Downstream functionality 118 may use one or more neural networks to produce output 120.

While neural networks may be used to analyze logs, using supervised learning to do so may require labeled training data. Because a large range of information may be stored in logs, creating such training data can be time consuming and/or expensive. A self-supervision technique may assume the logs do not contain anomalies, which if anomalies do appear in the training data, performance of the model may be negatively impacted. Self-supervision techniques may require a fixed vocabulary and developers may add new messages to logs, which the model will be unable to encode. Further, both conventional supervised and self-supervision training techniques may be unable to encode an entire sequence in a way that can be shared across multiple tasks because such training techniques train the neural network to produce an encoding that is specific to one or more particular tasks and such encoding is not generalizable to other tasks. For example, encodings produced by a neural network trained to encode logs for anomaly detection may not be suitable for other tasks (e.g., incident prediction), because different tasks need different labels for training. Thus, a technique may either be trained separately for each type of task using different training datasets and/or trained using training datasets that include many labels for the different tasks. However, the former technique may result in the pre-trained neural network that is not useful for other types of tasks (e.g., as it was trained on a task specific dataset), and the latter technique requires a dataset with extensive labeling.

As mentioned above, encoder functionality 115 may use neural network(s) NN1 (e.g., one or more transformer encoder) to produce encodings $EL_2$ based at least in part on initial encodings $EL_1$ and position encodings POS. In at least one embodiment, system 100 includes, or otherwise is, one or more systems illustrated in FIGS. 5-9, such as to perform a process 900 (see FIG. 9). In at least one embodiment, system 100 performs a process (e.g., process 900, see FIG. 9) of pre-training neural network(s) NN1 to encode initial encodings $EL_1$ (which encode log(s) 104) without task-specific labels, and using (e.g., minimizing) triplet loss of vector encodings produced by neural network(s) NN1. System 100 may use process 900 to pre-trained neural network NN1 without using task-specific labels, such that after such pre-training neural network NN1 may easily be trained to encode initial encodings $EL_1$ (which encode logs) for different types of tasks (e.g., as input for other neural networks (e.g., neural network(s) NN2) and/or machine learning processes) with minimal labeling. System 100 performing process 900 may use a contrastive learning approach that minimizes triplet loss to pre-train neural network(s) NN1 to encode initial encodings $EL_1$ (encoding log(s) 104) based, at least in part, on a dataset that omits or lacks task-specific labels.

Figure 14:
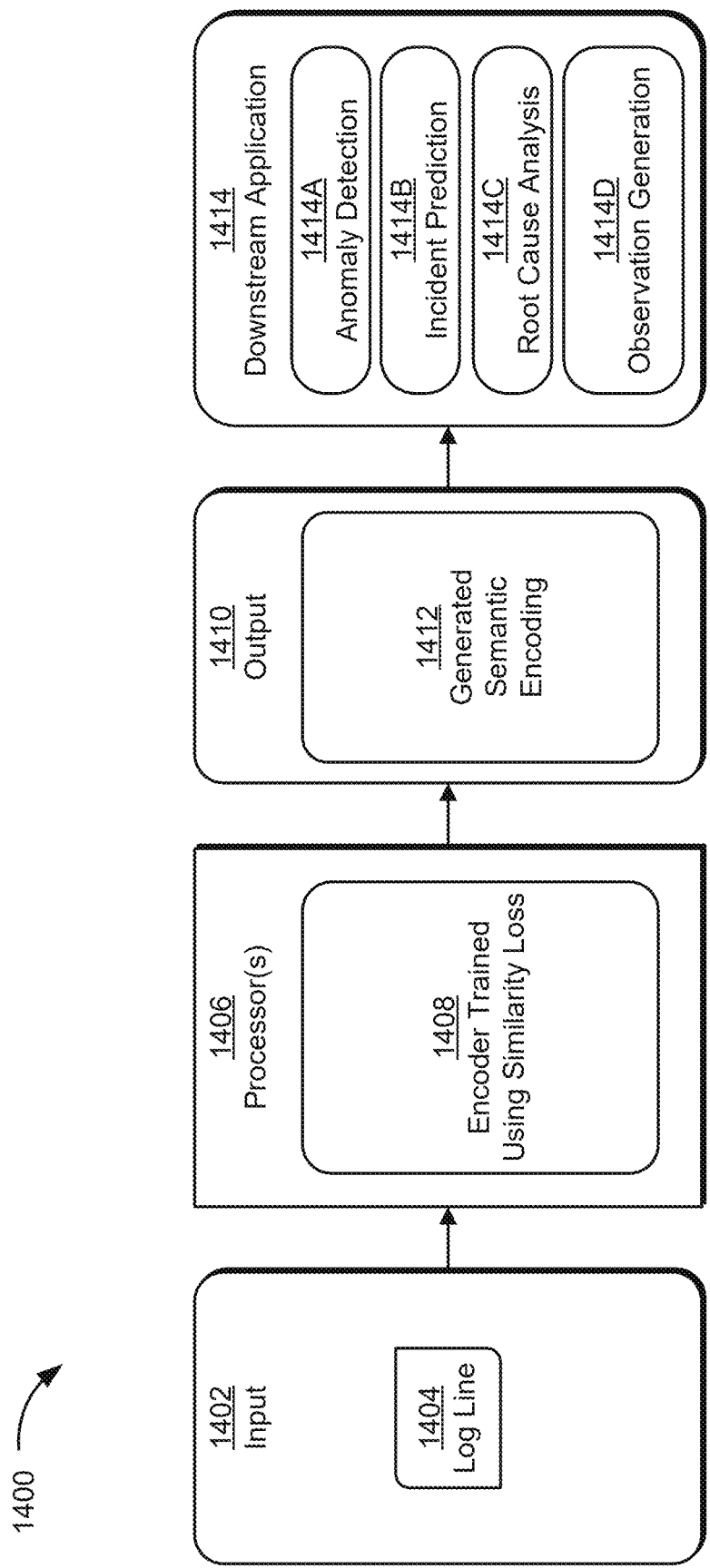
FIG. 14 is a block diagram illustrating a system including an encoder to generate an encoding of one or more logs based, at least in part, on similarity loss, in accordance with at least one embodiment.
Figure 15:
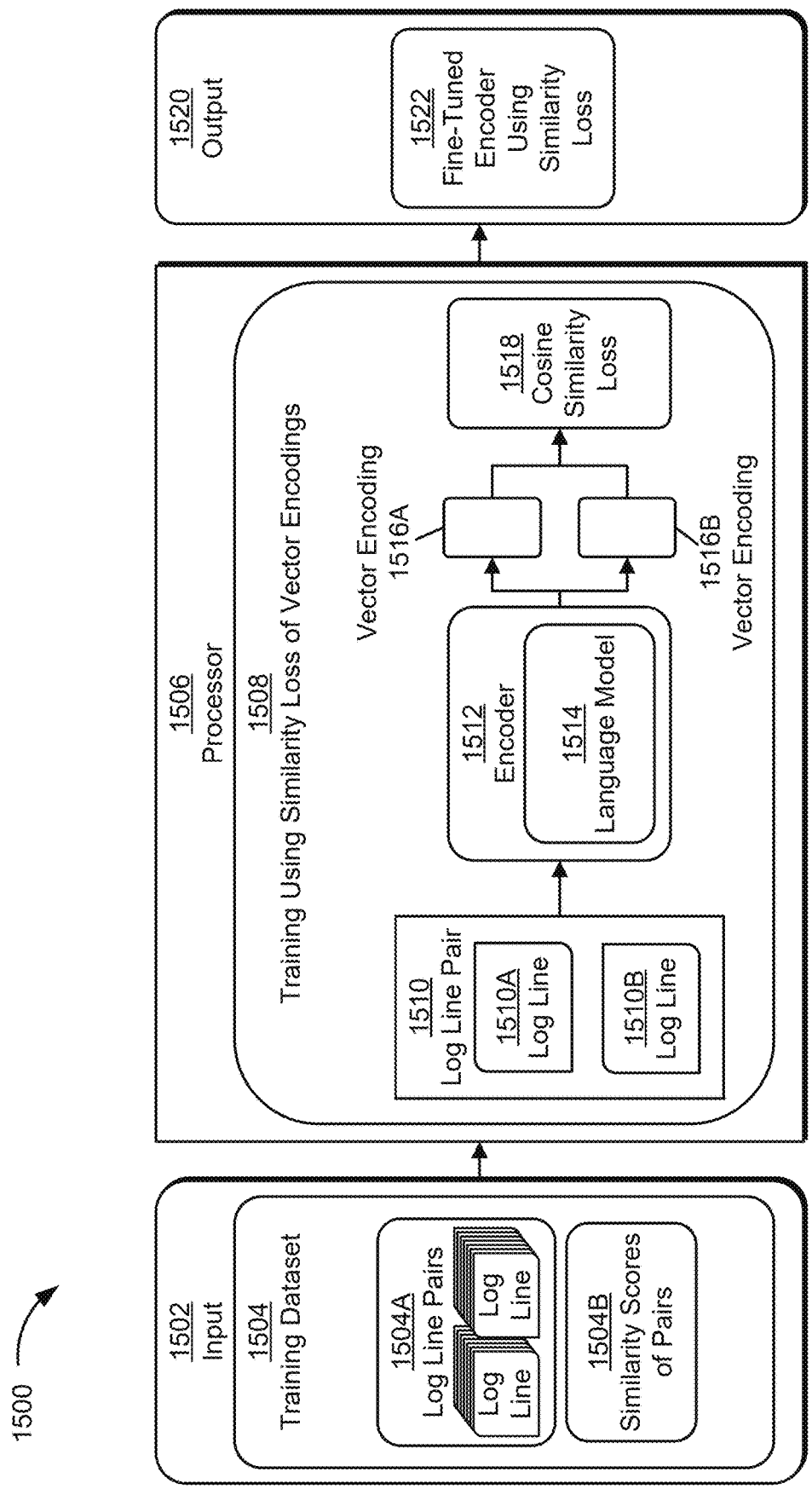
FIG. 15 is a block diagram illustrating a system to train one or more encoders based, at least in part, on cosine similarity loss, in accordance with at least one embodiment.
Figure 16:
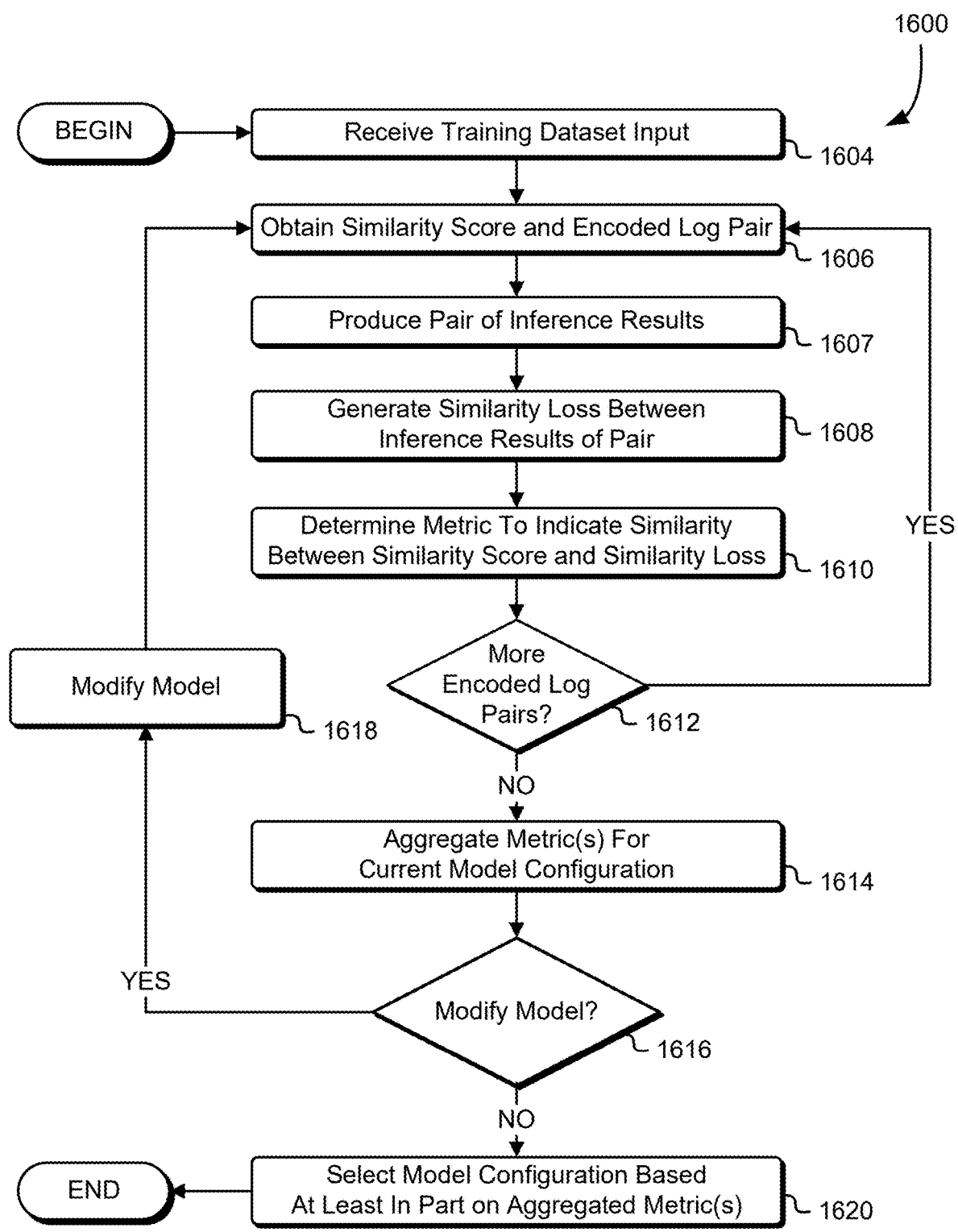
FIG. 16 is a process flow diagram illustrating determining and providing a metric to indicate similarity, in accordance with at least one embodiment.

In at least one embodiment, system 100 includes, or otherwise is, one or more systems illustrated in FIGS. 14-16, such as to perform a process 1600 (see FIG. 16). In at least one embodiment, system 100 performs a process (e.g., process 1600, see FIG. 16) of fine-tuning neural network(s) (e.g., neural network(s) NN1 and/or neural network(s) NN2) to encode encodings EL (e.g., encodings $EL_1$ and/or encodings $EL_2$, which are encodings of log(s) 104) using similarity scores. Neural network(s) (such as neural network(s) NN1 and/or neural network(s) NN2) may be trained and/or fine-tuned using (e.g., minimizing) similarity loss of one or more vector encodings produced by the neural network(s) (e.g., the encodings $EL_2$ produced by neural network(s) NN1 and/or the encodings $EL_3$ produced by neural network(s) NN2). Because such a fine-tuned neural network (e.g., neural network(s) NN1 and/or neural network(s) NN2) may be trainable using training data without task-specific labels, said neural network (e.g., neural network(s) NN1 and/or neural network(s) NN2) may then be trained to encode encodings (encodings $EL_1$ and/or encodings $EL_2$, which encode log(s) 104) for different types of tasks (e.g., as input for other neural networks and/or machine learning processes) with minimal labeling for small sets of events. Process 1600 may include training on semantic similarity using one or more pairs of log entries and minimizing cosine similarity loss. For example, neural network(s) NN1 and/or neural network(s) NN2 may be used to implement a log event classification model that may classify a result as "ignore" or "alert." If a previously unseen log entry is encoded, the log event classification model may classify the encoded unseen log entry in the same class as a similar previously seen and encoded log entry. Thus, unlike with self-supervised learning, a fixed vocabulary may not be required. Encodings $EL_2$ may be output by the neural network(s) NN1 to the neural network(s) NN2, which may process the encodings $EL_2$ and output the encodings $EL_3$. Encodings $EL_3$ output by neural network(s) NN2 may be used as input to downstream processes (e.g., aggregation functionality 117, downstream functionality 118, one or more neural networks, and/or the like) that may classify the encoded log entries. For example, downstream functionality 118 may implement a classifier 122 that may classify one or more of log(s) 104 as including evidence of an anomaly.

While logs include information generated by software running on a computing system (e.g., error messages), telemetry includes information about the computing system itself (e.g., bit error rate (BER), CPU utilization, memory utilization, disk I/O, temperature, etc.), for example, as the computing system executes the software. Telemetry involves the measurement of transmissions of data from remote sources, such as physical or electrical data. Telemetry data may be collected using sensors or other devices, such as temperature sensors, counters (e.g., to count anomalous events over time), etc. Both telemetry and logs include information that may be used to evaluate a computing system (a data center), but current approaches do not use logs in combination with telemetry data, for example, to detect anomalies. Thus, many current approaches do not use at least some types of available data when performing anomaly detection, which negatively affects the ability of downstream processes (e.g., incident prediction, root cause analysis, and/or observation generation) because useful information may be missing such that an anomaly goes undetected.

In at least one embodiment, system 100 includes, or otherwise is, one or more systems illustrated in FIGS. 10-13, such as to perform process 1100 (see FIG. 11), 1200 (see FIG. 12), 1300 (see FIG. 13), or a portion or combination thereof. In at least one embodiment, system 100 performs at least one or more portions of a process (e.g., process 1100, 1200, and/or 1300; see FIGS. 11-13) of combining log information (e.g., in the form of encodings $EL_3$) and telemetry information (e.g., vector of combined encodings or aggregated data AD). For example, aggregation functionality 117 may using one or more neural networks (e.g., encoders) to aggregate information received from topology functionality 106, telemetry functionality 108, and/or encodings $EL_3$ and then provide aggregated data AD to downstream functionality 118, which may, for example, use the aggregated data AD as input to one or more neural networks (e.g., classifier(s) 122) to detect one or more anomalies within a computing system (e.g., a data center). Topology functionality 106 may encode network topology information (e.g., devices, physical connections, or locations) in combination with or separate from the telemetry information (e.g., provided by the telemetry functionality 108). Topology functionality 106 may provide the encoded topology information to aggregation functionality 117 as part of performing anomaly detection. For example, when system 100 is used to perform anomaly detection, system 100 may be characterized being or implementing an anomaly detection pipeline. Topology functionality 106 and/or telemetry functionality 108 may receive information from one or more external data sources, and provide such information to aggregation functionality 117.

In at least one embodiment, system 100 includes a collection of one or more hardware and/or software computing resources with instructions that, when executed, performs one or more communication processes such as those described herein. In at least one embodiment, system 100 is a software program executing on computer hardware, application executing on computer hardware, and/or variations thereof. In at least one embodiment, one or more processes of system 100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, system 100 uses a machine learning training framework such as PYTORCH, TENSORFLOW, BOOST, CAFFE, MICROSOFT COGNITIVE TOOLKIT/CNTK, MXNET, CHAINER, KERAS, DEEPLEARNING4J, and/or other training framework to implement and perform operations described herein to encode and/or classify log data and/or otherwise perform operations described herein. In at least one embodiment, as an example, training a neural network model includes use of a server (e.g., NVIDIA DGX servers) which further includes at least a GPU (e.g., AMD MI200, VEGAL10, VEGO20, AND ARCTURUS), an optimizer (e.g., ADAM OPTIMIZER), or discriminator architecture (e.g., transformer encoder architecture from sentence embeddings using sentence bidirectional encoder representations from transformers (SBERT) trained at least in part with cosine similarity loss or discriminator architecture trained using one or more loss operations described herein).

In at least one embodiment, system 100 is comprised of modules (e.g., modules 1724-1730, see FIG. 17B) such that said system 100 performs a neural network to encode and/or classify log data. In at least one embodiment, a module includes any combination of any type of logic (e.g., software, hardware, firmware) and/or circuitry configured to perform a function as described. In at least one embodiment, a module includes one or more circuits that form part of a larger system (e.g., an integrated circuit (IC), system on-chip (SoC), central processing unit (CPU), graphics processing unit (GPU), data processing unit (DPU), etc.). In at least one embodiment, a controller includes any combination of any type of logic (e.g., software, hardware, firmware) and/or circuitry configured to perform a function as described. In at least one embodiment, software includes software packages, code, programming language, drivers, instructions, instruction sets, or some combination thereof. In at least one embodiment, hardware includes hardwired circuits, programmable circuits, state machine circuits, fixed function circuits, execution unit circuits, firmware with stored instructions executed by programmable circuits, or some combination thereof.

In at least one embodiment, system 100 includes one or more logic units. In at least one embodiment, a logic unit includes firmware logic, hardware logic, or some combination thereof configured to provide any function as described further herein. In at least one embodiment, a logic unit includes circuitry that forms part of a larger system (e.g., IC, SoC, CPU, GPU, DPU). In at least one embodiment, a logic unit includes logic circuitry for implementation of firmware and/or hardware to perform a neural network to encode and/or classify log data.

In at least one embodiment, system 100 includes one or more engines. In at least one embodiment, an engine includes a module and/or logic unit as described further herein. In at least one embodiment, a component includes a module and/or logic unit as described further herein. In at least one embodiment, an engine includes software logic, firmware logic, hardware logic, or some combination thereof configured to provide any function as described further herein. In at least one embodiment, a component includes software logic, firmware logic, hardware logic, or some combination thereof configured to provide any function as described further herein. In at least one embodiment, operations performed by hardware and/or firmware may alternatively be implemented via a software module, which may be embodied as a software package, code and/or instruction set. In at least one embodiment, a logic unit may also utilize a portion of software to implement its function.

In at least one embodiment, system 100 includes processor(s) 110 to perform one or more neural networks, such as neural network(s) NN1, neural network(s) NN2, classifier(s) 122, and/or others. Processor(s) 110 may receive one or more inputs 102, such as one or more of log(s) 104, topology information provided to topology functionality 106 by one or more topology data sources, and/or telemetry information provided to telemetry functionality 108 by one or more telemetry data sources. Input(s) 102 may include one or more inputs 202, 302, 1402, and/or 1502 (see FIGS. 2, 3, 14, and 15, respectively). Input(s) 102 of one or log(s) 104 may include one or more logs 204, log line 304, log sequences 508, tokens 610 representing one or more log event encodings (e.g., forming or defining a log sequence 612) and position encodings (e.g., forming or defining a position sequence 614), logs 702 and/or embedded vector 704, log line stream 1002A, an input of a raw log 1102, log line 1404, log line pairs 1504A, or combinations thereof (see FIGS. 2-16). One or more of log(s) 104 may include information such as text data 104A (e.g., text data 206A and/or 306A), numerical data 104B (e.g., numerical data 206B and/or 306B), and/or categorical data 104C (e.g., categorical data 206C and/or 306C). Input(s) 102 of topology information may include topology data 1012 and/or topology and metadata information 1002C. Input(s) 102 of telemetry information 108 may include topology data 1012.

Processor(s) 110 may perform one or more neural networks, such as one or more of encoder(s) 114, neural network(s) NN1, neural network(s) NN2, classifier(s) 122, and/or others. One or more of encoders 114 may include text encoder 114A (e.g., encoder 208 and/or text encoder 308A), numerical encoder 114B (e.g., encoder 208 and/or numerical encoder 308B), categorical encoder 114C (e.g., encoder 208 and/or categorical encoder 308C), neural network(s) NN1 trained using triplet loss of one or more vector encodings (e.g., model 510 and/or neural network 608), and/or neural network(s) NN1 trained using similarity loss with respect to one or more vector encodings (e.g., log event classification model 1006, encoder 1408, and/or encoder 1512).

Processor(s) 110 may perform one or more of encoder(s) 114, neural network(s) NN1, neural network(s) NN2, classifier(s) 122, and/or others to generate one or more log encodings $EL_1$, $EL_2$, and/or $EL_3$ which may include one or more vector encodings, vectors of a combined encodings, resultant encoding 216, resultant encoding 314, embedded vectors 704, generated semantic encodings 1412, vector encodings 1516, or combinations thereof. In at least one embodiment, vector encodings are otherwise a tensor representative of information (e.g., types of information) associated with one or more logs.

Processor 110 may perform one or more neural networks (e.g., neural network(s) NN1 and/or neural network(s) NN2) which may include one or more classifiers, such as log event classification model 1006, encoder 1408, encoder 1512, and/or LLM. A classifier (e.g., neural network(s) NN2) may perform one or more tasks, such as anomaly detection (e.g., anomaly detection 1414A and/or model 1014), incident prediction (e.g., incident prediction 1414B), root cause analysis (e.g., root cause analysis 1016 and/or 1414C), observation generation (e.g., observation generation 1414D), and/or one or more other downstream tasks and/or applications 1414 (see FIG. 14) described herein. The processor 110 performing one or more neural networks may generate one or more outputs 120, such as a classification associated with one or more of input(s) 102 and/or one or more outputs described herein.

In at least one embodiment, processor(s) 110 include one or more circuits that perform at least a portion of instructions 132 (e.g., implementing encoder(s) 114, neural network(s) NN1, neural network(s) NN2, classifier(s) 122, other machine learning process(es), topology functionality 106, telemetry functionality 108, preprocessing functionality 112, initial encoder functionality 113, encoder functionality 115, classification functionality 116, position encoder functionality 111, aggregation functionality 117, downstream functionality 118, and/or other functionality) stored in memory 130. In at least one embodiment, processor(s) 110 include one or more parallel processing units ("PPU(s)"), such as one or more graphics processing units ("GPU(s)"), one or more massively parallel GPU(s), one or more accelerators, and/or others. In at least one embodiment, massively parallel GPU(s) refer to a collection of one or more GPUs, or any suitable processing units, which may be utilized to perform various processes in parallel. In at least one embodiment, processor(s) 110 is/are implemented, for example, using a main central processing unit ("CPU") complex, one or more microprocessors, one or more microcontrollers, PPU(s) (e.g., accelerator(s), GPU(s), and/or others), one or more data processing units ("DPU(s)"), one or more arithmetic logic units ("ALU(s)"), and/or others. In at least one embodiment, one or more of processor(s) 110 is/are implemented using one or more devices illustrated in and/or described with respect to FIGS. 17A-22. In at least one embodiment, any circuits used to implement one or more of processor(s) 110 is/are implemented using any circuits illustrated in and/or described with respect to FIGS. 17A-22.

In at least one embodiment, memory 130 (e.g., one or more non-transitory processor-readable medium) is implemented, for example, using volatile memory (e.g., dynamic random-access memory ("DRAM")) and/or nonvolatile memory (e.g., a hard drive, a solid-state device ("SSD"), and/or others). In at least one embodiment, memory 130 (e.g., one or more non-transitory processor-readable medium) is implemented using one or more memory devices illustrated in and/or described with respect to FIGS. 17A-22.

In at least one embodiment, memory 130 and processor(s) 110 communicate with one another over connection(s) 134, such as a bus, a Peripheral Component Interconnect Express ("PCIe") connection (or bus), and/or others. In at least one embodiment, connection(s) 134 is/are implemented using one or more structures illustrated in and/or described with respect to FIGS. 17A-22.

In at least one embodiment, system 100 includes one or more processors to perform one or more neural networks to encode one or more logs, classify one or more logs, and/or otherwise perform operations described herein. In at least one embodiment, system 100 is included in, and/or otherwise includes systems illustrated in FIGS. 1-17B and/or 23 to perform one or more neural networks to encode one or more logs, classify one or more logs, and/or otherwise perform operations described herein. In at least one embodiment, system 100 performs one or more processes illustrated in FIGS. 1-17B and/or 23, such as to perform one or more neural networks to encode one or more logs, classify one or more logs, and/or otherwise perform operations described herein. In at least one embodiment, system 100 includes one or more hardware illustrated in FIGS. 17-22, such as to perform one or more neural networks to encode one or more logs, classify one or more logs, and/or otherwise perform operations described herein.

FIG. 2 is a block diagram illustrating a system 200 to generate a resultant encoding to encode at least one log message. System 200 may be implemented as least in part by initial encoder functionality 113. In at least one embodiment, system 200 includes one or more encoders 208 (e.g., encoders 114A-114C illustrated in FIG. 1), which may generate one or more encodings 210 (e.g., encodings 210A-210C). The encoder(s) 208 may include and/or be in communication with one or more attention layers 212 to combine encodings 210A-210C produced by encoder(s) 208, such as to generate a resultant encoding 216 (e.g., initial encodings $EL_1$, which may be a vector of combined encodings). One or more of encoding(s) 210 may each correspond to a type of information 206 included in log 204. As an example, a type of information 206, such as text data 206A, may correspond to one of encoder(s) 208 generating the first encoding 210A.

System 200 may use at least one neural network (e.g., one or more of encoder(s) 208) to encode text data 206A, numerical data 206B, and/or categorical data 206C of one or more log entries (e.g., obtained as data SD) to generate first encoding 210A, second encoding 210B, and an N-th encoding 210C and combine the output of the neural network(s) to produce resultant encoding 216. For example, resultant encoding 216 may be a unified representation or encoding of the log entry (e.g., obtained as data SD). The first encoder of encoder(s) 208 may be a text encoder (e.g., text encoder 308A and/or 114A) which may encode any text information, the second encoder may be a numerical encoder (e.g., numerical encoder 308B and/or 114B) that encodes information pertaining to any numbers in the log, and the third encoder may be a categorical encoder (e.g., categorical encoder 308C and/or 114C) that may encode any categorical information, which may include metadata. An example of metadata is an event's priority or message type.

Before the first, second, and third encoders are used, a preprocessing operation (e.g., performed by the preprocessing functionality 112) may divide a log entry into separate data (e.g., data SD) based on its type of information 206, such as text data 206A and numerical data 206B. For example, the preprocessing operation may copy the log entry, remove numeric data from a first copy of the log entry to create the text data, and remove text data from a second copy of the log entry to create the numeric data. The preprocessing operation may also identify as categorical data any categories and/or metadata associated with the log entry. The categorical data may be stored in a data structure (e.g., a string, an array, etc.). The data SD may include the separated text data, numerical data, and/or categorical data.

One or more encoders 208, as an example, may include a semantic encoder (e.g., a sentence transformer pretrained on text) that receives the text data 106A (e.g., included in data SD) obtained from an entry in the log 204 by the preprocessing operation, and generates an encoding 210 by encoding text segments within the text data 106A as information related to the natural language in the text data 106A. Log entries can include descriptors of an event at a time period. A non-limiting example of such a descriptor is "INFO dfs.DataBlock Scanner:Verification Succeeded for . . . ," which can be divided into text segments to be encoded, such as "dfs" and "DataBlockScanner." The encoding output by the semantic encoder includes a value representing each of the text segments in the text data combined to define a vector representing the text data 106A, such as one of encoding(s) 210.

One or more of encoder(s) 208, as an example, may include a sinusoidal encoder that receives the numerical data 106B (e.g., included in data SD) obtained from an entry in the log 204 by the preprocessing operation, and uses a sinusoidal function (e.g., sine and/or cosine) to encode numbers (e.g., timestamps, counters, object identifiers, etc.) within the numerical data 106B, such as one of encoding(s) 210. As an example, a sinusoidal encoder may encode position information with one or more sine functions and/or one or more cosine functions. The sinusoidal encoder can represent time stamps, counters, or other time series data as one of encoding(s) 210. Time series information can be encoded with scaling and/or quantization, for example, by one or more time series forecasting models (e.g., Chronos) and/or by extracting one or more Fourier features and applying one or more neural network layers. The encoding(s) 210 generated by the sinusoidal encoder (e.g., one or more encoders 208, 114B, and/or 308B) includes a value representing each of the numbers in the numerical data combined to define a vector representing the numerical data 206B.

One or more encoders 208, as an example, may include an embedding encoder that receives the categorical data 206C obtained from an entry of the log 204 by the preprocessing operation, and encodes the categorical data 206C into a vector, such as one of encoding(s) 210. As an example, categorical data 206C may be ordinal data, where there is an ordered relationship (e.g., "first," "second," and "third"). The categorical data 206C may include one or more labels. A label can be encoded by mapping the label to an integer (e.g., Integer Encoding), mapping the label to a binary vector (e.g., One Hot Encoding), or learning an embedding (e.g., distributed representation of the categories). As an example, one or more of encoder(s) 208 generate a vector embedding for priority information included in the log entry, such as one of encoding(s) 210. As an example, an entry in log 204 may include a text descriptor (e.g., INFO or WARN) associated with an event that can be classified (e.g., into categorical data 206C) as a level of priority (e.g., low priority or high priority) by an anomaly detector (e.g., "INFO"=low priority, "WARN"=high priority). If the log entry includes the text "INFO," the preprocessing operation may include information in the categorical data 206C indicating a low priority and the embedding (or one of encoding(s) 210) generated by the embedding encoder (e.g., one or more of encoder(s) 208) indicates a low priority classification. If the log 204 includes the text "WARN," the preprocessing operation may include information in the categorical data 206C indicating a high priority and the embedding (e.g., one of encoding(s) 210) generated by the embedding encoder indicates a high priority classification.

Once text data 206A, numerical data 206B, and categorical data 206C are encoded as one or more encodings 120A-120C, a separate output of each of the three encoders may be provided to attention layer(s) 212 (e.g., a single attention layer of a transformer encoder) to combine (e.g., fuse) the one or more outputs (e.g., encodings 210A-210C) of the encoder(s) 208. The attention layer(s) 212 may assign one or more weights to each feature embedding in the one or more outputs (e.g., encodings 210A-210C) of the encoder(s) 208 and use those weights to calculate resultant encoding 216 (e.g., a weighted mean of the one or more outputs). As an example, output 214, including a vector, of the attention layer(s) 212 (e.g., initial encodings $EL_1$) can be provided to downstream processes and used thereby. For example, the resultant encoding 216 may be used to generate training data for training one or more neural networks using triplet loss, such as neural network NN1 and/or an encoder illustrated in FIGS. 5-9.

In at least one embodiment, system 200 includes one or more processors to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, system 200 is included in, and/or otherwise includes systems illustrated in FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, system 200 performs one or more processes illustrated in FIGS. 1-17B and/or 23, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, system 200 includes one or more hardware illustrated in FIGS. 17-22, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein.

FIG. 3 is a block diagram illustrating a system 300 to encode at least one log message based, at least in part, on one or more types of information, in accordance with at least one embodiment. System 300 may be implemented as least in part by initial encoder functionality 113. Logs may provide a rich source of information about the life cycle of systems and services. The large scale of log generation and their inherent characteristics, such as lack of standardization and use of domain specific terminology, may make it challenging to manually extract meaningful insights. Encoding log lines in a way which captures the semantic meaning and relationships may improve performance of downstream log analysis tasks, which may operate on single log lines (e.g. a cluster of one or more log messages), and/or on log sequences (e.g., combinations of log messages). When encoding a single log line, one or more type of information 306 (e.g., numerical data 306B) reported in the log line may be ignored or separate models may be used to analyze each type of information 306, this may not take into account categorical data 306C, such as event prioritization or event type.

In at least one embodiment, system 300 performs a generic feature tokenization model that operates and integrates different types of log line information 306, which may include: "clean" text 306A (e.g., information/templates), numerical data 306B (e.g., duration, telemetry reported in logs) and categorical data 306C (e.g. event priority, event type). System 300 may include an encoder 308 to encode one or more types of information (e.g., types of features to identify) with a dedicated encoding model and then fuses them with an attention-based layer 310 (e.g., a single layer of a transformer encoder). System 200 can be coupled with models for log-based analysis in order to provide a more complete encoding of log information.

System 300 may receive one or more inputs 302, such as a log line 304. In at least one embodiment, one or more inputs 302 of system 300 may include one or more characters in log line 304, one or more log lines, one or more sequences of log lines, one or more encodings of one or more log lines (e.g., vector representing said log line), text, symbols, previous inputs, one or more scripts to train one or more neural networks, information represented as data and/or other inputs described herein. In at least one embodiment, one or more of input(s) 302 are conveyed by a signal to one or more processors. In at least one embodiment, one or more of input(s) 302 are information represented as one or more packets of data. In at least one embodiment, one of input(s) 302 is received by a software process, such as those described in connection to any FIGS. 1-16. In at least one embodiment, at least one of input(s) 302 is received by one or more hardware, such as those described in connection to any FIGS. 17-22.

Log line 304 may include one or more types of information 306, such as text 306A, numerical data 306B, and/or categorical data 306C (e.g., metadata 306D). As an example, one or more encoders may correspond to one of types of information 306 and may be used to encode log line 304. For example, FIG. 3 illustrates encoder(s) 308 of types of information 306 (e.g., text encoder 308A, numerical encoder 308B, and categorical encoder 308C). Each encoder(s) 308 corresponding to one of the types of information 306 may generate an encoding that corresponds to that type of information in a log line 304. By way of a non-limiting example, a text encoder 308A generates an encoding corresponding to text 306A, a numerical encoder 308B generates an encoding corresponding to numerical data 306B, a categorical encoder 308C generates an encoding corresponding to categorical data 306C, a metadata encoder generates an encoding corresponding meta data, and/or one or more other encoders may each generate an encoding for other types of information. Each encoding generated by encoder(s) 308 is combined (e.g., fused) by attention layer 310 into a resultant encoding 314 (e.g., vector representative of combined encodings, such as a mean or weighted mean) by an attention-based layer 310. In at least one embodiment, encoder(s) 308 (e.g., text encoder 308A, numerical encoder 308B, and/or categorical encoder 308C) include one or more of encoders 114 and/or 208. One or more encodings generated by encoder(s) 308 may include one or more of encoding(s) 210. Attention-based layer 310 may be implemented by attention layer(s) 212, which may generate output(s) 312 and/or 214.

System 300 may generate and provide one or more outputs 312, such as resultant encoding 314 (e.g., initial encodings $EL_1$). In at least one embodiment, one or more of output(s) 312 of system 300 may include one or more embeddings (e.g., encodings) representing one or more of types of information 306 included in the log line 304, one or more tensors (e.g., vector), one or more log lines 304 (e.g., log message), one or more sequences of log lines 304, one or more encodings of one or more log lines 304 (e.g., vector representing said log line), text, symbols, previous inputs, one or more weights, one or more representations of a log, one or more classifications of a log, information represented as data and/or other outputs described herein. In at least one embodiment, one or more of output(s) 312 are conveyed by a signal to one or more processors. In at least one embodiment, one or more of output(s) 312 are information represented as one or more packets of data. In at least one embodiment, at least one of output(s) 312 is generated by a software process, such as those described in connection to any FIGS. 1-16. In at least one embodiment, at least one of output(s) 312 is generated or received by one or more hardware, such as those described in connection to any FIGS. 17-22.

In at least one embodiment, system 300 includes one or more processors is to encode at least one log message, at least in part, by: encoding a first type of information in the at least one log message to obtain a first encoding; encoding a second type of information in the log message to obtain a second encoding; obtaining a resultant encoding at least in part by combining at least the first and second encodings; and/or otherwise performing operations described herein. In at least one embodiment, system 300 is included in, and/or otherwise includes systems illustrated in FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, system 300 performs one or more processes illustrated in FIGS. 1-17B and/or 23, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, system 300 includes one or more hardware illustrated in FIGS. 17-22, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein.

FIG. 4 is a flow diagram illustrating a process 400 of providing a resultant encoding of a log, in accordance with at least one embodiment. Process 400 may be performed at least in part by initial encoder functionality 113 (e.g., when performed by processor(s) 110). Process 400 may begin when it is otherwise invoked by one or more processors (e.g., processor(s) 110) and/or initial encoder functionality 113 receives one or more logs as an input in block 402. A log received as input in block 402 may be received in combination with one or more inputs 102, 202, and/or 302. One or more systems (e.g., systems 100, 200, and/or 300) may perform process 400, such as to jointly encode data of different types, such as text, numerical, categorical, and/or metadata. Process 400 may include using a feature tokenizer that encodes both text, numeric log data, categoric log data as well as metadata attached to one or more logs.

Upon receiving a log input in block 402, initial encoder functionality 113 may attempt to identify relevant a type of information (e.g., text, numerical, categorical, or metadata) in the log input. Then, initial encoder functionality 113 may proceed to decision block 404. In decision block 404, initial encoder functionality 113 decides whether a relevant type of information (e.g., text, numerical, categorical, or metadata) has been identified in the log input. A decision in decision block 404 may result in a "YES," if a relevant type of information (e.g., text, numerical, categorical, or metadata) is identified, otherwise a decision in decision block 404 may result in a "NO." If a decision in decision block 404 is "YES," initial encoder functionality 113 may generate one or more encodings in block 406, such as an encoding corresponding to the type of information identified. Then upon generating an encoding in block 406, initial encoder functionality 113 may proceed to decision block 404 to determine whether another relevant type of information (e.g., text, numerical, categorical, or metadata) may be identified in a log. As an example, text information is identified and a processor performing initial encoder functionality 113 generates an encoding corresponding to text information in block 406. Then, continuing from said example, a processor performing initial encoder functionality 113 returns to decision block 404 to determine whether other relevant types of information are identified, such as numerical information. This may repeat until encodings are generated for each relevant type of information included in a log. Blocks 404 and 406 may also be performed in parallel for each type of information to be identified.

If a decision in decision block 404 is "NO," initial encoder functionality 113 may proceed to decision block 408. A decision in decision block 408 may be "YES," if one or more results have been obtained. As an example, results are obtained if at least one encoding was generated in block 406. If the decision in decision block is "YES," initial encoder functionality 113 provides a resultant encoding (e.g., initial encodings $EL_1$) in block 410. If more than one encodings are generated (e.g., in block 406 during multiple iterations), initial encoder functionality 113 may combine encodings generated in block 406 to obtain the resultant encoding provided in block 410. For example, initial encoder functionality 113 may combine one or more encodings generated in block 406 by calculating a mean or weighted mean of the encoding(s) generated in block 406. In at least one embodiment, a resultant encoding is a resultant encoding 216 and/or 314. If when performing process 400, initial encoder functionality 113 performs block 410 by providing a resultant encoding (e.g., to a processor), initial encoder functionality 113 may proceed to perform one or more operations described herein and/or process 400 may end. If a decision in decision block 408 is "NO," initial encoder functionality 113 may proceed to perform one or more operations described herein and/or process 400 may end.

Block 410 of process 400 may be performed by one or more attention layers that assign one or more weights for each feature (or element of an encoding obtained in block 406) of each input vector (or encoding(s) obtained in block 406), when providing a resultant encoding. A feature may include an element of one or more encodings, such that the one or more attention layers may assign a weight for one or more features. For example, the attention layer may compute one or more alignment scores between a query (e.g., vector to determine respective similarity between key inputs such as through use of a dot product or scaled dot product) and each input vector (e.g., key), apply a softmax operation to the alignment score(s) to obtain attention weights, multiply each input vector by its corresponding attention weight, and sum the weighted input vectors to obtain the resulting vector. In at least one embodiment, a processor performing process 400 may perform an encoder to output one or more vector encodings in block 406, such as one or more vectors of equal lengths. As an example, given k vectors of dimension d, representing k encodings of different information extracted from the log (e.g., at or before decision block 404) and encoded with a dedicated encoder (e.g., at block 406), the k encoding may be aggregated or combined (e.g., at block 410) using a Transformer Encoder with L layers (e.g., one layer, two layers, or more layers) and/or one or more muti-head self-attention layers.

Block 406 of process 400 may include encoding input (e.g., numeric data), such as by applying a learned fully connected layer W to embed the input in high dimensional space (e.g., of dimension d) and/or applying random Fourier features on the input and then applying a learned layer W (e.g., which may be beneficial for embedding low-dimensional inputs with neural networks). In at least one embodiment, process 400 may include feature tokenization (e.g., at block 406) used in combination (e.g., at block 410) with a transformer model (e.g., attention layer). Feature tokenizer may transform one or more input features into one or more embeddings. One or more architectures used in combination with process 400 may include an MLP, ResNet's, and/or one or more models for tabular data.

While process 400 has been described as being performed by initial encoder functionality 113, process 400 may be performed by different functionality, one or more processes, one or more services, one or more processors, and/or the like. In at least one embodiment, some or all of process 400 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program including a plurality of computer-readable instructions executable by one or more processors. In at least one embodiment, a computer-readable storage medium is a non-transitory computer-readable medium. In at least one embodiment, at least some computer-readable instructions usable to perform process 400 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 400 is performed at least in part on a computer system such as those described elsewhere in this disclosure. In at least one embodiment, logic (e.g., hardware, software, or a combination of hardware and software) performs process 400.

In at least one embodiment, one or more processors uses process 400, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, as an example, a machine readable medium (e.g., non-transitory) having stored thereon a set of instructions, which if performed by one or more processors, cause one or more processors to perform process 400, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, process 400 is included in, and/or otherwise includes processes illustrated in FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, one or more systems illustrated in FIGS. 1-17B and/or 23 perform process 400, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein. In at least one embodiment, one or more hardware illustrated in FIGS. 17-22 use process 400, such as to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein.

Figure 5:
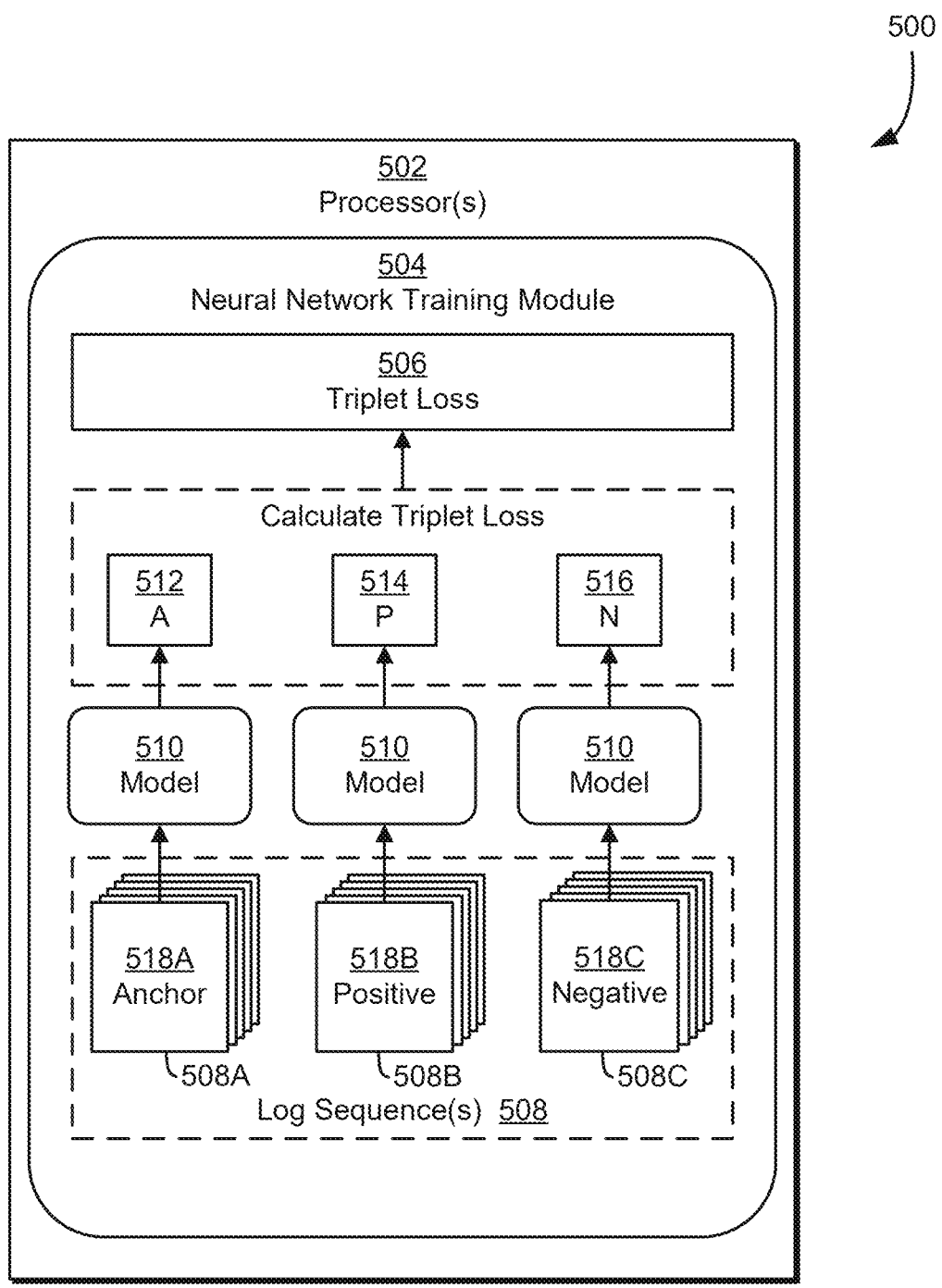
FIG. 5 is a block diagram illustrating a system to train one or more neural networks to encode one or more logs, in accordance with at least one embodiment.

FIG. 5 is a block diagram illustrating a system 500 to train one or more neural networks (e.g., neural network(s) NN1) to encode one or more log sequences 508, in accordance with at least one embodiment. In at least one embodiment, system 500 may implement at least a portion of encoder functionality 115 (see FIG. 1), which may include and/or communicate with neural network training module 504. System 500 may include one or more processors 502 described herein to perform instructions (e.g., included in neural network training module 504) to train and/or perform one or more neural networks (e.g., neural network(s) NN1). As an example, system 500 trains a model 510 based, at least in part, on using contrastive learning and/or reducing or minimizing triplet loss.

System 500 may perform pre-training of a model 510 to encode one or more log sequences without task-specific labels. In at least one embodiment, model 510 is implemented as an encoder to be trained using triplet loss 506 between one or more vector encodings produced by model 510. By pre-training model 510 without task-specific labels, system 500 may make the model 510 easily trainable to encode logs for different types of tasks (e.g., as input for other neural networks and/or machine learning processes) with minimal labeling. System 500 may train a neural network (e.g., neural network(s) NN1) using a contrastive learning approach to encode log sequences from a dataset without task-specific labels and minimize a triplet loss 506 calculated using a triplet loss function based at least in part on the encode log sequences.

System 500, which may perform a process 900, may create a training dataset without task-specific labels from a query sequence or an original log (e.g., which may be referred to as an anchor sequence 508A). Anchor sequence 508A includes one or more individual log messages, each referred to as an anchor 518A. The anchor sequence 508A may be modified or augmented to generate semantically similar and semantically different log sequences. Each log message in semantically similar or positive sequence 508B is referred to as a positive 518B example and each log message in semantically different or negative sequence 508C is referred to as negative 518C example. As an example, varying combinations of log messages in a dataset may be identified as an anchor sequence 508A that may be modified to create a log sequence semantically similar to anchor sequence 508A, and a log sequence semantically different to anchor sequence 508A. Together, the anchor sequence 508A, positive sequence 508B, and negative sequence 508C may be referred to as a sequence triplet. Labels may then be used to identify the anchor sequence 508A, positive sequence 508B, and negative sequence 508C but task-specific labels may not be used. For example, if output of model 510 is to be used by a downstream process to determine priority of a log message or log sequence, the training dataset may include labels that identify anchor sequence 508A, positive sequence 508B, and negative sequence 508C as being an anchor, a positive, and a negative, respectively, but not labels that identify the sequences as be associated with any particular priority level.

In at least one embodiment, each positive 518B example is more similar (e.g., semantically similar) to the anchor 518A than each negative 518C example. As an example, a log message may include a text descriptor (e.g., INFO or WARN) associated with an event that can be classified as a level of priority (e.g., low priority or high priority) by an anomaly detector (e.g., "INFO"=low priority, "WARN"=high priority). A positive example 518B of a log message that includes the text descriptor "INFO," would be a variation of the log message where "INFO" is replaced with another low priority descriptor. Continuing from above example, on the other hand, a negative example 518C of a log message with the text descriptor "INFO," would be a variation of the log message where "INFO" is replaced with a high priority descriptor, such as "WARN." A training dataset may be created by selecting different anchors for different sets of characters indicating information in the log for inclusion in anchor sequence 208A, and using at least a portion of the anchors selected to create positive 518B and negative 518C examples, for inclusion in positive and negative sequences 208B and 208C, respectively.

Before the training dataset is used to train the model 510, an encoding process (e.g., process 400) may encode each anchor 518A, positive 518B example, and negative 518C example of each sequence triplet (e.g., corresponding to one or more events in the log) as vectors. In at least some embodiments, the initial encodings (e.g., initial encodings $EL_1$) of the anchors may be combined to form anchor sequence 508A, initial encodings of the positive examples may be combined to form positive sequence 508B, and initial encodings of the negative examples may be combined to form negative sequence 508C. In at least some embodiments, the anchors may be combined to form anchor sequence 508A and the anchor sequence 508A may be encoded to create an initial encoding of the anchor sequence 508A. Similarly, the positive examples may be combined to form positive sequence 508B and the negative examples may be combined to form negative sequence 508C, then the positive and negative sequences 508B and 508C may be encoded to create initial encodings of the positive and negative sequences 508B and 508C, respectively. The model 510 receives the initial encodings (e.g., initial encodings $EL_1$) of the anchor sequence 508A, positive sequence 508B, and negative sequence 508C and encodes them as vectors or encodings "A" 512, "P" 514, and "N" 516.

Figure 8:
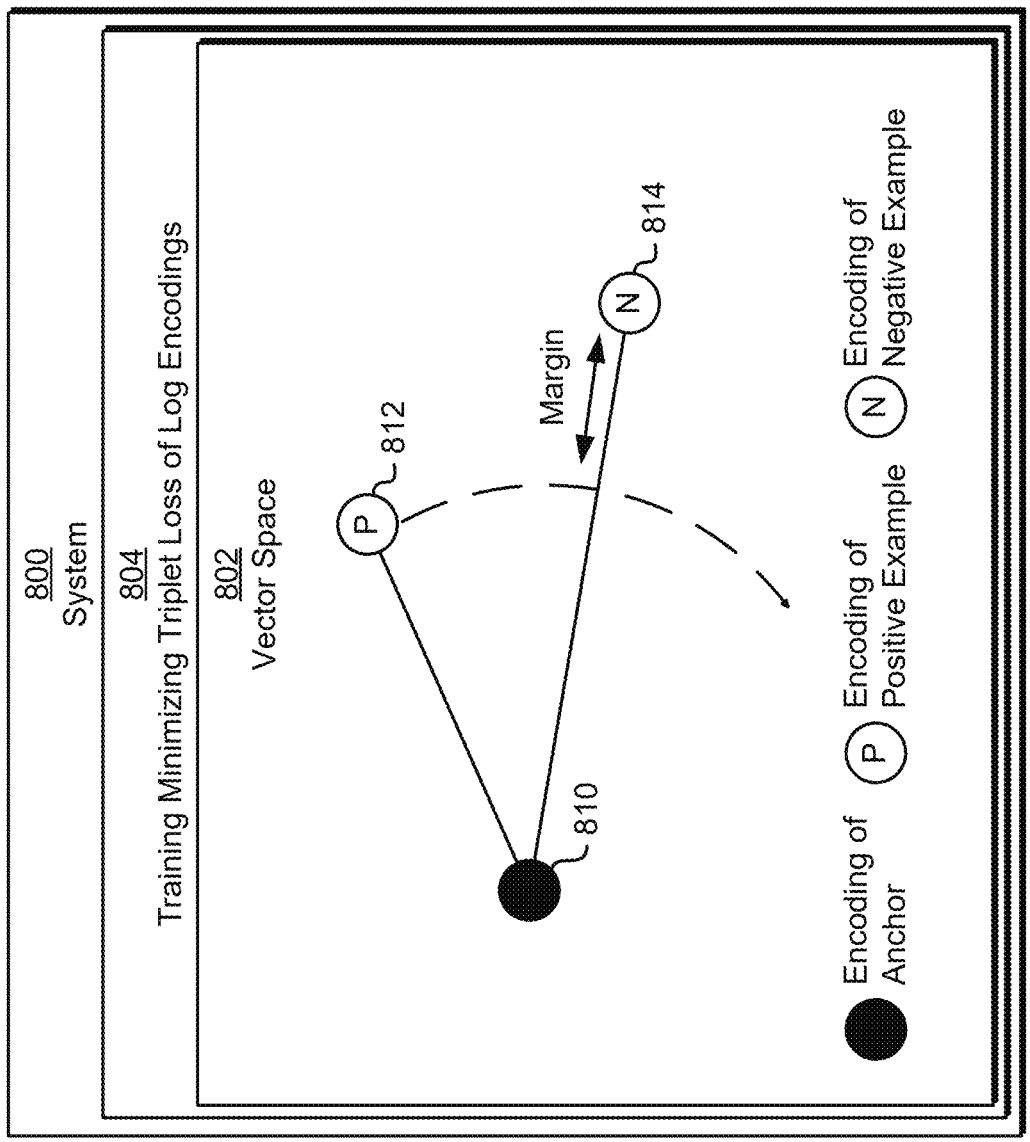
FIG. 8 is a block diagram illustrating a system training one or more neural networks based, at least in part, on triplet loss, in accordance with at least one embodiment.

Encodings "A" 512, "P" 514, and "N" 516 correspond to three positions in latent space (e.g., vector space 802, see FIG. 8). Encodings "A" 512, "P" 514, and "N" 516 define a response triplet. The model 510 is trained by adjusting model parameters (e.g., weights) to reduce or minimize a loss function (e.g., triplet loss 506) based on distances between the three positions of the encodings of the response triplet.

During training, the model 510 (e.g., one or more transformer encoder(s)) may receive as input the vectorized dataset (e.g., initial encodings $EL_1$) without task-specific labels. The dataset may include one or more vectorized sequence triplets for each of at least a portion of the events in the dataset. For each sequence triplet, the anchor sequence 508A, positive sequence 508B, and negative sequence 508C may be encoded by the model 510 to produce encodings "A" 512, "P" 514, and "N" 516, respectively. Thus, generated encodings may include encoding "A" 512 corresponding to an anchor sequence 508A, encoding "P" 512 corresponding to a positive sequence 508B, and encoding "N" 516 corresponding to a negative sequence 508C. Then, triplet loss 506 can be calculated for each response triplet, which includes encodings "A" 512, "P" 514, and "N" 516. For each model configuration (e.g., set of parameter values, weight values, etc.), the triplet loss can be aggregated (e.g., totaled, averaged, etc.) for all of the response triplets and a model configuration that result in a minimum total triplet loss for response triplets can be selected for the model 510 to use when deployed. For example, the processor(s) 502 may use back-propagation to update one or more neural network weights and subsequently use the model 510 to perform one or more inference operations. Triplet loss 506 may encourage encodings (e.g., encoding "A" 512, "P" 514, and "N" 516) of the vectorized log events, that result in the encoding "A" 512 for the anchor sequence 508A and the encoding "P" 514 for the positive sequence 508B having a distance that is less than a distance between the encoding "A" 512 for the anchor sequence 508A and the encoding "N" 516 for the negative sequence 508C. Further, a margin distance may be specified and triplet loss 506 may encourage the encoding "P" 514 for the positive sequence 508B and the encoding "N" 516 for the negative sequence 508C to be separated by at least the margin distance. In at least one embodiment, the loss function is $L(a, p, n)=\max\{d(a_i, p_i)-d(a_i, n_i)+\text{margin}, 0\}$ where $d(x_i, y_i)=\|x_i-y_i\|_p$.

After the model 510 weights are determined, the model 510 (e.g., neural network(s) NN1) may be used to infer encodings (e.g., encodings $EL_2$) for logs (encoded as initial encodings $EL_1$). These encodings (e.g., encodings $EL_2$) may be provided to one or more other processes, such as one or more other neural networks (e.g., MLP). For example, the encodings may be provided to a neural network trained to detect anomalies that may infer whether each encoding indicates an anomaly was or was not recorded in each log. For example, encodings (e.g., encodings $EL_2$) produced by model 510 (e.g., neural network(s) NN1) may be provided to classification functionality 116.

In at least one embodiment, processor(s) 502 use(s) neural network training module 504 (e.g., neural network training module 1724) to train one or more neural networks (e.g., model 510 trained using triplet loss 506 of vector encodings). In at least one embodiment, processor(s) 502 perform(s) neural network training module 504 and processes such as those described herein by at least including or otherwise encoding instructions that cause performance of or otherwise can be utilized to perform said one or more processes (e.g., by processor(s) 502). In at least one embodiment, a processor using neural network training module 504 obtains or is otherwise provided with one or more neural networks (e.g., by one or more systems such as those described in connection with FIG. 1). In at least one embodiment, processor(s) 502 using neural network training module 504 trains said one or more neural networks (e.g., neural network(s) NN1) using a training dataset through one or more processes such as those described in connection with FIGS. 5-9. In at least one embodiment, processor(s) 502 using neural network training module 504 trains said one or more neural networks using any suitable training process, such as those described in connection with model 510 (e.g., an encoder) trained triplet loss of one or more vector encodings.

In at least one embodiment, system 500 includes a collection of one or more hardware and/or software computing resources with instructions that, when executed, performs one or more communication processes such as those described herein. In at least one embodiment, system 100 is a software program executing on computer hardware, application executing on computer hardware, and/or variations thereof. In at least one embodiment, one or more processes of system 100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, system 100 uses a machine learning training framework such as PYTORCH, TENSORFLOW, BOOST, CAFFE, MICROSOFT COGNITIVE TOOLKIT/CNTK, MXNET, CHAINER, KERAS, DEEPLEARNING4J, and/or other training framework to implement and perform operations described herein to train a neural network to encode at least one vector associated with at least one log sequence and/or otherwise perform operations described herein. In at least one embodiment, as an example, training a neural network model comprises use of a server (e.g., NVIDIA DGX servers) which further includes at least a GPU (e.g., AMD MI200, VEGAL10, VEGO20, AND ARCTURUS), an optimizer (e.g., ADAM OPTIMIZER), or discriminator architecture (e.g., discriminator architecture from face-vid2vid for training with GAN loss).

In at least one embodiment, system 500 is comprised of modules (e.g., modules 1724-1730, see FIG. 17B) such that said system trains a neural network to encode at least one vector associated with at least one log sequence. In at least one embodiment, a module includes any combination of any type of logic (e.g., software, hardware, firmware) and/or circuitry configured to perform a function as described. In at least one embodiment, a module includes one or more circuits that form part of a larger system (e.g., an integrated circuit (IC), system on-chip (SoC), central processing unit (CPU), graphics processing unit (GPU), data processing unit (DPU), etc.). In at least one embodiment, a controller includes any combination of any type of logic (e.g., software, hardware, firmware) and/or circuitry configured to perform a function as described. In at least one embodiment, a software includes software packages, code, programming language, drivers, instructions, instruction sets, or some combination thereof. In at least one embodiment, hardware includes hardwired circuits, programmable circuits, state machine circuits, fixed function circuits, execution unit circuits, firmware with stored instructions executed by programmable circuits, or some combination thereof.

In at least one embodiment, system 500 includes one or more logic units. In at least one embodiment, a logic unit includes firmware logic, hardware logic, or some combination thereof configured to provide any function as described further herein. In at least one embodiment, a logic unit includes circuitry that forms part of a larger system (e.g., IC, SoC, CPU, GPU, DPU). In at least one embodiment, a logic unit includes logic circuitry for implementation of firmware and/or hardware to train a neural network to encode at least one vector associated with at least one log sequence.

In at least one embodiment, system 500 includes one or more engines. In at least one embodiment, an engine includes a module and/or logic unit as described further herein. In at least one embodiment, a component includes a module and/or logic unit as described further herein. In at least one embodiment, an engine includes software logic, firmware logic, hardware logic, or some combination thereof configured to provide any function as described further herein. In at least one embodiment, a component includes software logic, firmware logic, hardware logic, or some combination thereof configured to provide any function as described further herein. In at least one embodiment, operations performed by hardware and/or firmware may alternatively be implemented via a software module, which may be embodied as a software package, code and/or instruction set. In at least one embodiment, a logic unit may also utilize a portion of software to implement its function.

In at least one embodiment, system 500 includes one or more processors is to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 500 is included in, and/or otherwise includes systems illustrated in FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, system 500 performs one or more processes illustrated in FIGS. 1-17B and/or 23, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 500 includes one or more hardware illustrated in FIGS. 17-22, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

Figure 6:
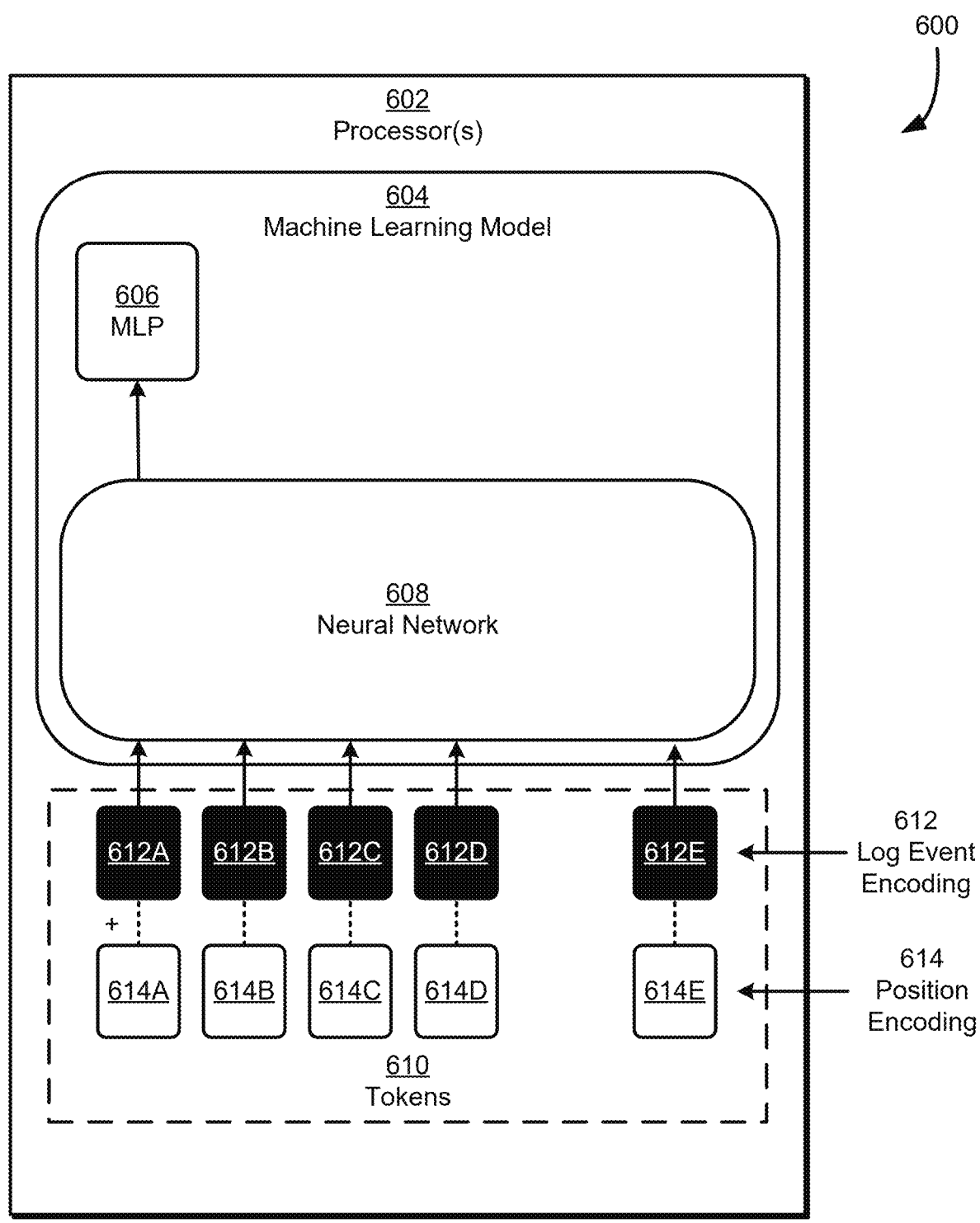
FIG. 6 is a block diagram illustrating a system to train one or more transformer encoders to encode one or more log sequences, in accordance with at least one embodiment.

FIG. 6 is a block diagram illustrating a system 600 to train one or more transformer encoders to encode one or more log sequences, in accordance with at least one embodiment. Logs may provide a rich source of information about the life cycle of systems and services. The large scale of log generation and their inherent characteristics, such as lack of standardization and use of domain specific terminology, may make it challenging to manually extract meaningful insights. In addition, a log line may typically result in a print statement written by a developer. It often may include domain-specific terms, function names and specific identifiers which may not adhere to language syntax or unified standards. Log analysis tasks such as anomaly detection can operate on log sequences to make a prediction.

In FIG. 6, one or more processors 602 implement a machine learning model 604 (e.g., model 510) that includes a neural network 608 (e.g., a transformer encoder) and a multilayer perceptron ("MLP") 606. Output of the neural network 608 is provided as input to the MLP 606. The machine learning model 604 obtains a log sequence 612 (e.g., including one or more initial encodings $EL_1$) and associated position sequence 614 (e.g., provided by position encoder functionality 111) as input and outputs an encoding (e.g., encoding $EL_2$) of the inputs.

In at least one embodiment, processor(s) 602 may tokenize one or more log sequences into one or more tokens 610 (e.g., to aggregate a sequence). Token(s) 610 may include event encodings 612A-612E aggregated to form and/or defining a log sequence 612 and associated position encodings 614A-614E aggregated to form and/or defining a position sequence 614. An input to neural network 608 includes one or more log event encodings 612A-612E (e.g., initial encodings $EL_1$) defining log sequence 612 and one or more position encodings 614A-614E (e.g., provided by position encoder functionality 111) defining position sequence 614. Each log may correspond to one or more pairs of a log sequence 612 and position sequence 614. In at least one embodiment, log sequence 612 is a vector. In at least one embodiment, position sequence 614 is a vector. In at least one embodiment, generating one or more positive and negative log sequences by augmenting an anchor sequence may include obtaining an anchor sequence from one or more datasets (e.g., HDFS dataset), and transforming (e.g., augmenting, flipping, etc.) one or more messages or portions of the anchor sequence to modify its meaning. For example, if the anchor sequence includes a particular log message including a particular event, the processor(s) 602 (e.g., performing the neural network training module 504) may transform the particular log message into a corresponding positive event (e.g., to create a positive example) or negative event (e.g., to create negative example). By way of additional non-limiting examples, the processor(s) 602 may transform the anchor sequence by truncating a log message, and/or parsing a log message (e.g., removing numbers, punctuation, and special characters). Positive and negative examples may be generated from an input anchor sequence by flipping one or more messages.

System 600 performs a process (e.g., process 900) for encoding one or more sequences of log messages without explicit labels related to a downstream target task. System 600 may apply local augmentations in order to generate positive sequence 508B (semantically similar) and negative sequence 508C (semantically different) from a given anchor sequence 508A, and then optimize the neural network 608 (e.g., neural network(s) NN1) using contrastive learning (triplet loss). Since the labels of a downstream task may not be defined, system 600 can leverage the vast amounts of available data and generate general purpose encodings for one or more downstream machine learning programs or processes.

Neural network 608 (e.g., transformer encoder) trained using triplet loss may then be fine-tuned for or trained for use with a specific downstream task (e.g. anomaly detection). Neural network 608 (e.g., transformer encoder) may compute sequence encodings as input for MLP 606, which does not operate on sequences and requires less labeled data (e.g. random forests, logistic regression, isolation forests). In at least one embodiment, one or more neural networks (e.g., neural networks 608 and MLP 606) minimize triplet loss, such as by using the following equations: $L(a, p, n) = \max\{d(a_i, p_i) - d(a_i, n_i) + \text{margin}, 0\}$ and $d(x_i, y_i) = \|x_i - y_i\|_p$.

In at least one embodiment, system 600 includes one or more processors to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 600 is included in, and/or otherwise includes systems illustrated in FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, system 600 performs one or more processes illustrated in FIGS. 1-17B and/or 23, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 600 includes one or more hardware illustrated in FIGS. 17-22, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

Figure 7:
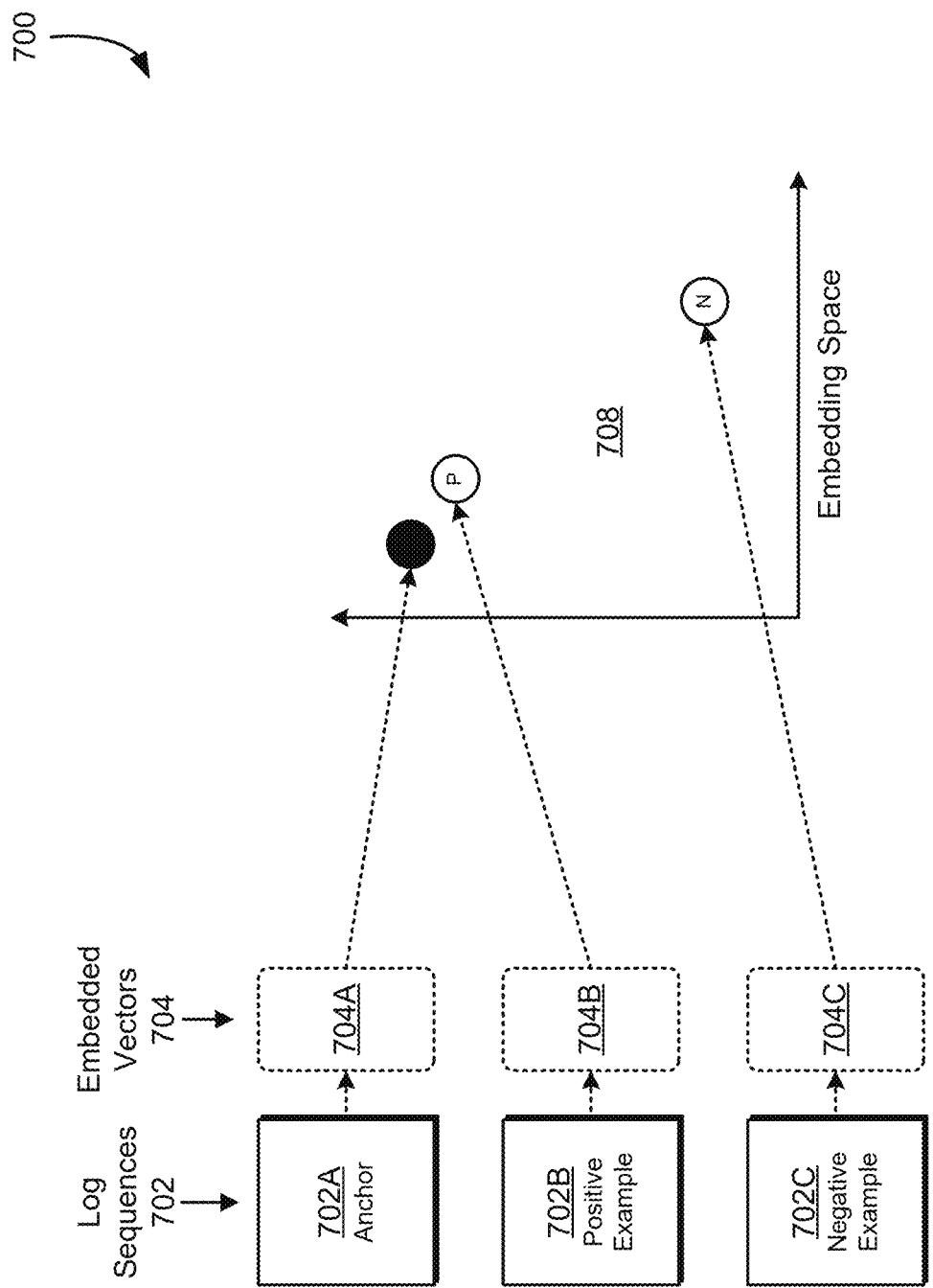
FIG. 7 is a block diagram illustrating a system embedding a vector representing one or more logs, in accordance with at least one embodiment.

FIG. 7 is a block diagram illustrating a system 700 embedding a vector representing one or more logs, in accordance with at least one embodiment. In at least one embodiment, one or more logs are used to train a neural network based at least in part on triplet loss: an anchor 702A (e.g., anchor sequence 508A, see FIG. 5) obtained from a log, positive example 702B (e.g., positive sequence 508B, see FIG. 5) obtained based at least in part on anchor 702A, and negative example 702C (e.g., negative sequence 508C, see FIG. 5) obtained based at least in part on anchor 702A.

System 700, which may perform a process 900, may begin with creating a training dataset without task-specific labels from a query sequence or an original log (e.g., which may be referred to as anchor 702A). The anchor 702A may be augmented to generate semantically similar and semantically different sequences (referred to as positive and negative examples 702B and 702C, respectively). As another example, varying combinations of logs in a dataset may be identified as anchor 702A, a log semantically similar to anchor 702A may be identified as positive example 702B, and a log semantically different to anchor 702A may be identified as negative example 702C. Together, the anchor 702A, positive example 702B, and negative example 702C may be referred to as a sequence triplet. Labels may then be used to identify the anchor 702A, positive example 702B, and negative example 702C but task-specific labels may not be used. In at least one embodiment, the positive example 702B is more similar (e.g., semantically similar) to the anchor 702A than the negative example 702C, such that their positions are closer in an embeddings space.

During training, a machine learning process (e.g., neural network(s) NN1, model 510, a combination of neural network 608 and MLP 606, one or more transformer encoders, and/or the like) may receive as input one or more sequence triplets in a vectorized dataset (e.g., including one or more of initial encodings $EL_1$) corresponding to one or more logs 702. The sequence triplet(s) in the vectorized dataset are without task-specific labels. The machine learning process produces a vectorized response triplet for each sequence triplet of at least a portion of the dataset, such as embedded vectors 704. For each sequence triplet of logs 702, the machine learning process produces an embedded vector 704A-702C corresponds to the anchor 702A, positive example 702B, and negative example 702C, respectively. Embedded vector 704A-702C may each represent a position in an embedding space 708.

One or more processor(s) (e.g., performing neural network training module 504) may calculate triplet loss (as described herein) for each response triplet (embedded vectors 704) output by the machine learning process, and select settings (e.g., parameters, weights, etc.) for the machine learning process that resulted in a desired (e.g., minimum) amount of triplet loss. Positions of an embedded vector may be generated by performing one or more operations described in FIGS. 5-9. In at least one embodiment, one or more neural networks (e.g., neural network 608 and MLP 606) calculates triplet loss, for example by using one or more equations, such as $L(a, p, n)=\max\{d(a_i, p_i)-d(a_i, n_i)+\text{margin}, 0\}$ and $d(x_i, y_i)=\|x_i-y_1\|_p$.

In at least one embodiment, system 700 includes one or more processors is to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 700 is included in, and/or otherwise includes systems illustrated in FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, system 700 performs one or more processes illustrated in FIGS. 1-17B and/or 23, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 700 includes one or more hardware illustrated in FIGS. 17-22, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

FIG. 8 is a diagram illustrating a system 800 training 804 one or more neural networks based, at least in part, on triplet loss, in accordance with at least one embodiment. System 800 may perform training 804 of one or more neural networks based, at least in part, on one or more position encodings in vector space 802, such that one or more weights of a neural network are updated according to minimizing triplet loss based, at least in part, on distances between points in vector space 802.

In at least one embodiment, a processor of system 800 performs training 804 based, at least in part, on minimizing triplet loss of one or more log encodings. Triplet loss can be calculated for each response triplet obtained based at least in part on a sequence triplet obtained based at least in part on one or more logs. A response triplet includes an embedding of a position vector for a sequence triplet including an anchor, positive example, and a negative example. For each configuration of a machine learning process (e.g., set of parameter values, weight values, etc.) used to generate the response triplets, the triplet loss can be aggregated (e.g., totaled, averaged, etc.) for all of the response triplets and a configuration that results in a minimum total triplet loss for response triplets can be selected for the machine learning process to use when deployed. For example, the triplet loss for one or more logs can be totaled for all of the response triplets and one or more model weights that result in a minimum total triplet loss can be selected for the machine learning process (e.g., model 510). Triplet loss may encourage encodings (e.g., encodings 810-814) of the vectorized log events in vector space 802 that result in a distance between the encoding 810 obtained for the anchor 518A and the encoding 812 obtained for positive example 518B being less than a distance between the encoding 810 obtained for the anchor 518A and the encoding 814 obtained for the negative example 518C. Further, a margin distance may be specified and triplet loss may encourage a distance between the encodings 812 and 814 obtained for the positive example 518B and negative example 518C, respectively, to be at least the margin distance. In at least one embodiment, one or more neural networks (e.g., neural network 608 and MLP 606) minimizes triplet loss, such as by using one or more of the following equations: as $L(a, p, n)=\max\{d(a_i, p_i)-d(a_i, n_i)+\text{margin}, 0\}$ and $d(x_i, y_i)=\|x_i-y_i\|_p$.

In at least one embodiment, system 800 includes one or more processors is to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 800 is included in, and/or otherwise includes systems illustrated in FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, system 800 performs one or more processes illustrated in FIGS. 1-17B and/or 23, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, system 800 includes one or more hardware illustrated in FIGS. 17-22, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

Figure 9:
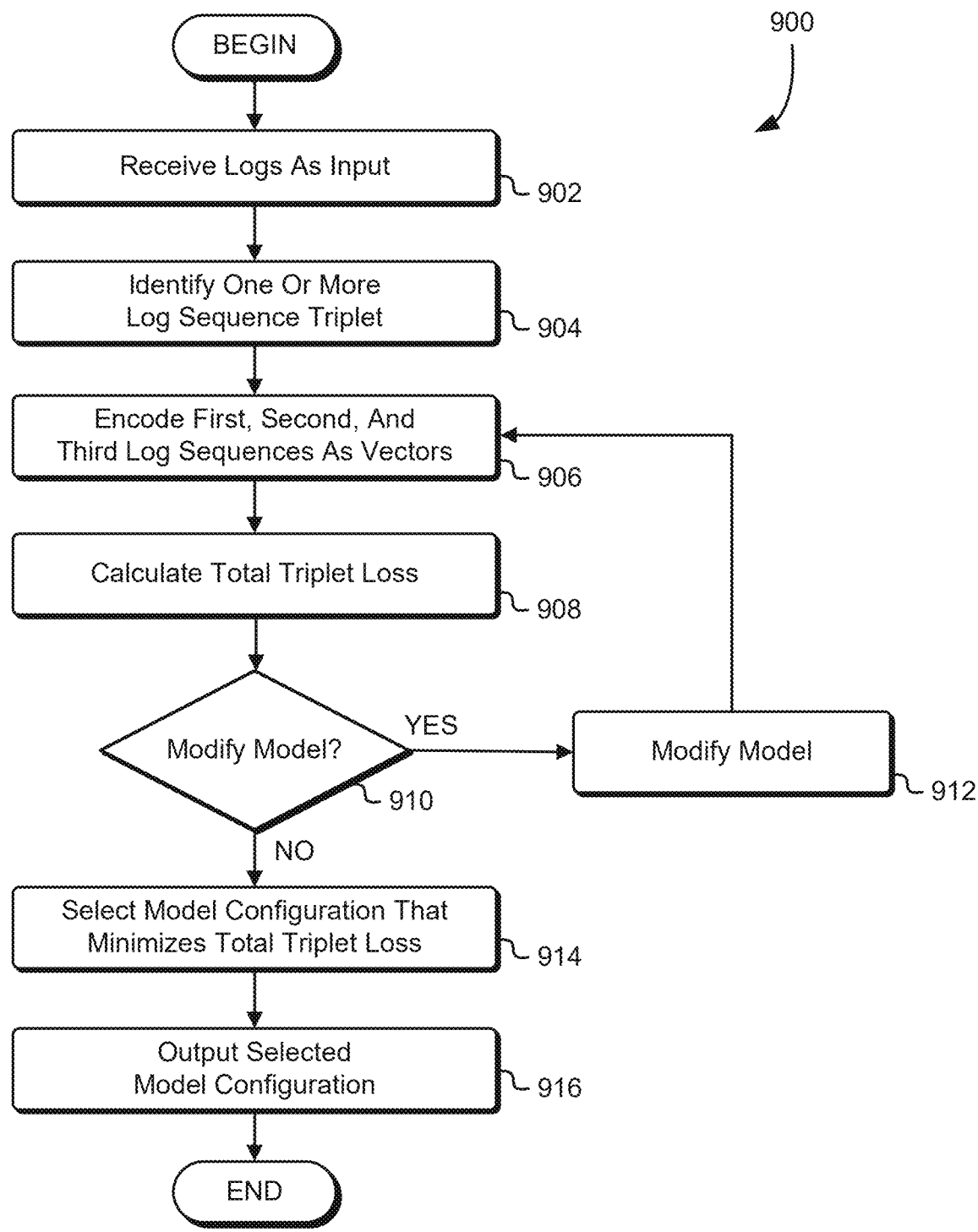
FIG. 9 is a process flow diagram illustrating training a neural network to encode at least one vector associates with a log sequence, in accordance with at least one embodiment.

FIG. 9 is a flow diagram illustrating a process 900 of training a neural network to encode at least one vector associated with a log sequence, in accordance with at least one embodiment. In at least one embodiment, process 900 begins when invoked by a processor and/or the processor receives one or more logs as input in block 902. A processor may receive one or more logs and/or one or more inputs described in connection to FIGS. 1-16 in block 902. For example, the processor may receive initial encodings $EL_1$ representing one or more logs or one or more portions thereof in block 902. Upon receiving one or more logs as input in block 902, a processor may identify at least one sequence triplet each including a first log sequence, second similar log sequence, and third dissimilar log sequence in block 904. Identifying a first log sequence, second similar log sequence, and third dissimilar log sequence in block 904 may include receiving a dataset, identifying an anchor as described with respect to and illustrated in FIG. 5-8, generating a positive example as a second similar log sequence, and generating a negative example as a third dissimilar log sequence. Identifying a first log sequence, second similar log sequence, and third dissimilar log sequence in block 904 may include receiving a triplet of log sequences, where a first sequence is identified as an anchor and from said anchor, the most similar log sequence is selected as the second similar log sequence, and the least similar log sequence to the anchor may then be identified as the third dissimilar log sequence.

Once sequence triplet(s) are identified in block 904, a processor may use a model (e.g., model 510, neural network(s) NN1, and/or the like) to encode a first, second, and third log sequences of each of the sequence triplet(s) as vectors in block 906. The encoded vectors in block 906 may each be of the same length. To encode the first, second, and third log sequences as vectors in block 906, a processor may use one or more of the operations described in FIGS. 5-8. The three encoded vectors obtained for the first, second, and third log sequences of each of the sequence triplet(s) are a response triplet.

Then, at block 910, a processor performing process 900 uses the response triplet(s) obtained in block 908 to calculate a total triplet loss for a current configuration of the model used to generate the response triplet(s) in block 908. The processor performing process 900 may calculate triplet loss for each of the response triplet(s) and aggregate (e.g., sum, average, and/or the like) the triplet loss(es) to obtain a total triplet loss. As an example, triplet loss helps ensure that a positional encoding of the first log sequence, which corresponds to an anchor, is closer to a positional encoding of the second similar sequence than a positional encoding of the anchor is to a positional encoding of the dissimilar sequence while still abiding by a margin illustrated in FIG. 8.

At decision block 910, a processor performing process 900 decides whether to modify the model (e.g., change model parameters, weights, and/or other settings). The processor may decide to modify the model if the processor determines doing so may produce better results. The decision in decision block 910 is "YES," when the processor decides to modify the model. Otherwise, the decision in decision block 910 is "NO." When the decision in decision block 910 is "YES," in block 912, the processor modifies the model and returns to block 906 to produce new encoding for the sequence triplet(s). On the other hand, when the decision in decision block 910 is "NO," the processor advances to block 914.

At block 914, a processor performing process 900 may select configuration of the model associated with a desired (e.g., minimal) amount of total triplet loss.

Upon minimizing triplet loss in block 914, a processor performing process 900 may output the selected model configuration (e.g., one or more model weights) in block 916. The selected model configuration (e.g., one or more output model weights) may then be used, for example, by neural network training module 504 (see FIG. 5) to update a neural network, such as neural network(s) NN1. Updating a neural network using the model configuration (e.g., model weight(s)) selected at block 916 may then result in an encoder trained using triplet loss obtained using one or more vector encodings, such as once a desired performance is achieved through one or more repetitions of training using blocks 906-912 of process 900. Process 900 may include generating an output of one or more model weights in block 916, providing said weights to update a neural network, repeating the process for one or more iterations, performing one or more operations described herein, and/or proceed to end. For example, the process 900 may terminate after block 916. After the model (e.g., neural network(s) NN1) is updated in accordance with the selected model configuration, the model may be used to encode log messages and/or sequences (e.g., as part of an anomaly detection pipeline).

In at least one embodiment, some or all of process 900 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program includes a plurality of computer-readable instructions executable by one or more processors. In at least one embodiment, a computer-readable storage medium is a non-transitory computer-readable medium. In at least one embodiment, at least some computer-readable instructions usable to perform process 900 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 900 is performed at least in part on a computer system such as those described elsewhere in this disclosure. In at least one embodiment, logic (e.g., hardware, software, or a combination of hardware and software) performs process 900.

In at least one embodiment, one or more processors uses process 900, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, as an example, a machine readable medium (e.g., non-transitory) having stored thereon a set of instructions, which if performed by one or more processors, cause one or more processors to perform process 900, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, process 900 is included in, and/or otherwise includes processes illustrated in FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, one or more systems illustrated in FIGS. 1-17B and/or 23 perform process 900, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein. In at least one embodiment, one or more hardware illustrated in FIGS. 17-22 use process 900, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

Figure 10:
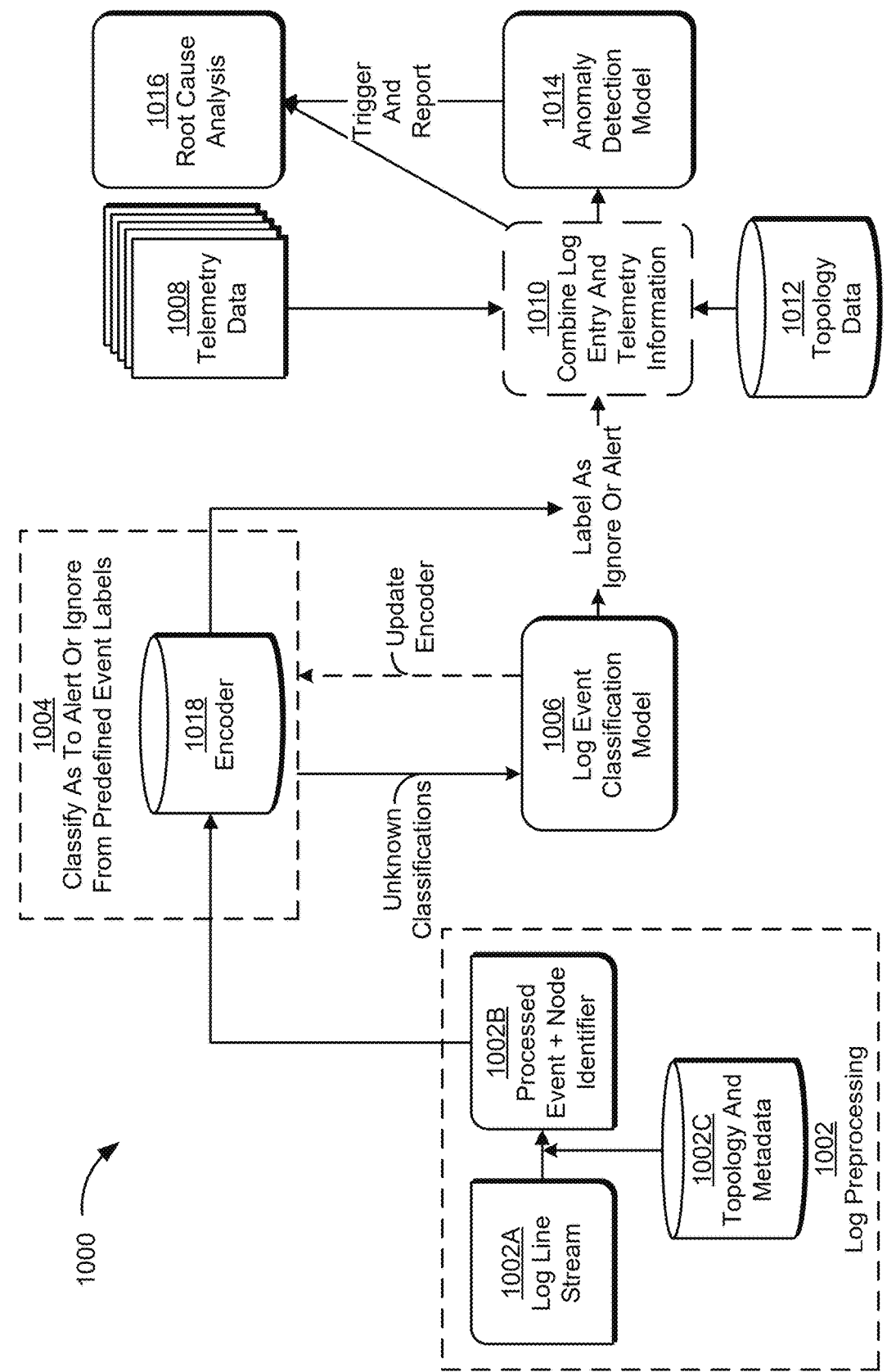
FIG. 10 is a block diagram illustrating a system performing a neural network to classify one or more logs, in accordance with at least one embodiment.

FIG. 10 is a block diagram illustrating a system 1000 performing at least one neural network (e.g., encoder(s) 114, neural network(s) NN1, neural network(s) NN2, classifier(s) 122, and/or others) to classify one or more logs, in accordance with at least one embodiment. In at least one embodiment, system 1000 includes one or more encoders described herein and one or more neural networks, such that system 1000 performs classification (e.g., classification of an anomaly) indicated or present in one or more logs. System 1000 may include one or more processors, neural network(s), encoder(s) 1018, log event classification model(s) 1006, anomaly detection model(s) 1014, one or more models to perform root cause analysis 1016, and/or combinations thereof. System 1000 may perform log preprocessing 1002, which may be implemented at least in part by preprocessing functionality 112, initial encoder functionality 113, one or more of encoder(s) 114, encoder functionality 115, and/or neural network(s) NN1. System 1000 may perform a classification operation 1004 that includes or involves encoder(s) 1018 and/or log event classification model(s) 1006. Classification operation 1004 may be implemented at least in part using classification functionality 116, and encoder(s) 1018 and/or log event classification model(s) 1006 may be implemented at least in part using neural network(s) NN2. System 1000 may perform one or more combination operation 1010, which may be implemented at least in part by aggregation functionality 117. System 1000 may perform anomaly detection model(s) 1014, model(s) to perform root cause analysis 1016, and/or one or more other models, which may be implemented, at least in part, by downstream functionality 118 and/or classifier(s) 122.

While logs may include information generated by software running on a computing system (e.g., error messages), telemetry data 1008 (e.g., provided by telemetry functionality 108) includes information about the computing system itself (e.g., bit error rate (BER), CPU utilization, memory utilization, disk I/O, temperature, etc.), for example, as the computing system executes the software. Collecting telemetry data 1008 may involve the measurement of transmissions of data from remote sources, such as physical or electrical data. Telemetry data 1008 may be collected using sensors or other devices, such as temperature sensors, counters (e.g., to count anomalous events over time), or other telemetry information described herein.

Both telemetry data 1008 and logs may include information that can be used to evaluate a computing system (a data center). If at least some types of available data when performing anomaly detection are not used, this can negatively affect the ability of downstream processes (e.g., incident prediction, root cause analysis, and/or observation generation) because useful information may be missing such that an anomaly goes undetected.

System 1000 may perform one or more processes 1100-1300, such as to combine log data and telemetry data 1008 to detect anomalies within a computing system (e.g., a data center). Furthermore, system 1000 may encode network topology data 1012 (e.g., devices, physical connections, or locations) in combination with or separate from the telemetry data 1008 and/or log data, and/or incorporate topology data 1012 into anomaly detection and/or other operations performed by system 1000.

System 1000 may perform log preprocessing 1002 encode text, numerical, and categorical (e.g., metadata) information included in and/or associated with log entries (e.g., log events). A processor performs log preprocessing 1002 (e.g., by performing preprocessing functionality 112) of one or more log entries (e.g., of a log line stream 1002A) to clean content (e.g., remove irrelevant information) and/or extract useful information before the log entries are encoded. With respect to a particular log entry of a log line stream 1002A, useful information could include time, timestamp(s), identification information, and/or one or more descriptions of the content of the particular log entry. The useful information may be extracted as parameter values (and separated to create data SD illustrated in FIG. 1). Parameter values may also be extracted from metadata, such as priority(ies) and/or message type(s) associated with a log entry (e.g., to categorize the log data). Then, system 1000 encodes (e.g., using initial encoder functionality 113) each log entry of a log line stream 1002A as a vector using the extracted parameter values (e.g., data SD). In at least one embodiment, system 1000 performs log preprocessing 1002 of a log line stream 1002A using process 1100, such as by using one or more encoders 208 (see FIG. 2). Log preprocessing 1002 includes encoding a log line stream 1002A with topology information and/or metadata obtained from topology and metadata information 1002C, such that an embedded vector represents both a log and corresponding topology and/or metadata associated with the log. Then, system 1000 generates a processed and encoded event and node identifier 1002B, which may include one or more vectors. At this point, system 1000 (e.g., performing encoder functionality 115) may encode (e.g., neural network(s) NN1) the processed and encoded event and node identifier 1002B to produce one or more vectors.

System 1000 performing classification operation 1004 (e.g., implementing classification functionality 116) may classify a processed event and node identifier 1002B (e.g., as to whether to alert or ignore a log) using pre-defined event labels, for example, to detect an anomaly. Pre-defined event labels may be associated with one or more tokens, set of characters, or characteristics of a vector representing a log such that encoder(s) 1018 may identify whether to alert or ignore a log message and/or log sequence from one or more predefined event labels for anomaly detection for an anomaly detection model 1014. Encoder(s) 1018 may include one or more encoders or neural networks described in FIGS. 1-16. However, there may be some instances in which the one or more pre-defined event labels may result in conflicting classifications or an unknown classification of a log.

A processor of system 1000 may (e.g., using encoder(s) 1018) either classify each of the encoded log entries (e.g., encoding log events), or determine that the classification of the encoded log entry is unknown. If encoder(s) 1018 are unable to classify an encoding, classification operation 1004 may use log event classification model 1006 to classify the encoding. In at least some embodiments, both encoder(s) 1018 and log event classification model 1006 may be used to determine a classification for one or more encodings. In at least one embodiment, log event classification model 1006 is, or otherwise includes an encoder 1408 trained using similarity loss with respect to one or more vector encodings. By way of non-limiting examples, the classification operation 1004 (e.g., using encoder(s) 1018) may attempt to classify each of the encoded log entries into an "alert" class or an "ignore" class. The classification operation 1004 may use events that are each predefined as belonging to the "alert" class or the "ignore" class by a domain expert to classify the encoded log entries. For example, a predefined event associated with a text descriptor "WARN," may be associated with the "alert" class. The classification operation 1004 may use this predefined event to classify an encoded log entry encoding a text descriptor "WARN," as belonging to the "alert" class. However, the classification operation 1004 may encounter a particular encoded log entry that does not match any predefined events due to the particular encoded log entry encoding new information (e.g., a new event), or matches more than one predefined event resulting in an ambiguous classification (e.g., conflicting classifications of whether to "alert" or "ignore"). For such encoded log entries, the classification operation 1004 may use log event classification model 1006 to determine their classifications.

The log event classification model 1006 may include an encoder 1408 (e.g., one or more neural networks, such as neural network(s) NN1, neural network(s) NN2, and/or classifier(s) 122) that uses semantic similarity to encode the encoded log entries (e.g., log events) to produce classified log entries. A semantic similarity encoder (e.g., LLM) may be fine-tuned without using task-specific labels. Log event classification model 1006 may generate classifications associated with encodings that may be used to update the predefined event labels (which include a set of predefined events or encodings associated with determined classifications), used by classification operation 1004 (e.g., encoder(s) 1018) to classify encodings. In this manner, encodings that were previously not associated with classifications (and were therefore unknown) may be added to the predefined event labels. Log event classification model 1006 may determine a classification and update predefined event labels to include the determined classification (e.g., whether a particular log is to be classified as alert or ignore). The encoder (e.g., neural network(s)) may be easily trained to encode one or more log entries and produce the classified log entries for different types of tasks (e.g., as input to an anomaly detection model 1014 and/or root cause analysis 1016) with minimal labeling for small sets of events. The classified log entries may be used as input to downstream processes (e.g., one or more neural networks, such as neural network(s) NN1, neural network(s) NN2, classifier(s) 122) that may further classify and/or perform other inference operations with respect to the classified log entries.

The system 1000 may fine-tune the log event classification model 1006 (e.g., neural network(s) NN1 and/or neural network(s) NN2) by using semantic similarity associated with pairs of encoded log entries and cosine similarity loss to train the log event classification model 1006. As an example, encoded log entries may encode a text descriptor (e.g., INFO or WARN) associated with an event that can be classified as a level of priority (e.g., low priority or high priority) by an anomaly detector (e.g., "INFO"=low priority, "WARN"=high priority). A pair of encoded log entries associated with a high similarity score would include a first log entry including the text descriptor "INFO," and a second log entry including another low priority descriptor. On the other hand, two log entries with a low similarity score would include a first log entry with the text descriptor "INFO," (e.g., low priority) and the second log entry having a text descriptor "WARN," (e.g., high priority). System 1000 may use a loss function (e.g., cosine similarity loss function) to generate a loss value (e.g., cosine similarity loss value) for model results obtained with respect to the two vectors of the two encoded log entries. Loss values obtained for multiple pairs of encoded log entries in a training dataset may be aggregated (e.g., totaled, average, and/or the like) and a model configuration (e.g., weight values, parameter values, and/or other settings) that produced a desired amount of loss (e.g., a minimum aggregated cosine similarity loss value) may be selected. After the log event classification model 1006 is fine-tunes, if a previously known classification (e.g., text descriptor "WARN" belongs to the "alert" class) is determined to be semantically similar to a new encoded log entry by the log event classification model 1006, the log event classification model 1006 classifies the new event similarly. Furthermore, this determination by the log event classification model 1006 can be used to further update the predefined event labels as described above. Once a log entry is encoded and classified (e.g., as "ignore" or "alert"), the combination operation 1010 combines log event information (e.g., classification obtained by the classification operation 1004) with telemetry data 1008 and topology data 1012.

Third, the combination operation 1010 combines (e.g., fuses) the classified log entries with telemetry data 1008 and/or topology data 1012, for example, using node-based fusion and aggregation. Node-based fusion and aggregation combines classified log entries, node counters (and/or node identifiers), and telemetry data 1008. For example, the features of the classified log entries, telemetry data 1008, and topology data 1012 may be combined as a joint table. As another example, the features may be combined (e.g., to combine at least one log entry, telemetry data 1008, and/or topology data 1012) by creating a joint vector representative of the set of features, and an anomaly detection model 1014 may be trained using the vector representation of the data. The joint features can be extracted by and/or used by the anomaly detection model 1014.

System 1000 may provide the one or more joint features as input to the anomaly detection model 1014, which can classify one or more of the classified log entries as anomalies. The anomaly detection model 1014 may detect where anomalies are occurring using the topology data 1012 (e.g., node identifiers). Topology data 1012 can be used for root cause analysis 1016 (RCA), such as to determine when anomalies are occurring in clustered locations (e.g., combining tables of information or creating a joint vector representation of the features). The output of the anomaly detection model 1014 may include a report, such as to generate an alert for manual operations or to be an input for root cause analysis 1016.

In at least one embodiment, system 1000 includes a collection of one or more hardware and/or software computing resources with instructions that, when executed, performs one or more communication processes such as those described herein. In at least one embodiment, system 100 is a software program executing on computer hardware, application executing on computer hardware, and/or variations thereof. In at least one embodiment, one or more processes of system 100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, system 100 uses a machine learning training framework such as PYTORCH, TENSORFLOW, BOOST, CAFFE, MICROSOFT COGNITIVE TOOLKIT/CNTK, MXNET, CHAINER, KERAS, DEEPLEARNING4J, and/or other training framework to implement and perform operations described herein to perform a neural network to classify one or more logs and/or otherwise perform operations described herein. In at least one embodiment, as an example, training a neural network model comprises use of a server (e.g., NVIDIA DGX servers) which further includes at least a GPU (e.g., AMD MI200, VEGAL10, VEGO20, AND ARCTURUS), an optimizer (e.g., ADAM OPTIMIZER), or discriminator architecture (e.g., discriminator architecture from face-vid2vid for training with GAN loss).

In at least one embodiment, system 1000 is comprised of modules (e.g., modules 1724-1730, see FIG. 17B) such that said system performs a neural network to classify one or more logs. In at least one embodiment, a module includes any combination of any type of logic (e.g., software, hardware, firmware) and/or circuitry configured to perform a function as described. In at least one embodiment, a module includes one or more circuits that form part of a larger system (e.g., an integrated circuit (IC), system on-chip (SoC), central processing unit (CPU), graphics processing unit (GPU), data processing unit (DPU), etc.). In at least one embodiment, a controller includes any combination of any type of logic (e.g., software, hardware, firmware) and/or circuitry configured to perform a function as described. In at least one embodiment, software includes software packages, code, programming language, drivers, instructions, instruction sets, or some combination thereof. In at least one embodiment, hardware includes hardwired circuits, programmable circuits, state machine circuits, fixed function circuits, execution unit circuits, firmware with stored instructions executed by programmable circuits, or some combination thereof.

In at least one embodiment, system 1000 includes one or more logic units. In at least one embodiment, a logic unit includes firmware logic, hardware logic, or some combination thereof configured to provide any function as described further herein. In at least one embodiment, a logic unit includes circuitry that forms part of a larger system (e.g., IC, SoC, CPU, GPU, DPU). In at least one embodiment, a logic unit includes logic circuitry for implementation of firmware and/or hardware to perform a neural network to classify one or more logs.

In at least one embodiment, system 1000 includes one or more engines. In at least one embodiment, an engine includes a module and/or logic unit as described further herein. In at least one embodiment, a component includes a module and/or logic unit as described further herein. In at least one embodiment, an engine includes software logic, firmware logic, hardware logic, or some combination thereof configured to provide any function as described further herein. In at least one embodiment, a component includes software logic, firmware logic, hardware logic, or some combination thereof configured to provide any function as described further herein. In at least one embodiment, operations performed by hardware and/or firmware may alternatively be implemented via a software module, which may be embodied as a software package, code and/or instruction set. In at least one embodiment, a logic unit may also utilize a portion of software to implement its function.

In at least one embodiment, system 1000 includes one or more processors is to classify one or more log entries to obtain one or more classified log entries; to obtain combined information at least in part by combing at least the one or more classified log entries and telemetry data 1008; to use at least one machine learning process to classify the combined information; and/or is to otherwise perform operations described herein. In at least one embodiment, system 1000 is included in, and/or otherwise includes systems illustrated in FIGS. 1-17B and/or 23 to classify one or more log entries to obtain one or more classified log entries; to obtain combined information at least in part by combing at least the one or more classified log entries and telemetry data 1008; to use at least one machine learning process to classify the combined information; and/or is to otherwise perform operations described herein. In at least one embodiment, system 1000 performs one or more processes illustrated in FIGS. 1-17B and/or 23, such as to classify one or more log entries to obtain one or more classified log entries; to obtain combined information at least in part by combing at least the one or more classified log entries and telemetry data 1008; to use at least one machine learning process to classify the combined information; and/or is to otherwise perform operations described herein. In at least one embodiment, system 1000 includes one or more hardware illustrated in FIGS. 17-22, such as to classify one or more log entries to obtain one or more classified log entries; to obtain combined information at least in part by combing at least the one or more classified log entries and telemetry data 1008; to use at least one machine learning process to classify the combined information; and/or is to otherwise perform operations described herein.

Figure 11:
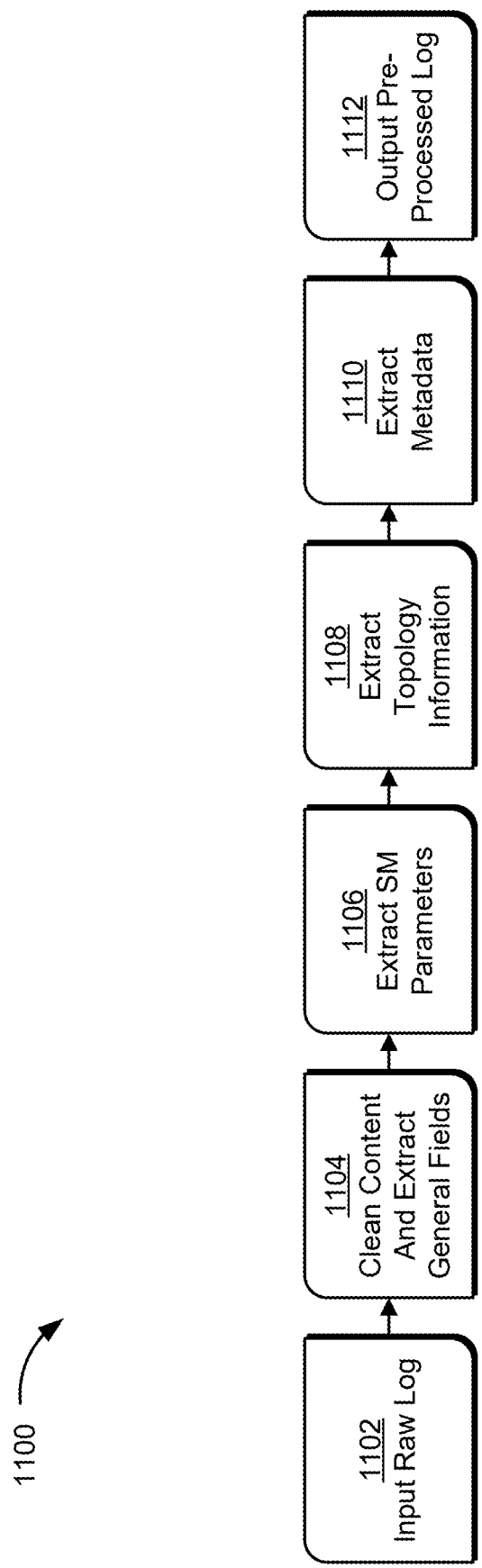
FIG. 11 illustrates an exemplary process to classify at least one log by combing log information and telemetry information, in accordance with at least one embodiment.

FIG. 11 illustrates an exemplary process 1100 to preprocess at least one log, in accordance with at least one embodiment. Process 1100 is an exemplary process and a processor may otherwise perform content cleaning (e.g., removing numbers, special characters and/or separating camel-cased words). In at least one embodiment, preprocessing functionality 112 and/or initial encoder functionality 113 performs process 1100. As an example, a processor performs process 1100 on one or more logs produced by a subnet manager (SM) used to perform computer networking (e.g., InfiniBand (IB) networking). One or more processors may perform process 1100, such as to perform log preprocessing 1002. In at least one embodiment, log-preprocessing may include using an encoder 208 and/or 308 (see FIGS. 2 and/or 3). A process 1100 may include obtaining (as input) one or more raw logs 1102 (e.g., log entry of an InfiniBand (IB) network), cleaning content and extracting general fields 1104 (e.g., features), extracting subnet manager (SM) parameters 1106 (e.g., OpenSM parameters), extracting topology information 1108, extracting metadata 1110, outputting preprocessed log 1112, or combinations thereof.

An input raw log 1102 may otherwise be a log prior to preprocessing, such that portions of the log message may or may not be removed while undergoing preprocessing. Process 1100 may also include cleaning (e.g., removing) punctuation, numbers, and/or special characters when cleaning content and extracting general fields 1104. For example, log-preprocessing process 1100 may include extracting one or more parameters, where one or more parameters may be ignored, such as to create a fixed vocabulary. A processor performing process 1100 may then obtain or extract topology information related to one or more logs, such as from topology and metadata information 1002C, and proceed to extract metadata 1110, such as metadata from topology and metadata information 1002C. One or more other steps of encoding and/or preprocessing of log information described in FIGS. 1-16 may otherwise be included in process 1100 to generate an output of a preprocessed log 1112, such as to be used by system 1000.

In at least one embodiment, one or more processors uses process 1100, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, as an example, a machine readable medium (e.g., non-transitory) having stored thereon a set of instructions, which if performed by one or more processors, cause one or more processors to perform process 1100, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, process 1100 is included in, and/or otherwise includes processes illustrated in FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, one or more systems illustrated in FIGS. 1-17B and/or 23 perform process 1100, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, one or more hardware illustrated in FIGS. 17-22 use process 1100, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein.

Figure 12:
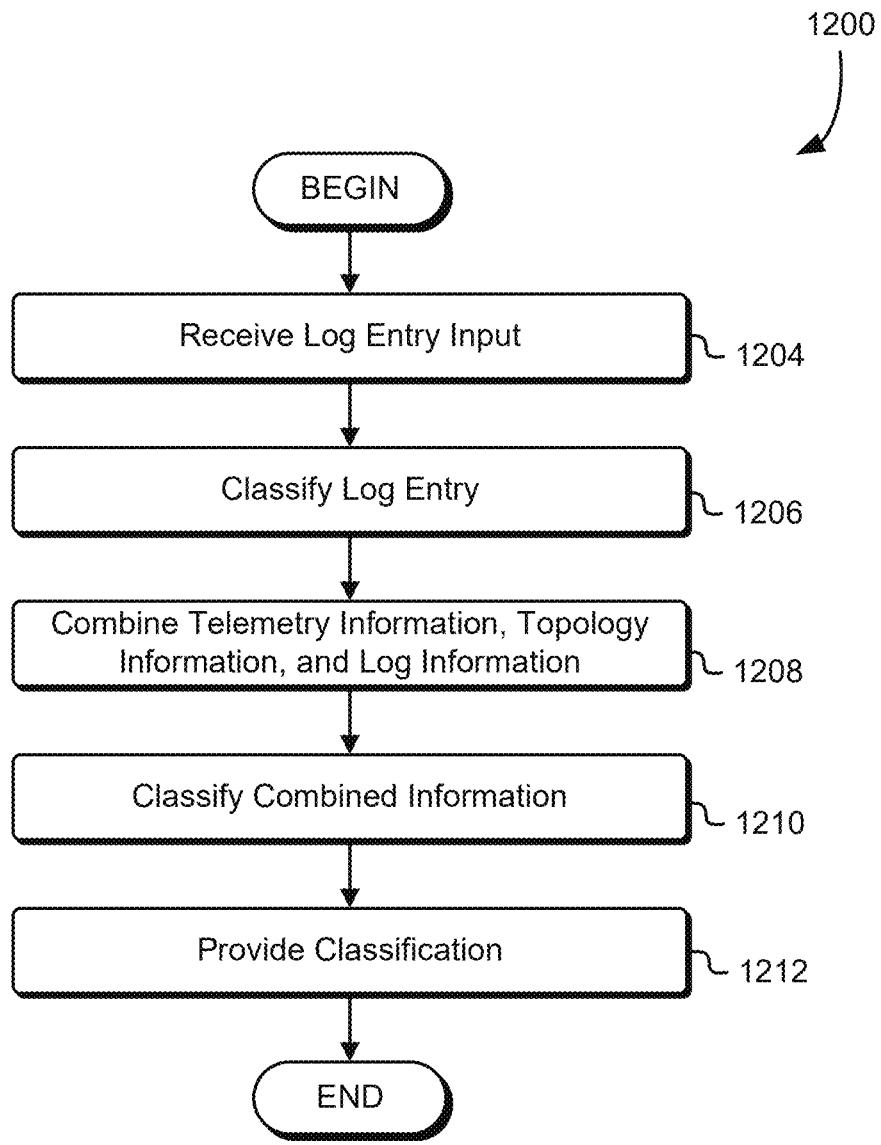
FIG. 12 is a process flow diagram illustrating providing a classification of one or more log messages, in accordance with at least one embodiment.

FIG. 12 is a process 1200 flow diagram illustrating providing a classification of one or more log messages, in accordance with at least one embodiment. In at least one embodiment, process 1200 begins when invoked by one or more processors and/or one or more processors receives a log entry input at block 1204.

Anomalies in communication networks occur at different levels and in different modalities. For example, anomalies can occur through log data produced by network devices or through a telemetry stream generated from counters which measure different properties such as temperature and bit error rate (BER). In addition, the underlying network topology may play a role in relating detected anomalies to network behavior and evaluating their impact. While each modality may produce a vast amount of data, each modality can provide an incomplete view of the system, and consequently an incomplete input for anomaly detection. Reasoning over and integrating large amounts of data from multiple modalities is important for accurately detecting anomalies and for finding anomalies that actually impact network behavior.

A processor performing process 1200 incorporates log, telemetry data, and topology data into anomaly detection. Process 1200 may include fusing log information, telemetry information and network topology for detecting anomalies in communication networks. Process 1200 may include processing one or more log lines, then extracting and mapping one or more classification obtained based at least in part on the log line(s) to at least one unique node identifier. Process 1200 may include relating logs with node telemetry. In at least one embodiment, a processor performing process 1200 classifies (e.g., using classification operation 1004) one or more log entries in block 1206 based, at least in part, on using one or more of encoder(s) 1018 to classify the log entry input received at block 1204 (e.g., as to alter or ignore) based at least in part on one or more predefined event labels and/or using log event classification model(s) 1006 to classify the log entry input received at block 1204. As an example, if the event was not previously labeled (due to ambiguity or in case of a new, unseen event), the log event classification model(s) 1006 predicts its label in block 1206. In block 1206, the classification of events may rely on a pre-defined labels and/or log event classification model(s) 1006. In block 1206, the classification output can be further used to update (such as offline after inspection by a domain expert) the pre-defined labels, which may be stored in a database.

Then, one or more processors performing process 1200 may combine telemetry information, topology information, and log information in block 1208. In block 1208, processor(s) may fuse the classified log events and node counters and perform joint feature extraction and anomaly detection. Information may be combined as a table in block 1208 and/or a vector may be generated corresponding the combined telemetry information, topology information, and log information in block 1208 such that anomaly detection model 1014 is trained from said combined vector. As an example, vectors described herein may otherwise be an N-th dimensional tensor.

Processor(s) performing process 1200, upon combining telemetry information, topology information, and log information in block 1208, may then proceed to classify said combined information in block 1210. In block 1208, one or more log events may be classified by processor(s) as important or non-important (alert or ignore, respectively). In at least one embodiment, combined information may be classified to determine an anomaly classification, one or more incident predictions, an identified root cause, a generated observation, and/or one or more indications of information. Using the network topology, processor(s) performing process 1200 may identify anomaly clusters and classify anomalies by their topological properties (e.g., an anomaly involving physically close nodes). The output may include providing one or more classifications in block 1212 and/or a report, which can generate alerts for manual operators or used as input for root cause analysis. As an example, process 1200 may be performed for anomaly detection in InfiniBand (IB) networks, ethernet networks, and/or generating an input for root cause analysis in communications networks.

A processor may measure performance of performing process 1000. One or more measurements of performance of said process 1000 may include a measurement for precision, recall, or one or more generated scores. As an example, precision may be measured as a score of how many of one or more predicted events are positive (e.g. anomaly) are actually positives (e.g., number of true positive values divided by the sum of true positives and false positives). As an example, a score for recall may measure how many of the actual positive cases were predicted correctly with a model (e.g. number of true positive values divided by the sum of true positives and false negatives). A measure of performance may also include an F1 score, the harmonic mean of recall and precision. A metric of performance may include term frequency (TF), the frequency of a particular term relative to the document. Examples of frequency measurements may include: raw count, normalized count, log-scale count, or other measurements of frequency. Inverse document frequency (IDF) may include how common (or uncommon) a term t is in a corpus D with N documents. As an example, TF-IDF includes multiplication of TF and IDF values (e.g., importance of a term is inversely related to its frequency across documents). As an example, a possible measurement of performance of one or more models used in association with process 1200 may include $$idf(t, D) = \log\left(\frac{N}{\text{count}(d \in D : t \in d)}\right).$$

As an example, process 1200 may include using one or more tokenizers, such as a wordpiece tokenizer. A wordpiece tokenizer may include setting characters and symbols into its base vocabulary first. Instead of relying on the frequency of the pairs, WordPiece may include choosing the one that maximizes the training data's likelihood. As an example, the rare word "datablockscanner" is split into more frequent subwords: {"data", "block", "scan", "ner"}. In this way, the number of OOV words can be reduced and their meanings can be captured. WordPiece may handle the OOV words and potentially reduce the vocabulary's size.

In at least one embodiment, some or all of process 1200 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program includes a plurality of computer-readable instructions executable by one or more processors. In at least one embodiment, a computer-readable storage medium is a non-transitory computer-readable medium. In at least one embodiment, at least some computer-readable instructions usable to perform process 1200 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 1200 is performed at least in part on a computer system such as those described elsewhere in this disclosure. In at least one embodiment, logic (e.g., hardware, software, or a combination of hardware and software) performs process 1200.

In at least one embodiment, one or more processors uses process 1200, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, as an example, a machine readable medium (e.g., non-transitory) having stored thereon a set of instructions, which if performed by one or more processors, cause one or more processors to perform process 1200, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, process 1200 is included in, and/or otherwise includes processes illustrated in FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, one or more systems illustrated in FIGS. 1-17B and/or 23 perform process 1200, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, one or more hardware illustrated in FIGS. 17-22 use process 1200, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein.

Figure 13:
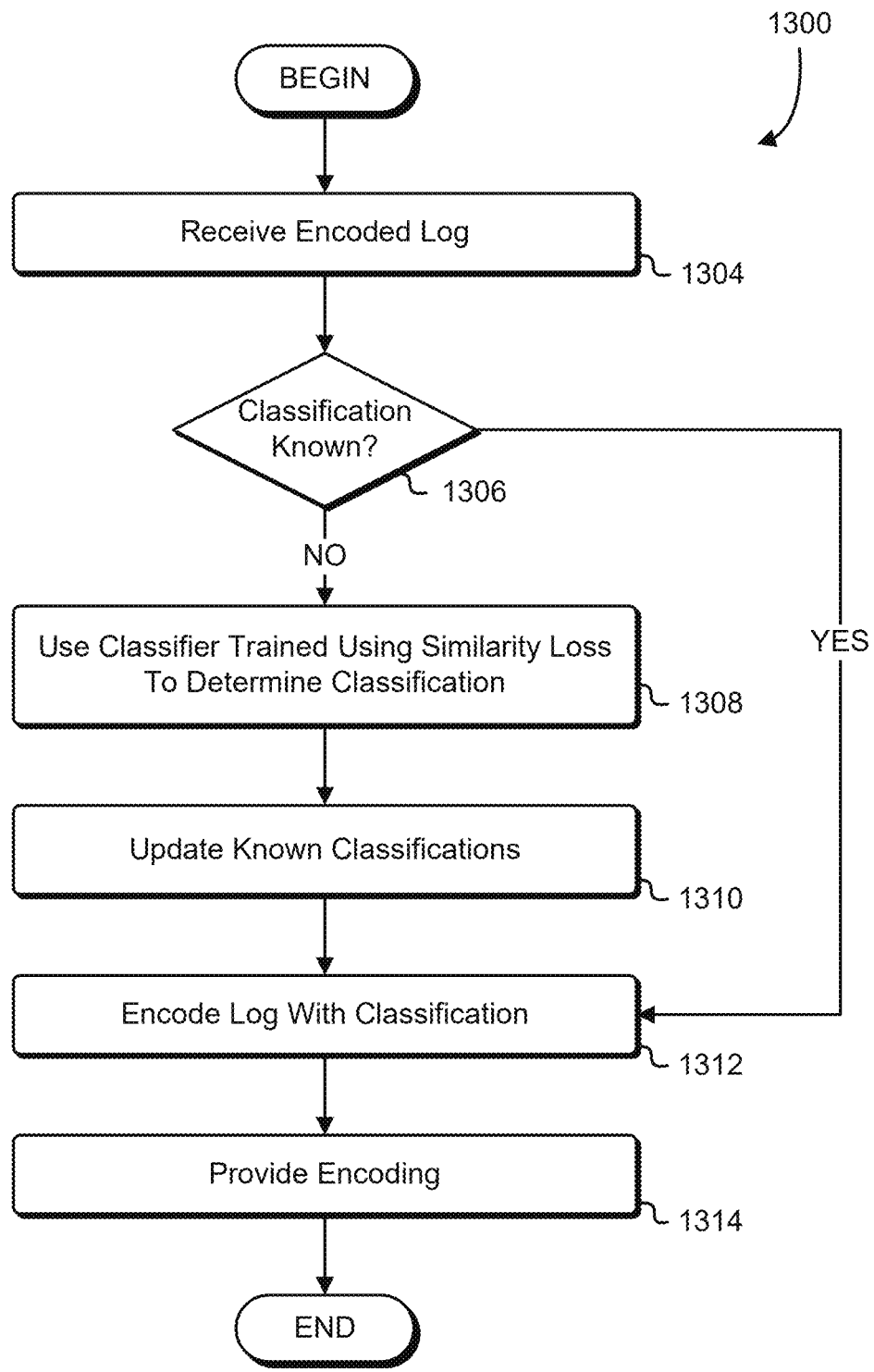
FIG. 13 is a process flow diagram illustrating classifying one or more logs, at least in part, by an encoder using similarity loss to determine a classification, in accordance with at least one embodiment.

FIG. 13 is a flow diagram illustrating a process 1300 of classifying one or more logs, in accordance with at least one embodiment. Processor(s) performing process 1300 may receive an encoded log in block 1304, use a classifier to determine a classification in block 1308, update one or more known classification (e.g., predefined event labels) (e.g. used by an encoder) in block 1310, encode one or more logs with a classification in block 1312, provide an encoding in block 1314, and/or perform one or more operations described herein, or combinations thereof. In at least one embodiment, a processor begins process 1300 when invoked and/or the processor receives an encoded log in block 1304. In at least one embodiment, process 1300 is performed by encoder(s) 1018 and/or log event classification model(s) 1006.

Upon receiving the encoded log in block 1304, a processor proceeds to decision block 1306. In at least one embodiment, a decision in decision block 1306 is "YES," if a classification of a log is known, otherwise a decision in decision block 1306 is "NO." If a decision in decision block 1306 is "YES," a processor performing process 1300 encodes one or more logs with the known classification in block 1312. As an example, a classification is known if a classification is included in one or more predefined event labels. As an example, a classification is unknown if an encoded log does not match or correspond to a predefined event label or if the predefined event label include conflicting classifications for the encoded log. If a decision in decision block 1306 is "NO," a processor performing process 1300 proceeds to block 1308 to use one or more classifiers to determine a classification based, at least in part, on having been trained using similarity loss determined for model results obtained for two or more vector encodings, such as encoder 1408 and/or log event classification model 1006. For example, processor(s) performing process 1300 may use a classifier trained to determine a classification based, at least in part, on similarity loss (e.g., cosine similarity loss) with regard to model results obtained for two or more vector encodings. For example, the model may be trained using process 1600. For example, system 1400 and/or system 1500 may use a classifier trained based, at least in part, on similarity loss (e.g., cosine similarity loss) calculated with respect to model results obtained for two or more vector encodings to determine a classification in block 1308.

Processor(s) performing process 1300, after using a classifier to determine a classification in block 1308, may proceed to block 1310 to update one or more known classifications (e.g., predefined event labels) used by classification operation 1004 (e.g., using encoder 1018, see FIG. 10). As an example, processor(s) may update one or more known classifications of an encoder in block 1310 offline and/or by submitting the classification(s) obtained in block 1308 to a domain supervisor for review who may update the known classification(s). After block 1310, processor(s) performing process 1300 may proceed to block 1312 to encode a log (e.g., encoded log received at block 1304) with the classification determined in block 1308. In block 1312 the log (e.g., encoded log received at block 1304) may be encoded to include a classification of to alert, to ignore, for review, and/or other indications of information included in, associated with, and/or inferred from the log.

Upon encoding one or more logs with one or more classifications (e.g., encodings) in block 1312, processor(s) performing process 1300 may proceed to block 1314 whereat the processor(s) provide an encoding (e.g., to one or more processors, process(es), service(s), etc.) as an output to process 1300. At block 1314, processor(s) performing process 1300 may provide the encoding including the classification obtained in block 1308, perform one or more operations described herein, iterate through one or more steps in process 1300, combinations thereof, otherwise perform operations described herein, and/or end. In at least one embodiment, process 1300 terminates after block 1314.

In at least one embodiment, some or all of process 1300 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program includes a plurality of computer-readable instructions executable by one or more processors. In at least one embodiment, a computer-readable storage medium is a non-transitory computer-readable medium. In at least one embodiment, at least some computer-readable instructions usable to perform process 1300 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 1300 is performed at least in part on a computer system such as those described elsewhere in this disclosure. In at least one embodiment, logic (e.g., hardware, software, or a combination of hardware and software) performs process 1300.

In at least one embodiment, one or more processors uses process 1300, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, as an example, a machine readable medium (e.g., non-transitory) having stored thereon a set of instructions, which if performed by one or more processors, cause one or more processors to perform process 1300, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, process 1300 is included in, and/or otherwise includes processes illustrated in FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or is to otherwise perform operations described herein.

In at least one embodiment, one or more systems illustrated in FIGS. 1-17B and/or 23 perform process 1300, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, one or more hardware illustrated in FIGS. 17-22 use process 1300, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein.

FIG. 14 is a block diagram illustrating a system 1400 including encoder(s) 1408 trained to generate an encoding of one or more logs based, at least in part, on similarity loss, in accordance with at least one embodiment. In at least one embodiment, system 1400 includes one or more processors 1406, encoder(s) 1408 trained using similarity loss, and/or one or more downstream applications 1414. One or more of downstream application(s) 1414 may include anomaly detection 1414A (e.g., by performing anomaly detection model 1014, see FIG. 10), incident prediction 1414B, root cause analysis 1414C (e.g., root cause analysis 1016, see FIG. 10), observation generation 1414D, and/or performing one or more of classifier(s) 122. In at least one embodiment, processor 1406 includes processor 1722 (see FIG. 17). The encoder(s) 1408 may include one or more of the neural network(s) NN1, one or more of the neural network(s) NN2, and/or one or more of the classifier(s) 122.

An input 1402 may include one or more inputs 102, 202, 302, and/or 1502 (see FIGS. 1, 2, 3, and/or 15). An input 1402 may include one or more logs, log lines, log sequences, tokens representing one or more log event encodings 612 and position encodings 614, logs 702 and/or embedded vector 704, log line stream 1002A, an input of a raw log 1102, log line 1404, log line pairs, and/or other inputs described herein (see FIGS. 1-16). One or more logs 104 may include information such as text data 104A (e.g., text data 206A and/or 306A), numerical data 104B (e.g., numerical data 206B and/or 306B), and/or categorical data 104C (e.g., categorical data 206C and/or 306C). An input 1402 may include topology information, telemetry information, and/or metadata.

System 1400 may perform process 1600, such as to fine-tune a neural network to encode logs using similarity scores. Because the fine-tuned neural network is trainable without task-specific labels, the neural network may easily be trained to encode logs for different types of tasks (e.g., as input for other neural networks and/or machine learning processes) with minimal labeling for small sets of events. System 1400 may fine-tune encoder(s) 1408 using semantic similarity with respect to a number of pairs of log entries using cosine similarity loss. After the encoder(s) 1408 is/are trained, results of the encoder(s) 1408 may be used as input to downstream processes (e.g., one or more neural networks) that may classify the encoded log entries. For example, encoder(s) 1408 may be log event classification model(s) 1006, which may classify input as "ignore" or "alert." If a previously unseen log entry is encoded, the log event classification model 1006 may classify the encoded unseen log entry in the same class as a similar previously seen and encoded log entry. Thus, unlike with self-supervised learning, a fixed vocabulary is not required. System 1400 includes encoder(s) 1408 trained using similarity loss, such as an encoder trained by system 1500. Encoder(s) 1408 (e.g., encoder 1512) trained using similarity loss may generate one or more outputs 1410, such as a generated semantic encoding 1412. A semantic encoding 1412 may include a vector encoding (e.g., tensor). Generated semantic encoding 1412 may be associated with a similarity (e.g., expressed as a similarity score) to one or more logs or indicate information of whether to alter or ignore a log line for anomaly detection, such as with log event classification model 1006. Generated semantic encoding 1412 may be used in connection with one or more of the described downstream applications 1414.

In at least one embodiment, system 1400 includes a collection of one or more hardware and/or software computing resources with instructions that, when executed, performs one or more communication processes such as those described herein. In at least one embodiment, system 100 is a software program executing on computer hardware, application executing on computer hardware, and/or variations thereof. In at least one embodiment, one or more processes of system 100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, system 100 uses a machine learning training framework such as PYTORCH, TENSORFLOW, BOOST, CAFFE, MICROSOFT COGNITIVE TOOLKIT/CNTK, MXNET, CHAINER, KERAS, DEEPLEARNING4J, and/or other training framework to implement and perform operations described herein to train a neural network to encode at least one vector associated with a log and/or otherwise perform operations described herein. In at least one embodiment, as an example, training a neural network model comprises use of a server (e.g., NVIDIA DGX servers) which further includes at least a GPU (e.g., AMD MI200, VEGAL10, VEGO20, AND ARCTURUS), an optimizer (e.g., ADAM OPTIMIZER), or discriminator architecture (e.g., discriminator architecture from face-vid2vid for training with GAN loss).

In at least one embodiment, system 1400 is comprised of modules (e.g., modules 1724-1730, see FIG. 17B) such that said system performs a neural network to train a neural network to encode at least one vector associated with a log. In at least one embodiment, a module includes any combination of any type of logic (e.g., software, hardware, firmware) and/or circuitry configured to perform a function as described. In at least one embodiment, a module includes one or more circuits that form part of a larger system (e.g., an integrated circuit (IC), system on-chip (SoC), central processing unit (CPU), graphics processing unit (GPU), data processing unit (DPU), etc.). In at least one embodiment, a controller includes any combination of any type of logic (e.g., software, hardware, firmware) and/or circuitry configured to perform a function as described. In at least one embodiment, software includes software packages, code, programming language, drivers, instructions, instruction sets, or some combination thereof. In at least one embodiment, hardware includes hardwired circuits, programmable circuits, state machine circuits, fixed function circuits, execution unit circuits, firmware with stored instructions executed by programmable circuits, or some combination thereof.

In at least one embodiment, system 1400 includes one or more logic units. In at least one embodiment, a logic unit includes firmware logic, hardware logic, or some combination thereof configured to provide any function as described further herein. In at least one embodiment, a logic unit includes circuitry that forms part of a larger system (e.g., IC, SoC, CPU, GPU, DPU). In at least one embodiment, a logic unit includes logic circuitry for implementation of firmware and/or hardware to perform a neural network to train a neural network to encode at least one vector associated with a log.

In at least one embodiment, system 1400 includes one or more engines. In at least one embodiment, an engine includes a module and/or logic unit as described further herein. In at least one embodiment, a component includes a module and/or logic unit as described further herein. In at least one embodiment, an engine includes software logic, firmware logic, hardware logic, or some combination thereof configured to provide any function as described further herein. In at least one embodiment, a component includes software logic, firmware logic, hardware logic, or some combination thereof configured to provide any function as described further herein. In at least one embodiment, operations performed by hardware and/or firmware may alternatively be implemented via a software module, which may be embodied as a software package, code and/or instruction set. In at least one embodiment, a logic unit may also utilize a portion of software to implement its function.

In at least one embodiment, system 1400 includes one or more processors to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1400 is included in, and/or otherwise includes systems illustrated in FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1400 performs one or more processes illustrated in FIGS. 1-17B and/or 23, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1400 includes one or more hardware illustrated in FIGS. 17-22, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

FIG. 15 is a block diagram illustrating a system 1500 to train one or more encoders based, at least in part, on cosine similarity loss, in accordance with at least one embodiment. In at least one embodiment system 1500 trains an encoder 1512, such as a log event classification model 1006 and/or one or more of encoder (s)1408 using similarity loss. In at least one embodiment, system 1500 implements classification functionality 116 (see FIG. 1).

System 1500 may create a training dataset 1504 of log line pairs 1504A and associated similarity scores 1504B. Each pair of log entries (e.g., log line pairs 1504A) can be assigned one of similarity scores 1504B, using, for example, domain knowledge, and/or terms included in the log entries. As an example, log line pair 1510 including log line 1510A and 1510B is preprocessed (e.g., using log preprocessing 1002) before assigning a similarity scores, such as to clean content (e.g., remove irrelevant information) and/or extract useful information. Useful information could include time, a timestamp, identification information, and/or descriptions of the content of a log entry. The useful information is extracted as parameter values. Parameter values may also be extracted from metadata, such as an event's priority or message type. Then, each log entry is encoded as a vector using the extracted parameter values. At this point, the encoded log entries and associated similarity scores may be used to fine-tune a neural network.

For each log line pair 1510, the associated similarity score 1504B indicates a level of similarity between two log entries, log line 1510A and 1510B (e.g., log events). As an example, the similarity score 1504B may be a value within a range of values (e.g., 1-5) and may be used to rank similarity between different pairs of log entries (e.g., log line 1510A and 1510B). Continuing from this example, a similarity score 1504B of 5 may indicate most similar (e.g., identical) log lines 1510 and a similarity score of 1 could indicate less similar (e.g., opposite) log lines 1510. As an example, a log line 1510 (e.g., a log entry) may include a text descriptor (e.g., INFO or WARN) associated with an event that can be classified as a level of priority (e.g., low priority or high priority) by an anomaly detector (e.g., "INFO"=low priority, "WARN"=high priority). As an example, two log line 1510A and 1510B entries with a high similarity score may include a first log entry including the text descriptor "INFO," and a second log entry including another low priority descriptor. As another example, two log lines 1510A and 15010B entries with a low similarity score 1504B would include a first log line 1510A entry with the text descriptor "INFO," (e.g., low priority) and the second log line 1510B entry having a text descriptor "WARN," (e.g., high priority).

During training and/or fine-tuning, a neural network (e.g., encoder 1512) may receive as input 1502 a vectorized training dataset 1504 including pairs of log entries (e.g., log line pairs 1504A) with their associated similarity scores 1504B. The encoder 1512 may encode the log line pair 1510 to obtain two vector encodings 1516A and 1516B of the log lines 1510A and 1510B, respectively. Processor 1506 may use the vector encodings 1516A and 1516B to perform a loss function (a cosine similarity loss function) that generates a loss value (e.g., a cosine similarity loss). The encoder 1512 may encode each of log line pairs 1504A in the training dataset 1504 for a number of different configurations of encoder 1512 (e.g., different sets of parameter values, weight values, etc.). For each these configurations of encoder 1512, processor 1506 obtains aggregate loss values by aggregating (e.g., totaling, averaging, etc.) the loss values obtained for the log line pairs 1504A, obtains aggregate similarity scores by aggregating (e.g., totaling, averaging, etc.) the similarity scores associated with the log line pairs 1504A, compares the aggregate loss values with the aggregate similarity scores, and selects a configuration that resulted in a minimum difference between the aggregate loss values and the aggregate similarity scores. The selected configuration may be used by the encoder 1512 when deployed, such as by performing back-propagation to update one or more neural network weights and subsequently using encoder 1512 to perform one or more inference operations.

As an example, cosine similarity loss 1518 is calculated using the cosine($\Theta$) of two vectors. The neural network encoder 1512 may encode the vectorized log line pairs into vector encodings 1516A and 1516B, and calculate their cosine similarity loss 1518 with respect to the vector encodings 1516A and 1516B. Next, the cosine similarities (e.g., cosine similarity loss 1518) may be compared to the similarity scores 1504B associated with the log line pair 1510. The processor 1506 may generate an output 1520, such as a fine-tuned encoder 1522 having a selected configuration determined using similarity loss. The configuration of fine-tuned encoder 1522 (e.g., one or more model weight values) may be selected by identifying the configuration that resulted in a smaller difference between the cosine similarities and the similarity scores associated with the log line pair 1510.

After the configuration (e.g., model weights) of encoder 1512 are determined, the encoder 1512 may be deployed and used to infer encodings for vectorized log entries. These encodings may be provided to one or more other processes, such as one or more other neural networks (e.g., anomaly detection model 1014). For example, the encodings may be provided to a neural network trained to detect anomalies that may infer whether each encoding indicates an anomaly was or was not recorded in each log.

As an example, the encoder 1512 can provide encoded log entries to an anomaly detection model 1014 to classify whether a log entry (e.g., log event) is dissimilar enough from other log entries (e.g., log events) to qualify as an anomaly. Information included in log events can vary and change over time. Thus, a model may come across a new log entry or a variation of an existing log entry that the model was not previously trained on (referred to as an unseen log entry). The encoder 1512 trained using similarity loss as described herein may generate a vector encoding for a new log entry and processor 1506 may calculate cosine similarity loss between the vector encoding generated for the new log entry and vector encodings associated with log entries having known classifications. The processor 1506 may assign, to the new log entry, the classification associated with a log entry with which the new log entry had the smallest cosine similarity loss. The value of the cosine similarity loss may be used to determine whether to alert or ignore a domain expert (e.g., if the cosine similarity loss is larger than a threshold value). For example, if the domain expert indicates a log entry is to be assigned a first encoding (e.g., classification) and the encoder 1512 generates a second encoding, a magnitude of a loss value (e.g., cosine similarity loss) between the first and second encodings may be used to determine whether to alert the domain expert or ignore the domain expert's encoding. For example, the domain expert may be ignored if the loss value exceeds a first threshold value and/or alerted if the loss value exceeds a second threshold value.

The domain expert's returned classification of the previously unseen log entry (e.g., log event) may further be used to refine (e.g., back propagate) the encoder 1512 and/or an anomaly detection model (e.g., by updating weight values and/or other configuration settings of the encoder 1512 and/or an anomaly detection model), such as by using the similarity score between the new log entry and other log entries to refine the encoder 1512 and/or an anomaly detection model. For example, the classification provided by the domain expert may be paired with one or more log lines, a similarity score added to similarity scores 1504B for each newly added pair, and the new pairs added to the log line pairs 1504A in the training dataset 1504. The classification provided by the domain expert may be added to the predefined event labels and used by classification operation 1004 (e.g., encoder(s) 1018).

In at least one embodiment, system 1500 includes one or more processors to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1500 is included in, and/or otherwise includes systems illustrated in FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1500 performs one or more processes illustrated in FIGS. 1-17B and/or 23, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, system 1500 includes one or more hardware illustrated in FIGS. 17-22, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

FIG. 16 is a flow diagram illustrating a process 1600 of training and/or fine-tuning a model (e.g., neural network(s) NN1, neural network(s) NN2, encoder 1512, log event classification model 1006, and/or the like), in accordance with at least one embodiment. Processor(s) performing process 1600 may receive a training dataset including encoded log pairs associated with similarity scores input at block 1604, obtain a similarity score and encoded log pair from the training dataset in block 1606, use the model to generate first and second vector encodings based at least in part on the encoded log pair in block 1607, generate a similarity loss between the first and second vector encodings in block 1608, determine, after all of the pairs in the training set have been encoded, one or more metrics to indicate similarity between the pairs in block 1614, select a model configuration based on metric(s) determined for one or more different model configurations in block 1620, and/or perform one or more operations described herein, or combinations thereof. In at least one embodiment, a processor invokes a process 1600 and/or receives a training dataset input (e.g., training dataset 1504) in block 1604. In at least one embodiment, process 1600 is performed by system 1500 to train the encoder 1512. A training dataset received as input in block 1604 may include one or more of log line pairs 1054A and one of similarity scores 1504B corresponding to each of the pair(s).

A processor (e.g., processor 1506) performing process 1600 upon receiving the training dataset input in block 1604 may obtain a similarity score (from similarity scores 1504B) and associated encoded log pair (e.g., log line pair 1510) from the training dataset in block 1606. Then, in block 1607, a processor may use the model to generate a pair of inference results (e.g., first and second vector encodings 1516A and 1516B) based at least in part on the encoded log pair obtained in block 1606. Next, in block 1608, a processor may generate similarity loss (e.g., cosine similarity loss 1518) between first and second inference results of the pair of inference results. Then, at block 1610, a processor determines a metric (e.g., to measure performance) to indicate a similarity between the similarity score and similarity loss, such as a score, a vector, an integer, and/or other indication of the metric. In at least one embodiment, the process 1600 may include providing the metric, to processor(s), process(es), and/or service(s), performing one or more operations described herein.

Then, at decision block 1612, a processor decides whether the training dataset includes more encoded log pairs. The decision at decision block 1612 is "YES," when the training dataset includes more encoded log pairs. Otherwise, the decision at decision block 1612 is "NO." When the decision at decision block 1612 is "YES," a processor returns to block 1606 to obtain another encoded log pair and associated similarity score from the training dataset. On the other hand, when the decision at decision block 1612 is "NO," at block 1614, a processor aggregates (e.g., totals, averages, and/or the like) the metric(s) determined in block 1610 for the encoded log pair(s) in the training dataset. The metric is associated with a current configuration of the model that generated the pair of inference results in block 1607 for each encoded log pair included in the training dataset.

Then, at decision block 1616, a processor decides whether to modify the model. The decision at decision block 1616 is "YES," when the processor decides to modify the model. Otherwise, the decision at decision block 1616 is "NO." When the decision at decision block 1616 is "YES," a processor modifies the model at block 1618 then returns to block 1606 to begin processing each encoded log pair included in the training dataset with the modified model. When the decision at decision block 1616 is "NO," at block 1620, a processor selects a model configuration (e.g., weight values, parameter values, and/or other settings) for which the aggregated metric determined in block 1614 indicates a desired amount of similarity between the similarity scores and the similarity losses (e.g., a greatest amount of similarity). In at least one embodiment, process 1600 terminates after block 1620. After the process 1600 is performed, the model may be deployed (e.g., as neural network(s) NN1, neural network(s) NN2, encoder 1512, log event classification model 1006, and/or the like) and used to encode one or more encoded log. For example, the processor performing the process 1600 may use back-propagation to update one or more neural network weights of the model and subsequently use the model to perform one or more inference operations.

A processor performing process 1600 fine-tunes an encoder to encode log lines. The model may be a language model (e.g., an LLM) that was pre-trained on the task of semantic similarity, and process 1600 may be used to fine-tuning the model using pair(s) of log lines each assigned a similarity score based, at least in part, on using domain knowledge, language, or by explicit labeling. Process 1600 may utilize domain knowledge with a relatively low manual effort (e.g., partial labeling is enough to generate many pairs) and may better capture the semantic meaning of log messages. Since the encoding is trained in a general purpose manner it can be used for various downstream log analysis tasks.

Process 1600 includes training to fine-tune one or more language models (e.g., encoders) to capture the semantic meaning of one or more log events, which may do so in a task generic manner that may include minimal labeling effort. Process 1600 may generate a resulting encoding to be used for multiple log analysis tasks and with models which are not data hungry. Process 1600 may train one or more log analysis models to learn to encode log lines as part of a specific downstream task (e.g. anomaly detection), such as in a task agnostic pre-training framework of assigning pairs of log lines with a similarity score (based on domain expert assumptions or explicitly) and fine-tuning a language model with a semantic similarity task.

In at least one embodiment, some or all of process 1600 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program includes a plurality of computer-readable instructions executable by one or more processors. In at least one embodiment, a computer-readable storage medium is a non-transitory computer-readable medium. In at least one embodiment, at least some computer-readable instructions usable to perform process 1600 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 1600 is performed at least in part on a computer system such as those described elsewhere in this disclosure. In at least one embodiment, logic (e.g., hardware, software, or a combination of hardware and software) performs process 1600.

In at least one embodiment, one or more processors uses process 1600, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, as an example, a machine readable medium (e.g., non-transitory) having stored thereon a set of instructions, which if performed by one or more processors, cause one or more processors to perform process 1600, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

In at least one embodiment, process 1600 is included in, and/or otherwise includes processes illustrated in FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, one or more systems illustrated in FIGS. 1-17B and/or 23 perform process 1600, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, one or more hardware illustrated in FIGS. 17-22 use process 1600, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

In the following description, numerous specific details are set forth to provide a more thorough understanding of at least one embodiment. However, it will be apparent to one skilled in the art that the inventive concepts may be practiced without one or more of these specific details.

Figure 17A:
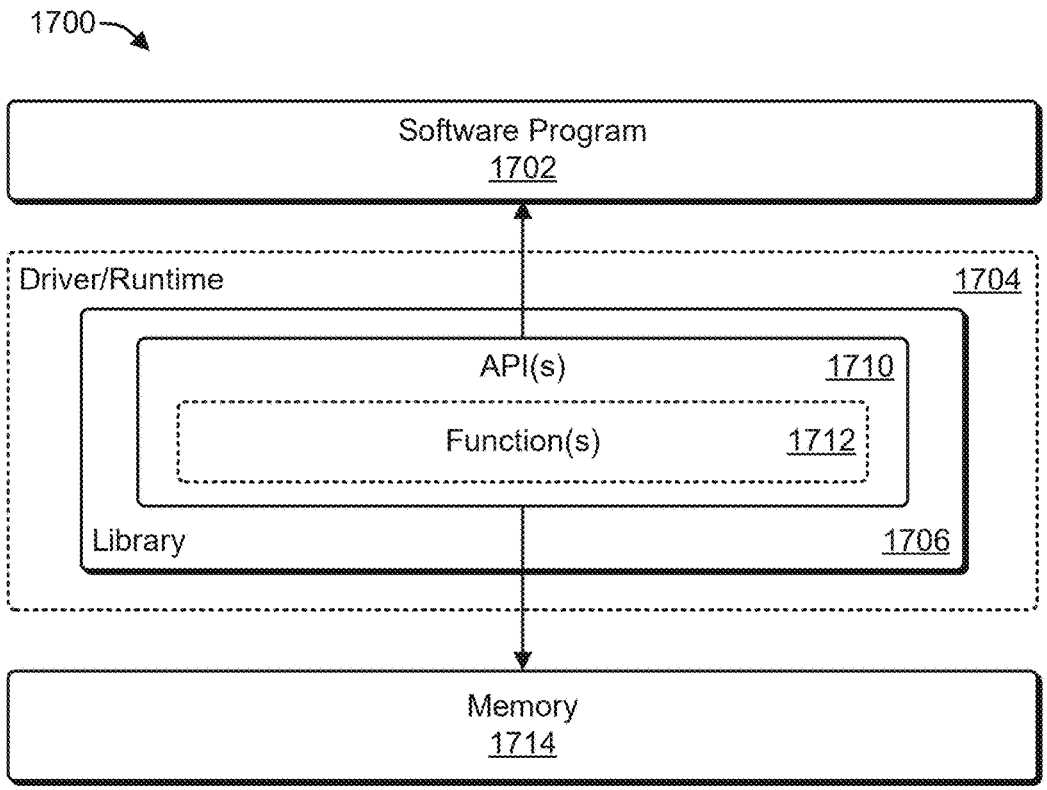
FIG. 17A illustrates an example of a system that includes a driver and/or runtime including one or more libraries to provide one or more application programming interfaces (APIs), in accordance with at least one embodiment.

FIG. 17A illustrates an example of a system 1700 that includes one or more drivers and/or one or more runtimes (illustrated as reference numeral 1704) including one or more libraries 1706 to provide one or more application programming interfaces ("API(s)") 1710, in accordance with at least one embodiment. In at least one embodiment, the system 1700 includes the driver(s) 1704 and/or the runtime(s) 1704 including the library(ies) 1706 to provide to the API(s) 1710. In at least one embodiment, the API(s) 1710 is/are sets of software instructions that, if executed, cause one or more processors (e.g., processor(s) 1722 illustrated in FIG. 17B) to perform one or more computational operations. In at least one embodiment, one or more of the API(s) 1710 is/are distributed or otherwise provided as a part of one or more of the library(ies) 1706, one or more of the runtime(s) 1704, one or more of the driver(s) 1704, and/or one or more component of any other grouping of software and/or executable code further described herein. In at least one embodiment, one or more of the API(s) 1710 perform one or more computational operations in response to invocation by one or more software programs 1702.

In at least one embodiment, one or more of the software program(s) 1702 is/are a software module and/or include(s) one or more software modules. In at least one embodiment, a software module is as further illustrated non-exclusively in FIG. 17B as one or more modules 1724-1730 and described with respect thereto. In at least one embodiment, one or more of the software program(s) 1702 is/are a collection of software code, commands, instructions, and/or other sequences of text to instruct a computing device (e.g., to perform a neural network to encode and/or classify a log message) to perform one or more computational operations and/or invoke one or more other sets of instructions, such as the API(s) 1710 or API function(s) 1712, to be executed by the computing device. In at least one embodiment, functionality provided by one or more of the API(s) 1710 includes the API function(s) 1712, such as those usable to accelerate one or more portions of the software program(s) 1702 using one or more parallel processing units (PPUs), such as graphics processing units (GPUs).

In at least one embodiment, one or more of the API(s) 1710 is/are one or more hardware interfaces to one or more circuits to perform one or more computational operations. In at least one embodiment, one or more of the API(s) 1710 described herein are implemented as one or more circuits to perform one or more techniques described in connection with FIGS. 1-16. In at least one embodiment, one or more of the software program(s) 1702 include instructions that, if executed, cause one or more hardware devices and/or circuits to perform one or more techniques further described in connection with FIGS. 1-16. In at least one embodiment, the system 1700 includes one or more or all components of the system 100 described in relation to FIG. 1, and the system 1700 may perform one or more or all of the processes and/or operations that the systems and components of the system 100 perform. In at least one embodiment, the system 1700 includes one or more or all components of the system 200 described in relation to FIG. 2, and the system 1700 may perform one or more or all of the processes and/or operations that the systems and components of the system 200 perform. In at least one embodiment, the system 1700 includes one or more or all components of the system 500 described in relation to FIG. 5, and the system 1700 may perform one or more or all of the processes and/or operations that the systems and components of the system 500 perform. In at least one embodiment, the system 1700 includes one or more or all components of the system 1000 described in relation to FIG. 10, and the system 1700 may perform one or more or all of the processes and/or operations that the systems and components of the system 1000 perform. In at least one embodiment, the system 1700 includes one or more or all components of the system 1400 described in relation to FIG. 14, and the system 1700 may perform one or more or all of the processes and/or operations that the systems and components of the system 1400 perform.

In at least one embodiment, the software program(s) 1702, such as user-implemented software programs, utilize one or more of the API(s) 1710 to perform various computing operations, such as memory reservation, matrix multiplication, arithmetic operations, and/or any computing operation performed by PPUs, such as GPUs, as further described herein. In at least one embodiment, the function(s) 1712 include a set of callable functions provided by one or more of the API(s) 1710 that are referred to herein as APIs, API functions, software functions, and/or functions, that individually perform one or more computing operations, such as computing operations related to parallel computing. In at least one embodiment, one or more of the API(s) 1710 cause a neural network to encode and/or classify a log message, and/or perform other operations described herein (e.g., in connection with FIGS. 1-16).

Figure 17B:
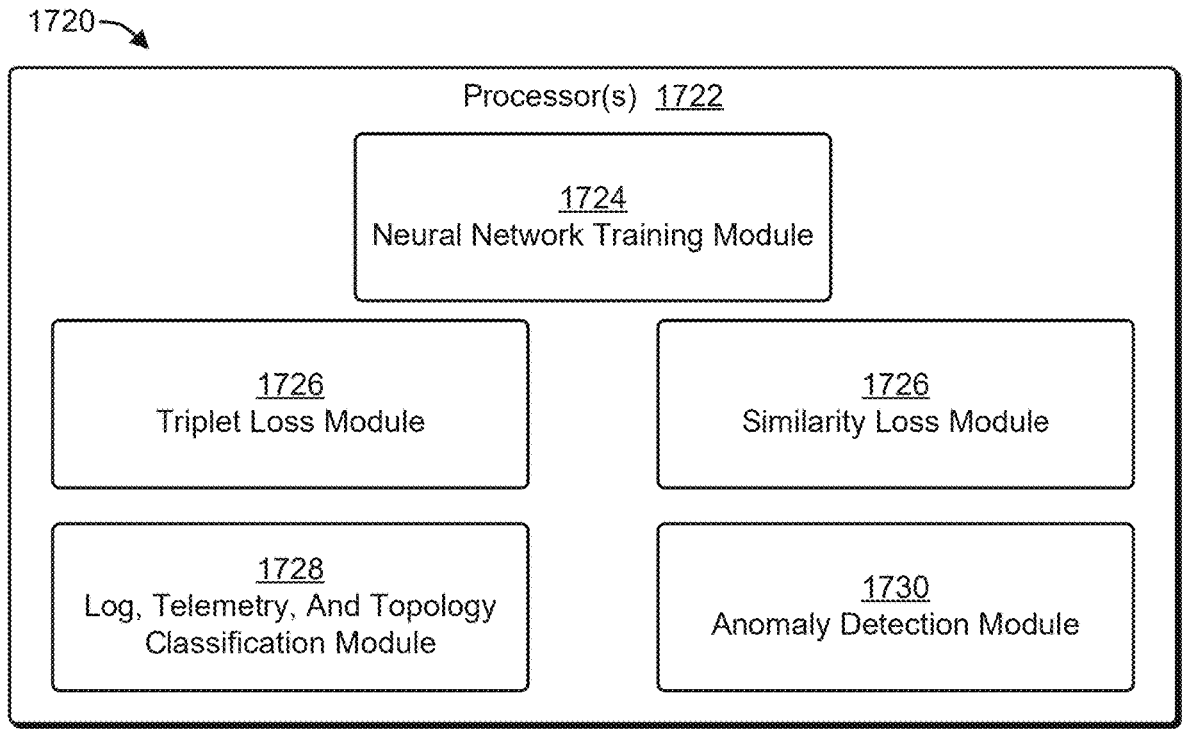
FIG. 17B is block diagram illustrating an example of a processor and modules, according to at least one embodiment.

In at least one embodiment, one or more of the software program(s) 1702 interact or otherwise communicate with one or more of the API(s) 1710 to perform one or more computing operations using one or more processors (e.g., processor(s) 1722 illustrated in FIG. 17B), such as one or more PPUs, such as GPUs. In at least one embodiment, one or more computing operations using one or more PPUs include at least one or more groups of computing operations to be accelerated by execution at least in part by said one or more PPUs. In at least one embodiment, one or more of the software program(s) 1702 interact with one or more of the API(s) 1710 to cause a neural network to encode and/or classify a log message, and/or perform other operations described herein (e.g., in connection with FIGS. 1-16).

In at least one embodiment, an interface is software instructions that, if executed, provide access to one or more of the function(s) 1712 provided by one or more of the API(s) 1710. In at least one embodiment, one or more of the software program(s) 1702 use(s) a local interface when a software developer compiles one or more of the software program(s) 1702 in conjunction with one or more of the library(ies) 1706 including or otherwise providing access to one or more of the API(s) 1710. In at least one embodiment, one or more of the software program(s) 1702 is/are compiled statically in conjunction with one or more pre-compiled ones of the library(ies) 1706 and/or uncompiled source code including instructions to perform one or more of the API(s) 1710. In at least one embodiment, one or more of the software program(s) 1702 are compiled dynamically and the dynamically compiled software program(s) utilize a linker to link to one or more pre-compiled ones of the library(ies) 1706, including one or more of the API(s) 1710.

In at least one embodiment, one or more of the software program(s) 1702 use(s) a remote interface when a software developer executes a software program that utilizes or otherwise communicates with at least one of the library(ies) 1706 including one or more of the API(s) 1710 over a network or other remote communication medium. In at least one embodiment, one or more of the library(ies) 1706 including one or more of the API(s) 1710 are to be performed by a remote computing service, such as a computing resource services provider. In at least one embodiment, one or more of the library(ies) 1706 including one or more particular APIs (of the API(s) 1710) is/are to be performed by any other computing host providing the particular API(s) to one or more of the software program(s) 1702.

In at least one embodiment, a processor (e.g., processor(s) 1722 illustrated in FIG. 17B) performing or using one or more particular ones of the software program(s) 1702 calls, uses, performs, and/or otherwise implements one or more of the API(s) 1710 to allocate and otherwise manage memory 1714 to be used by the particular software program(s). In at least one embodiment, one or more particular ones of the software program(s) 1702 utilize one or more of the API(s) 1710 to allocate and otherwise manage the memory 1714 to be used by one or more portions of the particular software program(s) to be accelerated using one or more PPUs, such as GPUs, or any other accelerator or processor further described herein. In at least one embodiment, one or more of the software program(s) 1702 request one or more neural networks to perform signal processing using one or more of the function(s) 1712 provided by one or more of the API(s)

1710. In at least one embodiment, a processor implementing memory to perform one or more operations to encode and/or classify one or more loge messages in connection with FIGS. 1-16 includes memory 1714.

In at least one embodiment, one or more of the API(s) 1710 is an API to facilitate parallel computing. In at least one embodiment, one or more of the API(s) 1710 is any other API further described herein. In at least one embodiment, one or more of the API(s) 1710 is/are provided by one or more of the driver(s) 1704 and/or one or more of the runtime(s) 1704. In at least one embodiment, one or more of the API(s) 1710 is/are provided by a CUDA user-mode driver. In at least one embodiment, one or more of the API(s) 1710 is/are provided by a CUDA runtime. In at least one embodiment, one or more of the driver(s) 1704 is/are data values and software instructions that, if executed, perform and/or otherwise facilitate operation of one or more of the function(s) 1712 of one or more of the API(s) 1710 during load and execution of one or more portions of at least one of the software program(s) 1702. In at least one embodiment, one or more of the runtime(s) 1704 is/are data values and/or software instructions that, if executed, perform or otherwise facilitate operation of one or more of the function(s) 1712 of one or more of the API(s) 1710 during execution of at least one of the software program(s) 1702. In at least one embodiment, one or more particular ones of the software program(s) 1702 utilize one or more of the API(s) 1710 implemented and/or otherwise provided by one or more of the driver(s) 1704 and/or one or more of the runtime(s) 1704 to perform combined arithmetic operations by the particular software program(s) during execution by one or more PPUs, such as GPUs.

In at least one embodiment, one or more of the software program(s) 1702 utilize one or more of the API(s) 1710 provided by one or more of the driver(s) 1704 and/or one or more of the runtime(s) 1704 to perform combined arithmetic operations of one or more PPUs, such as GPUs. In at least one embodiment, one or more of the API(s) 1710 provide combined arithmetic operations through one or more of the driver(s) 1704 and/or one or more of the runtime(s) 1704, as described above. In at least one embodiment, one or more of the software program(s) 1702 utilize one or more of the API(s) 1710 provided by one or more of the driver(s) 1704 and/or one or more of the runtime(s) 1704 to allocate or otherwise reserve one or more blocks of the memory 1714 of one or more PPUs, such as GPUs. In at least one embodiment, one or more of the software program(s) 1702 utilize one or more of the API(s) 1710 provided by one or more of the driver(s) 1704 and/or one or more of the runtime(s) 1704 to allocate or otherwise reserve blocks of the memory 1714.

In at least one embodiment, to improve usability of one or more particular ones of the software program(s) 1702 and/or improve performance, one or more portions of the particular software programs are to be accelerated by one or more PPUs (such as GPUs). In at least one embodiment, one or more of the function(s) 1712 receive one or more input parameters indicating one or more inputs to one or more neural networks and/or other data to be utilized by the neural network(s), such as one or more hyperparameters of the neural network(s). In at least one embodiment, the input parameter(s) include the one or more inputs and/or the other data. In at least one embodiment, the input parameter(s) include one or more pointers to one or more memory locations where the input(s) and/or the other data is/are stored.

In at least one embodiment, the system 1700 includes at least one processor (e.g., processor(s) 1722 illustrated in FIG. 17B) including one or more circuits to perform one or more software programs to combine two or more of the API(s) 1710 into a single API. In at least one embodiment, the system 1700 includes at least one processor (e.g., processor(s) 1722 illustrated in FIG. 17B) that uses one or more of the API(s) 1710 to cause a neural network to encode and/or classify one or more log messages, and/or otherwise perform operations described herein. In at least one embodiment, the system 1700 includes at least one processor (e.g., processor(s) 1722 illustrated in FIG. 17B) that uses one or more of the API(s) 1710 to perform one or more operations illustrated in and/or described with respect to one or more of FIGS. 1-16, such as any one or more processes illustrated in FIGS. 4, 9, 11-13, and/or 16 or portion(s) thereof. In at least one embodiment, the system 1700 includes at least one processor (e.g., processor(s) 1722 illustrated in FIG. 17B) to perform one or more of the function(s) 1712, such as those described in connection with FIGS. 1-16. In at least one embodiment, one or more of the API(s) 1710 is to be performed by hardware described in connection with FIGS. 18-22.

FIG. 17B is block diagram 1720 illustrating example processor(s) 1722 and the module(s) 1724-1730, according to at least one embodiment. Referring to FIG. 17B, in at least one embodiment, the processor(s) 1722 may be implemented by the processor(s) 110, 502, 602, 1406, and/or 1506 (see FIGS. 1, 5, 6, 14, and/or 15). In at least one embodiment, the processor(s) 1722 may perform one or more processes such as those described herein with respect to perform a neural network to encode and/or classify one or more log messages, and/or may otherwise perform operations described herein. In at least one embodiment, the processor(s) 1722 perform(s) one or more processes such as those described in connection with FIGS. 4, 9, 1-13, and/or 16.

In at least one embodiment, the processor(s) 1722 include one or more processors such as those described in connection with FIGS. 18-22. In at least one embodiment, processor(s) 1722 may be any suitable processing unit and/or combination of processing units, such as one or more CPUs, GPUs, DPUs, GPGPUs, PPUs, and/or variations thereof. The processor(s) 1722 includes the module(s) 1724-1730, which may include neural network training module 1724 (e.g., neural network training module 504); triplet loss module 1726; similarity loss module 1726; log, telemetry, and topology classification module 1728, and anomaly detection module 1730. The module(s) 1724-1730 may be distributed among multiple processors that communicate over a bus, network, by writing to shared memory, and/or any suitable communication process such as those described herein. In at least one embodiment, the module(s) 1724-1730 may include processor executable instructions that implement to train a neural network to encode and/or classify one or more log messages and/or otherwise perform operations described herein.

As used in any implementation described herein, unless otherwise clear from context or stated explicitly to contrary, a module refers to any combination of software logic, firmware logic, hardware logic, and/or circuitry configured to provide functionality described herein. Software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. Modules may, collectively or individually, be embodied as circuitry that forms part of a larger system, for example, an integrated circuit (IC), system on-chip (SoC), and so forth. a module performs one or more processes in connection with any suitable processing unit and/or combination of processing units, such as one or more CPUs, GPUs, GPGPUs, DPUs, PPUs, and/or variations thereof.

In at least one embodiment, as used in any implementation described herein, unless otherwise clear from context or stated explicitly to contrary, terms such as "module" and nominalized verbs (e.g., image manager, image analyzer, analytics engine, controller, and/or other terms) each refers to any combination of software logic, firmware logic, hardware logic, and/or circuitry configured to provide functionality described herein. In at least one embodiment, software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

In at least one embodiment, one or more systems depicted in FIG. 17A-B are utilized to encode and/or classify one or more logs with various algorithms, formulas, and processes such as those described in connection with FIG. 1 and/or otherwise perform operations described herein. In at least one embodiment, one or more systems depicted in FIG. 17A-B are utilized to implement one or more systems and/or processes such as those described in connection with FIGS. 1-17B AND/OR 23 to encode and/or classify one or more logs and/or otherwise perform operations described herein. As an example, one or more systems depicted in FIG. 17A-B are utilized to implement one or more systems and/or processes such as those described in connection with FIGS. 1-17B AND/OR 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 17A-B are utilized to implement one or more systems and/or processes such as those described in connection with FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 17A-B are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 17A-B are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Logic

Figure 18A:
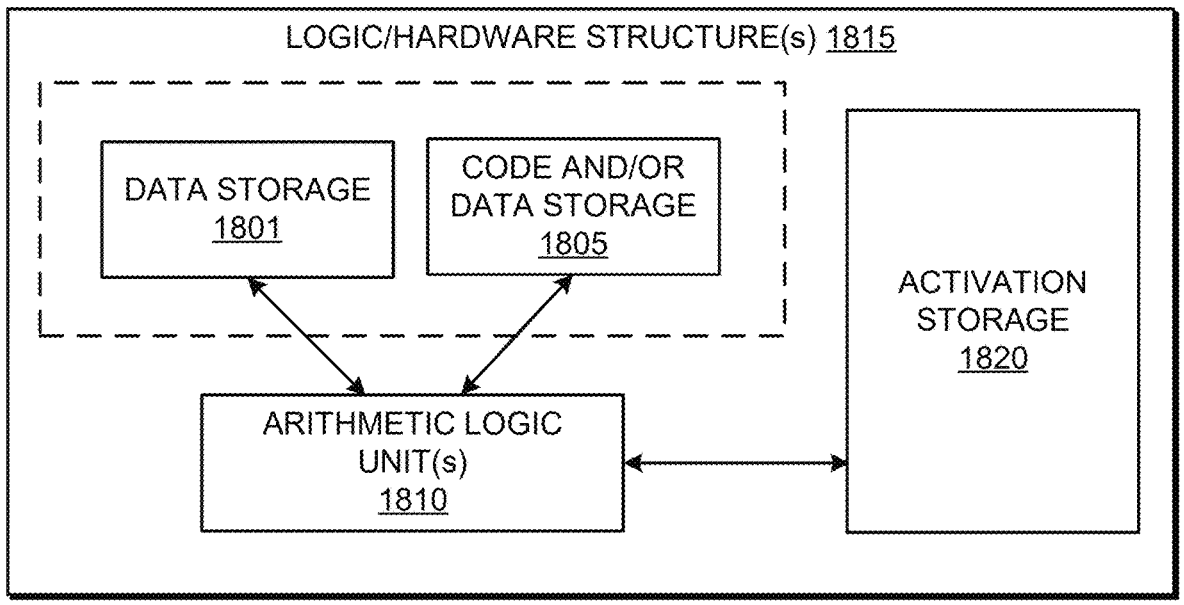
FIG. 18A illustrates logic, according to at least one embodiment.

FIG. 18A illustrates logic 1815 which, as described elsewhere herein, can be used in one or more devices to perform operations such as those discussed herein in accordance with at least one embodiment. In at least one embodiment, logic 1815 is used to perform inferencing and/or training operations associated with one or more embodiments. In at least one embodiment, logic 1815 is inference and/or training logic. Details regarding logic 1815 are provided below in conjunction with FIGS. 18A and/or 18B. In at least one embodiment, logic refers to any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

In at least one embodiment, logic 1815 may include, without limitation, code and/or data storage 1801 to store forward and/or output weight and/or input/output data, and/or other parameters to configure neurons or layers of a neural network trained and/or used for inferencing in aspects of one or more embodiments. In at least one embodiment, logic 1815 may include, or be coupled to code and/or data storage 1801 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 1801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1801 may be included with other on-chip or off-chip data storage, including a processor's L1, L2, or L3 cache or system memory.

In at least one embodiment, any portion of code and/or data storage 1801 may be internal or external to one or more processors or other hardware logic devices or circuits. In at least one embodiment, code and/or code and/or data storage 1801 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1801 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, logic 1815 may include, without limitation, a code and/or data storage 1805 to store backward and/or output weight and/or input/output data corresponding to neurons or layers of a neural network trained and/or used for inferencing in aspects of one or more embodiments. In at least one embodiment, code and/or data storage 1805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, logic 1815 may include, or be coupled to code and/or data storage 1805 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 1805 may be included with other on-chip or off-chip data storage, including a processor's L1, L2, or L3 cache or system memory. In at least one embodiment, any portion of code and/or data storage 1805 may be internal or external to one or more processors or other hardware logic devices or circuits. In at least one embodiment, code and/or data storage 1805 may be cache memory, DRAM, SRAM, non-volatile memory (e.g., flash memory), or other storage. In at least one embodiment, a choice of whether code and/or data storage 1805 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1801 and code and/or data storage 1805 may be separate storage structures. In at least one embodiment, code and/or data storage 1801 and code and/or data storage 1805 may be a combined storage structure. In at least one embodiment, code and/or data storage 1801 and code and/or data storage 1805 may be partially combined and partially separate. In at least one embodiment, any portion of code and/or data storage 1801 and code and/or data storage 1805 may be included with other on-chip or off-chip data storage, including a processor's L1, L2, or L3 cache or system memory.

In at least one embodiment, logic 1815 may include, without limitation, one or more arithmetic logic unit(s) ("ALU(s)") 1810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1820 that are functions of input/output and/or weight parameter data stored in code and/or data storage 1801 and/or code and/or data storage 1805. In at least one embodiment, activations stored in activation storage 1820 are generated according to linear algebraic and or matrix-based mathematics performed by ALU(s) 1810 in response to performing instructions or other code, wherein weight values stored in code and/or data storage 1805 and/or data storage 1801 are used as operands along with other values, such as bias values, gradient information, momentum values, or other parameters or hyperparameters, any or all of which may be stored in code and/or data storage 1805 or code and/or data storage 1801 or another storage on or off-chip.

In at least one embodiment, ALU(s) 1810 are included within one or more processors or other hardware logic devices or circuits, whereas in another embodiment, ALU(s) 1810 may be external to a processor or other hardware logic device or circuit that uses them (e.g., a coprocessor). In at least one embodiment, ALUs 1810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1801, code and/or data storage 1805, and activation storage 1820 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1820 may be cache memory, DRAM, SRAM, non-volatile memory (e.g., flash memory), or other storage. In at least one embodiment, activation storage 1820 may be completely or partially within or external to one or more processors or other logical circuits. In at least one embodiment, a choice of whether activation storage 1820 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, logic 1815 illustrated in FIG. 18A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, logic 1815 illustrated in FIG. 18A may be used in conjunction with central processing unit ("CPU") hardware, graphics processing unit ("GPU") hardware or other hardware, such as field programmable gate arrays ("FPGAs").

In at least one embodiment, one or more systems depicted in FIG. 18A are utilized to encode and/or classify one or more logs with various algorithms, formulas, and processes such as those described in connection with FIG. 1 and/or otherwise perform operations described herein. In at least one embodiment, one or more systems depicted in FIG. 18A are utilized to implement one or more systems and/or processes such as those described in connection with FIGS. 1-17B AND/OR 23 to encode and/or classify one or more logs and/or otherwise perform operations described herein. As an example, one or more systems depicted in FIG. 18A are utilized to implement one or more systems and/or processes such as those described in connection with FIGS. 1-17B AND/OR 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 18A are utilized to implement one or more systems and/or processes such as those described in connection with FIGS. 1-17B AND/OR 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 18A are utilized to implement one or more systems and/or processes such as those described in connection with FIGS. 1-17B AND/OR 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 18A are utilized to implement one or more systems and/or processes such as those described in connection with FIGS. 1-17B AND/OR 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Figure 18B:
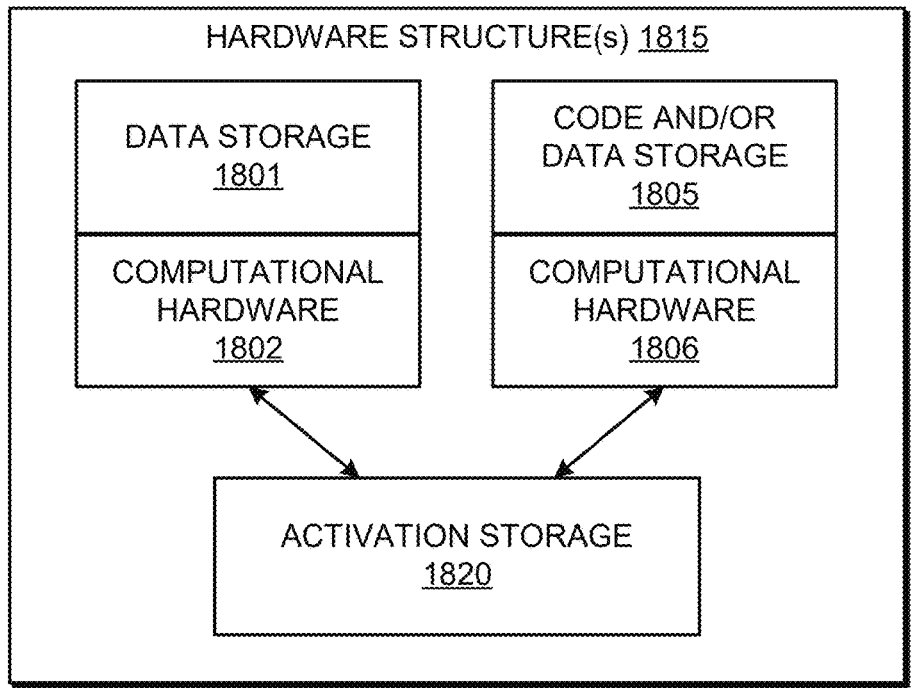
FIG. 18B illustrates logic, according to at least one embodiment.

FIG. 18B illustrates logic 1815, according to at least one embodiment. In at least one embodiment, logic 1815 is inference and/or training logic. In at least one embodiment, logic 1815 may include, without limitation, hardware logic in which computational resources are dedicated or otherwise exclusively used in conjunction with weight values or other information corresponding to one or more layers of neurons within a neural network. In at least one embodiment, logic 1815 illustrated in FIG. 18B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, logic 1815 illustrated in FIG. 18B may be used in conjunction with central processing unit (CPU) hardware, graphics processing unit (GPU) hardware or other hardware, such as field programmable gate arrays (FPGAs). In at least one embodiment, logic 1815 includes, without limitation, code and/or data storage 1801 and code and/or data storage 1805, which may be used to store code (e.g., graph code), weight values and/or other information, including bias values, gradient information, momentum values, and/or other parameter or hyperparameter information. In at least one embodiment illustrated in FIG. 18B, each of code and/or data storage 1801 and code and/or data storage 1805 is associated with a dedicated computational resource, such as computational hardware 1802 and computational hardware 1806, respectively. In at least one embodiment, each of computational hardware 1802 and computational hardware 1806 includes one or more ALUs that perform mathematical functions, such as linear algebraic functions, only on information stored in code and/or data storage 1801 and code and/or data storage 1805, respectively, result of which is stored in activation storage 1820.

In at least one embodiment, each of code and/or data storage 1801 and 1805 and corresponding computational hardware 1802 and 1806, respectively, correspond to different layers of a neural network, such that resulting activation from one storage/computational pair 1801/1802 of code and/or data storage 1801 and computational hardware 1802 is provided as an input to a next storage/computational pair 1805/1806 of code and/or data storage 1805 and computational hardware 1806, in order to mirror a conceptual organization of a neural network. In at least one embodiment, each of storage/computational pairs 1801/1802 and 1805/1806 may correspond to more than one neural network layer. In at least one embodiment, additional storage/computation pairs (not shown) subsequent to or in parallel with storage/computation pairs 1801/1802 and 1805/1806 may be included in logic 1815.

In at least one embodiment, one or more systems depicted in FIG. 18B are utilized to encode and/or classify one or more logs with various algorithms, formulas, and processes such as those described in connection with FIG. 1 and/or otherwise perform operations described herein. In at least one embodiment, one or more systems depicted in FIG. 18B are utilized to implement one or more systems and/or processes such as those described in connection with FIGS. 1-17B and/or 23 to encode and/or classify one or more logs and/or otherwise perform operations described herein. As an example, one or more systems depicted in FIG. 18B are utilized to implement one or more systems and/or processes such as those described in connection with FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 18B are utilized to implement one or more systems and/or processes such as those described in connection with FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 18B are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 18B are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Data Center

Figure 19:
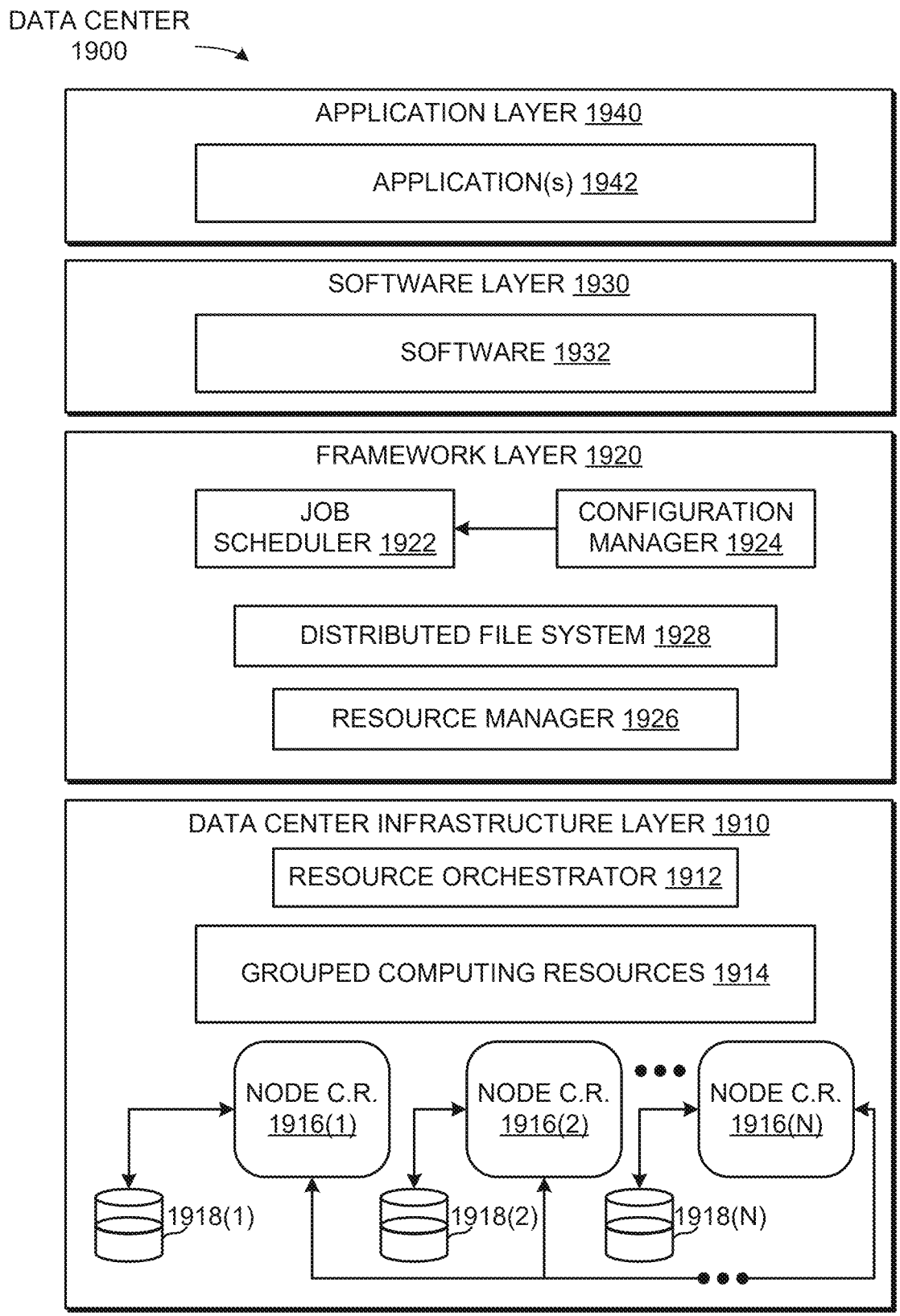
FIG. 19 illustrates an example data center system, according to at least one embodiment.

FIG. 19 illustrates an example data center 1900, in which at least one embodiment may be used. In at least one embodiment, data center 1900 includes a data center infrastructure layer 1910, a framework layer 1920, a software layer 1930 and an application layer 1940.

In at least one embodiment, as shown in FIG. 19, data center infrastructure layer 1910 may include a resource orchestrator 1912, grouped computing resources 1914, and node computing resources ("node C.R.s") 1916(1)-1916(N), where "N" represents a positive integer (which may be a different integer "N" than used in other figures). In at least one embodiment, node C.R.s 1916(1)-1916(N) may include, but are not limited to, any number of central processing units ("CPUs") or other processors (including accelerators, field programmable gate arrays (FPGAs), graphics processors, etc.), memory storage devices 1918(1)-1918(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1916(1)-1916(N) may be a server having one or more of above-mentioned computing resources.

In at least one embodiment, grouped computing resources 1914 may include separate groupings of node C.R.s housed within one or more racks (not shown), or many racks housed in data centers at various geographical locations (also not shown). In at least one embodiment, separate groupings of node C.R.s within grouped computing resources 1914 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 1912 may configure or otherwise control one or more node C.R.s 1916(1)-1916(N) and/or grouped computing resources 1914. In at least one embodiment, resource orchestrator 1912 may include a software design infrastructure ("SDI") management entity for data center 1900. In at least one embodiment, resource orchestrator 1912 may include hardware, software or some combination thereof.

In at least one embodiment, as shown in FIG. 19, framework layer 1920 includes a job scheduler 1922, a configuration manager 1924, a resource manager 1926 and a distributed file system 1928. In at least one embodiment, framework layer 1920 may include a framework to support software 1932 of software layer 1930 and/or one or more application(s) 1942 of application layer 1940. In at least one embodiment, software 1932 or application(s) 1942 may respectively include web-based service software or applications, such as those provided by Amazon Web Services, Google Cloud and Microsoft Azure. In at least one embodiment, framework layer 1920 may be, but is not limited to, a type of free and open-source software web application framework such as Apache Spark™ (hereinafter "Spark") that may utilize distributed file system 1928 for large-scale data processing (e.g., "big data"). In at least one embodiment, job scheduler 1922 may include a Spark driver to facilitate scheduling of workloads supported by various layers of data center 1900. In at least one embodiment, configuration manager 1924 may be capable of configuring different layers such as software layer 1930 and framework layer 1920 including Spark and distributed file system 1928 for supporting large-scale data processing. In at least one embodiment, resource manager 1926 may be capable of managing clustered or grouped computing resources mapped to or allocated for support of distributed file system 1928 and job scheduler 1922. In at least one embodiment, clustered or grouped computing resources may include grouped computing resources 1914 at data center infrastructure layer 1910. In at least one embodiment, resource manager 1926 may coordinate with resource orchestrator 1912 to manage these mapped or allocated computing resources.

In at least one embodiment, software 1932 included in software layer 1930 may include software used by at least portions of node C.R.s 1916(1)-1916(N), grouped computing resources 1914, and/or distributed file system 1928 of framework layer 1920. In at least one embodiment, one or more types of software may include, but are not limited to, Internet web page search software, e-mail virus scan software, database software, and streaming video content software.

In at least one embodiment, application(s) 1942 included in application layer 1940 may include one or more types of applications used by at least portions of node C.R.s 1916(1)-1916(N), grouped computing resources 1914, and/or distributed file system 1928 of framework layer 1920. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1924, resource manager 1926, and resource orchestrator 1912 may implement any number and type of self-modifying actions based on any amount and type of data acquired in any technically feasible fashion. In at least one embodiment, self-modifying actions may relieve a data center operator of data center 1900 from making possibly bad configuration decisions and possibly avoiding underutilized and/or poor performing portions of a data center.

In at least one embodiment, data center 1900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1900. In at least one embodiment, trained machine learning models corresponding to one or more neural networks may be used to infer or predict information using resources described above with respect to data center 1900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Logic 1815 are used to perform inferencing and/or training operations associated with one or more embodiments. Details regarding logic 1815 are provided herein in conjunction with FIGS. 18A and/or 18B. In at least one embodiment, logic 1815 may be used in data center 1900 for inferencing or predicting operations based, at least in part, on weight parameters calculated using neural network training operations, neural network functions and/or architectures, or neural network use cases described herein.

In at least one embodiment, one or more systems depicted in FIG. 19 are utilized to encode and/or classify one or more logs with various algorithms, formulas, and processes such as those described in connection with FIG. 1 and/or otherwise perform operations described herein. In at least one embodiment, one or more systems depicted in FIG. 19 are utilized to implement one or more systems and/or processes such as those described in connection with FIGS. 1-17B and/or 23 to encode and/or classify one or more logs and/or otherwise perform operations described herein. As an example, one or more systems depicted in FIG. 19 are utilized to implement one or more systems and/or processes such as those described in connection with FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 19 are utilized to implement one or more systems and/or processes such as those described in connection with FIGS. 1-17B AND/OR 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 19 are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 19 are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Computer Systems

Figure 20:
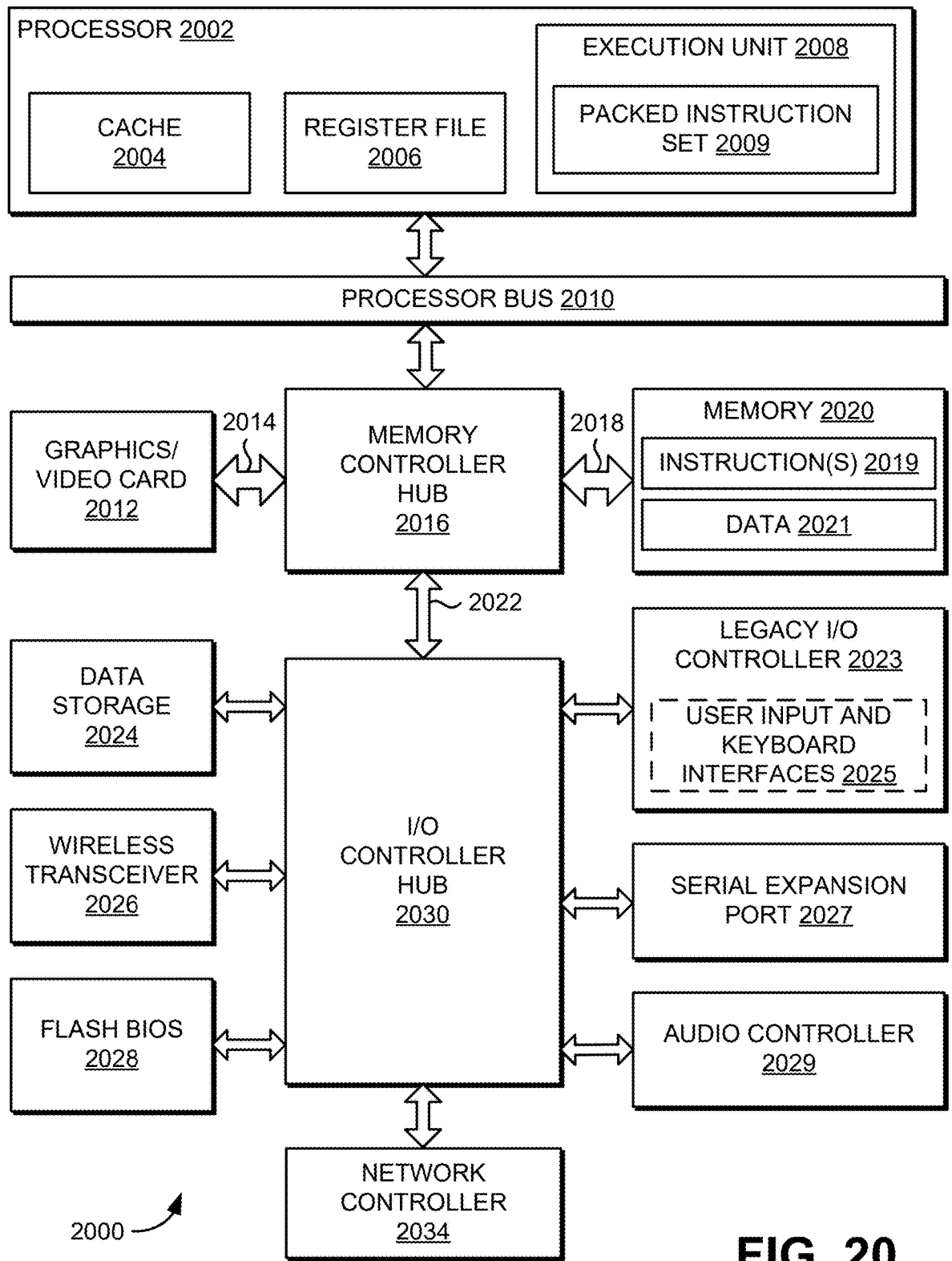
FIG. 20 is a block diagram illustrating a computer system, according to at least one embodiment.

FIG. 20 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 2000 may include, without limitation, a component, such as a processor 2002 to employ execution units including logic to perform algorithms for process data, in accordance with present disclosure, such as in embodiment described herein. In at least one embodiment, computer system 2000 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2000 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2000 may include, without limitation, processor 2002 that may include, without limitation, one or more execution units 2008 to perform machine learning model training and/or inferencing according to techniques described herein. In at least one embodiment, computer system 2000 is a single processor desktop or server system, but in another embodiment, computer system 2000 may be a multiprocessor system. In at least one embodiment, processor 2002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2002 may be coupled to a processor bus 2010 that may transmit data signals between processor 2002 and other components in computer system 2000.

In at least one embodiment, processor 2002 may include, without limitation, a Level 1 ("L1") internal cache memory ("cache") 2004. In at least one embodiment, processor 2002 may have a single internal cache or multiple levels of internal cache. In at least one embodiment, cache memory may reside external to processor 2002. Other embodiments may also include a combination of both internal and external caches depending on particular implementation and needs. In at least one embodiment, a register file 2006 may store different types of data in various registers including, without limitation, integer registers, floating point registers, status registers, and an instruction pointer register.

In at least one embodiment, execution unit 2008, including, without limitation, logic to perform integer and floating point operations, also resides in processor 2002. In at least one embodiment, processor 2002 may also include a microcode ("ucode") read only memory ("ROM") that stores microcode for certain macro instructions. In at least one embodiment, execution unit 2008 may include logic to handle a packed instruction set 2009. In at least one embodiment, by including packed instruction set 2009 in an instruction set of a general-purpose processor, along with associated circuitry to execute instructions, operations used by many multimedia applications may be performed using packed data in processor 2002. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 2008 may also be used in microcontrollers, embedded processors, graphics devices, DSPs, and other types of logic circuits. In at least one embodiment, computer system 2000 may include, without limitation, a memory 2020. In at least one embodiment, memory 2020 may be a Dynamic Random Access Memory ("DRAM") device, a Static Random Access Memory ("SRAM") device, a flash memory device, or another memory device. In at least one embodiment, memory 2020 may store instruction(s) 2019 and/or data 2021 represented by data signals that may be executed by processor 2002.

In at least one embodiment, a system logic chip may be coupled to processor bus 2010 and memory 2020. In at least one embodiment, a system logic chip may include, without limitation, a memory controller hub ("MCH") 2016, and processor 2002 may communicate with MCH 2016 via processor bus 2010. In at least one embodiment, MCH 2016 may provide a high bandwidth memory path 2018 to memory 2020 for instruction and data storage and for storage of graphics commands, data and textures. In at least one embodiment, MCH 2016 may direct data signals between processor 2002, memory 2020, and other components in computer system 2000 and to bridge data signals between processor bus 2010, memory 2020, and a system I/O interface 2022. In at least one embodiment, a system logic chip may provide a graphics port for coupling to a graphics controller. In at least one embodiment, MCH 2016 may be coupled to memory 2020 through high bandwidth memory path 2018 and a graphics/video card 2012 may be coupled to MCH 2016 through an Accelerated Graphics Port ("AGP") interconnect 2014.

In at least one embodiment, computer system 2000 may use system I/O interface 2022 as a proprietary hub interface bus to couple MCH 2016 to an I/O controller hub ("ICH") 2030. In at least one embodiment, ICH 2030 may provide direct connections to some I/O devices via a local I/O bus. In at least one embodiment, a local I/O bus may include, without limitation, a high-speed I/O bus for connecting peripherals to memory 2020, a chipset, and processor 2002. Examples may include, without limitation, an audio controller 2029, a firmware hub ("flash BIOS") 2028, a wireless transceiver 2026, a data storage 2024, a legacy I/O controller 2023 containing user input and keyboard interfaces 2025, a serial expansion port 2027, such as a Universal Serial Bus ("USB") port, and a network controller 2034. In at least one embodiment, data storage 2024 may include a hard disk drive, a floppy disk drive, a CD-ROM device, a flash memory device, or other mass storage device.

In at least one embodiment, FIG. 20 illustrates a system, which includes interconnected hardware devices or "chips", whereas in other embodiments, FIG. 20 may illustrate an exemplary SoC. In at least one embodiment, devices illustrated in FIG. 20 may be interconnected with proprietary interconnects, standardized interconnects (e.g., PCIe) or some combination thereof. In at least one embodiment, one or more components of computer system 2000 are interconnected using compute express link (CXL) interconnects.

Logic 1815 are used to perform inferencing and/or training operations associated with one or more embodiments. Details regarding logic 1815 are provided herein in conjunction with FIGS. 18A and/or 18B. In at least one embodiment, logic 1815 may be used in computer system 2000 for inferencing or predicting operations based, at least in part, on weight parameters calculated using neural network training operations, neural network functions and/or architectures, or neural network use cases described herein.

In at least one embodiment, one or more systems depicted in FIG. 20 are utilized to encode and/or classify one or more logs with various algorithms, formulas, and processes such as those described in connection with FIG. 1 and/or otherwise perform operations described herein. In at least one embodiment, one or more systems depicted in FIG. 20 are utilized to implement one or more systems and/or processes such as those described in connection with FIGS. 1-16 to encode and/or classify one or more logs and/or otherwise perform operations described herein. As an example, one or more systems depicted in FIG. 20 are utilized to implement one or more systems and/or processes such as those described in connection with FIGS. 1-16 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein. As an example, one or more systems depicted in FIG. 20 are utilized to implement one or more systems and/or processes such as those described in connection with FIGS. 1-16 to encode at least one log message using a neural network trained, at least in part, by: obtaining a similarity score associated with first and second vectors, the first vector to be associated with one or more first log messages, and the second vector to be associated with one or more second log messages; generating similarity loss between the first vector and the second vector; determining a metric indicating similarity between the similarity score and the similarity loss; and/or otherwise performing operations described herein. As an example, one or more systems depicted in FIG. 20 are utilized to implement one or more systems and/or processes such as those described in connection with FIGS. 1-16 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 20 are utilized to implement one or more systems and/or processes such as those described in connection with FIGS. 1-16 to encode at least one log message, at least in part, by: encoding a first type of information in the at least one log message to obtain a first encoding; encoding a second type of information in the at least one log message to obtain a second encoding; obtaining a resultant encoding at least in part by combining at least the first and second encodings; and/or otherwise performing operations described herein.

In at least one embodiment, one or more systems depicted in FIG. 20 are utilized to encode and/or classify one or more logs with various algorithms, formulas, and processes such as those described in connection with FIG. 1 and/or otherwise perform operations described herein. In at least one embodiment, one or more systems depicted in FIG. 20 are utilized to implement one or more systems and/or processes such as those described in connection with FIGS. 1-17B and/or 23 to encode and/or classify one or more logs and/or otherwise perform operations described herein. As an example, one or more systems depicted in FIG. 20 are utilized to implement one or more systems and/or processes such as those described in connection with FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 20 are utilized to implement one or more systems and/or processes such as those described in connection with FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 20 are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 20 are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Neural Network Training and Deployment

Figure 21:
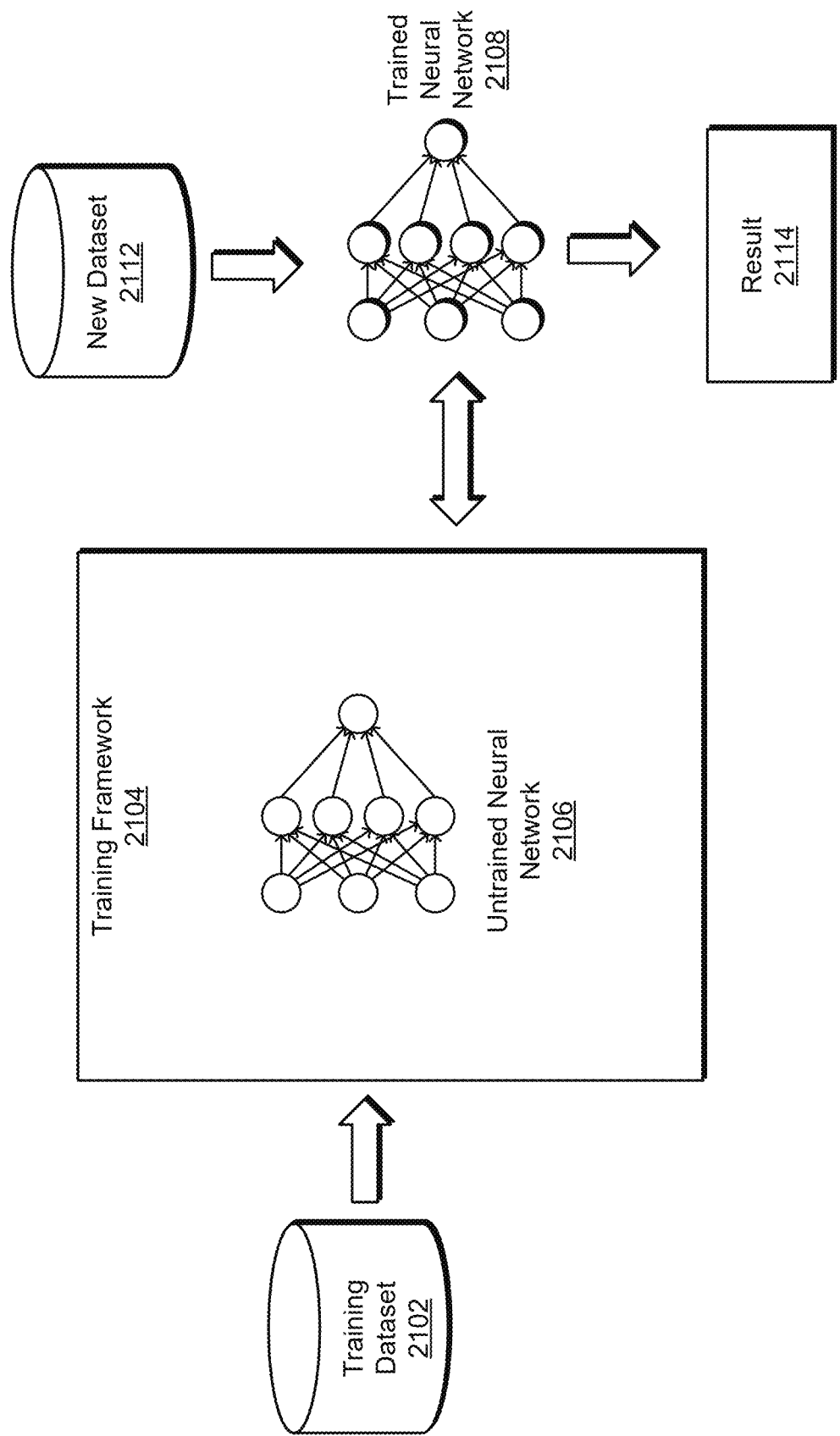
FIG. 21 illustrates training and deployment of a neural network, according to at least one embodiment.

FIG. 21 illustrates training and deployment of a deep neural network, according to at least one embodiment. In at least one embodiment, untrained neural network 2106 is trained using a training dataset 2102. In at least one embodiment, training framework 2104 is a PyTorch framework, whereas in other embodiments, training framework 2104 is a TensorFlow, Boost, Caffe, Microsoft Cognitive Toolkit/CNTK, MXNet, Chainer, Keras, Deeplearning4j, or other training framework. In at least one embodiment, training framework 2104 trains an untrained neural network 2106 and enables it to be trained using processing resources described herein to generate a trained neural network 2108. In at least one embodiment, weights may be chosen randomly or by pre-training using a deep belief network. In at least one embodiment, training may be performed in either a supervised, partially supervised, or unsupervised manner.

In at least one embodiment, untrained neural network 2106 is trained using supervised learning, wherein training dataset 2102 includes an input paired with a desired output for an input, or where training dataset 2102 includes input having a known output and an output of neural network 2106 is manually graded. In at least one embodiment, untrained neural network 2106 is trained in a supervised manner and processes inputs from training dataset 2102 and compares resulting outputs against a set of expected or desired outputs. In at least one embodiment, errors are then propagated back through untrained neural network 2106. In at least one embodiment, training framework 2104 adjusts weights that control untrained neural network 2106. In at least one embodiment, training framework 2104 includes tools to monitor how well untrained neural network 2106 is converging towards a model, such as trained neural network 2108, suitable to generating correct answers, such as in result 2114, based on input data such as a new dataset 2112. In at least one embodiment, training framework 2104 trains untrained neural network 2106 repeatedly while adjusting weights to refine an output of untrained neural network 2106 using a loss function and adjustment algorithm, such as stochastic gradient descent. In at least one embodiment, training framework 2104 trains untrained neural network 2106 until untrained neural network 2106 achieves a desired accuracy. In at least one embodiment, trained neural network 2108 can then be deployed to implement any number of machine learning operations.

In at least one embodiment, untrained neural network 2106 is trained using unsupervised learning, wherein untrained neural network 2106 attempts to train itself using unlabeled data. In at least one embodiment, unsupervised learning training dataset 2102 will include input data without any associated output data or "ground truth" data. In at least one embodiment, untrained neural network 2106 can learn groupings within training dataset 2102 and can determine how individual inputs are related to untrained dataset 2102. In at least one embodiment, unsupervised training can be used to generate a self-organizing map in trained neural network 2108 capable of performing operations useful in reducing dimensionality of new dataset 2112. In at least one embodiment, unsupervised training can also be used to perform anomaly detection, which allows identification of data points in new dataset 2112 that deviate from normal patterns of new dataset 2112.

In at least one embodiment, semi-supervised learning may be used, which is a technique in which in training dataset 2102 includes a mix of labeled and unlabeled data. In at least one embodiment, training framework 2104 may be used to perform incremental learning, such as through transferred learning techniques. In at least one embodiment, incremental learning enables trained neural network 2108 to adapt to new dataset 2112 without forgetting knowledge instilled within trained neural network 2108 during initial training.

In at least one embodiment, training framework 2104 is a framework processed in connection with a software development toolkit such as an OpenVINO (Open Visual Inference and Neural network Optimization) toolkit. In at least one embodiment, an OpenVINO toolkit is a toolkit such as those developed by Intel Corporation of Santa Clara, CA. In at least one embodiment, OpenVINO comprises logic 1815 or uses logic 1815 to perform operations described herein. In at least one embodiment, an SoC, integrated circuit, or processor uses OpenVINO to perform operations described herein.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV, OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, OpenVINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, OpenVINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO includes various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

In at least one embodiment, one or more systems depicted in FIG. 21 are utilized to encode and/or classify one or more logs with various algorithms, formulas, and processes such as those described in connection with FIG. 1 and/or otherwise perform operations described herein. In at least one embodiment, one or more systems depicted in FIG. 21 are utilized to implement one or more systems and/or processes such as those described in connection with FIGS. 1-17B and/or 23 to encode and/or classify one or more logs and/or otherwise perform operations described herein. As an example, one or more systems depicted in FIG. 21 are utilized to implement one or more systems and/or processes such as those described in connection with FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 21 are utilized to implement one or more systems and/or processes such as those described in connection with FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 21 are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 21 are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Figure 22:
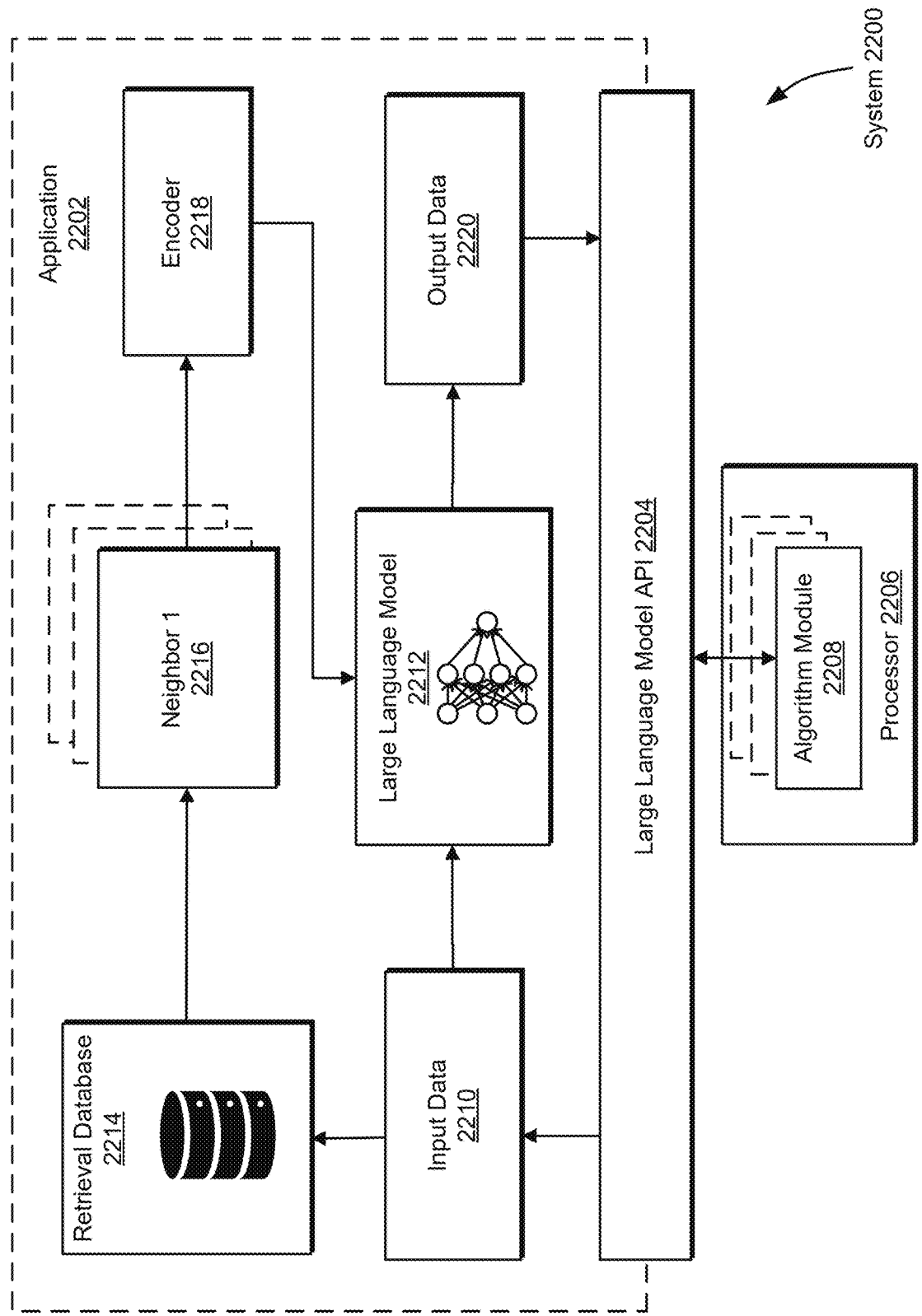
FIG. 22 illustrates components of a system to access a large language model, according to at least one embodiment.

FIG. 22 is a system diagram illustrating system 2200 for interfacing with an application 2202 to process data, according to at least one embodiment. In at least one embodiment, application 2202 uses large language model (LLM) 2212 to generate output data 2220 based, at least in part, on input data 2210. In at least one embodiment, input data 2210 is a text prompt. In at least one embodiment, input data 2210 includes unstructured text. In at least one embodiment, input data 2210 includes a sequence of tokens. In at least one embodiment, a token is a portion of input data. In at least one embodiment, a token is a word. In at least one embodiment, a token is a character. In at least one embodiment, a token is a subword. In at least one embodiment, input data 2210 is formatted in Chat Markup Language (ChatML). In at least one embodiment, input data 2210 is an image. In at least one embodiment, input data 2210 is one or more video frames. In at least one embodiment, input data 2210 is any other expressive medium.

In at least one embodiment, large language model 2212 comprises a deep neural network. In at least one embodiment, a deep neural network is a neural network with two or more layers. In at least one embodiment, large language model 2212 comprises a transformer model. In at least one embodiment, large language model 2212 comprises a neural network configured to perform natural language processing. In at least one embodiment, large language model 2212 is configured to process one or more sequences of data. In at least one embodiment, large language model 2212 is configured to process text. In at least one embodiment, weights and biases of a large language model 2212 are configured to process text. In at least one embodiment, large language model 2212 is configured to determine patterns in data to perform one or more natural language processing tasks. In at least one embodiment, a natural language processing task comprises text generation. In at least one embodiment, a natural language processing task comprises question answering. In at least one embodiment, performing a natural language processing task results in output data 2220.

In at least one embodiment, a processor uses input data 2210 to query retrieval database 2214. In at least one embodiment, retrieval database 2214 is a key-value store. In at least one embodiment, retrieval database 2214 is a corpus used to train large language model 2212. In at least one embodiment, a processor uses retrieval database 2214 to provide large language model 2212 with updated information. In at least one embodiment, retrieval database 2214 comprises data from an internet source. In at least one embodiment, large language model 2212 does not use retrieval database 2214 to perform inferencing.

In at least one embodiment, an encoder encodes input data 2210 into one or more feature vectors. In at least one embodiment, an encoder encodes input data 2210 into a sentence embedding vector. In at least one embodiment, a processor uses said sentencing embedding vector to perform a nearest neighbor search to generate one or more neighbors 2216. In at least one embodiment, one or more neighbors 2216 is value in retrieval database 2214 corresponding to a key comprising input data 2210. In at least one embodiment, one or more neighbors 2216 comprise text data. In at least one embodiment, encoder 2218 encodes one or more neighbors 2216. In at least one embodiment, encoder 2218 encodes one or more neighbors 2216 into a text embedding vector. In at least one embodiment, encoder 2218 encodes one or more neighbors 2216 into a sentence embedding vector. In at least one embodiment, large language model 2216 uses input data 2210 and data generated by encoder 2218 to generate output data 2220. In at least one embodiment, processor 2206 interfaces with application 2202 using large language model (LLM) application programming interface(s) (API(s)) 2204. In at least one embodiment, processor 2206 accesses large language model 2216 using large language model (LLM) application programming interface(s) (API(s)) 2204.

In at least one embodiment, output data 2220 comprise computer instructions. In at least one embodiment, output data 2220 comprise instructions written in CUDA programming language. In at least one embodiment, output data 2220 comprise instructions to be performed by processor 2206. In at least one embodiment, output data 2220 comprise instructions to control execution of one or more algorithm modules 2208. In at least one embodiment, one or more algorithm modules 2208 comprise, for example, one or more neural networks to perform pattern recognition. In at least one embodiment, one or more algorithm modules 2208 comprise, for example, one or more neural networks to perform frame generation. In at least one embodiment, one or more algorithm modules 2208 comprise, for example, one or more neural networks to generate a drive path. In at least one embodiment, one or more algorithm modules 2208 comprise, for example, one or more neural networks to generate a 5G signal. In at least one embodiment, processor 2206 interfaces with application 2202 using large language model (LLM) application programming interface(s) (API (s)) 2204. In at least one embodiment, processor 2206 may use one or more parallel computing platforms and/or programming models (e.g., NVIDIA's CUDA model).

In at least one embodiment, aspects of systems and techniques described herein in relation to FIG. 22 are incorporated into aspects of preceding figure(s). For example, in at least one embodiment, an apparatus depicted in preceding figure(s) includes processor 2206.

For example, in at least one embodiment, system 2200 uses ChatGPT to write CUDA code. For example, in at least one embodiment, system 2200 uses ChatGPT to train an object classification neural network. For example, in at least one embodiment, system 2200 uses ChatGPT and a neural network to identify a driving path. For example, in at least one embodiment, system 2200 uses ChatGPT and a neural network to generate a 5G signal.

Logic 1815 are used to perform inferencing and/or training operations associated with one or more embodiments. Details regarding logic 1815 are provided herein in conjunction with FIGS. 18A and/or 18B. In at least one embodiment, logic 1815 may be used in system 2200 for inferencing or predicting operations based, at least in part, on weight parameters calculated using neural network training operations, neural network functions and/or architectures, or neural network use cases described herein.

In at least one embodiment, one or more systems depicted in FIG. 22 are utilized to encode and/or classify one or more logs with various algorithms, formulas, and processes such as those described in connection with FIG. 1 and/or otherwise perform operations described herein. In at least one embodiment, one or more systems depicted in FIG. 22 are utilized to implement one or more systems and/or processes such as those described in connection with FIGS. 1-17B and/or 23 to encode and/or classify one or more logs and/or otherwise perform operations described herein. As an example, one or more systems depicted in FIG. 22 are utilized to implement one or more systems and/or processes such as those described in connection with FIGS. 1-17B and/or 23 to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing one or more operations described herein.

As an example, one or more systems depicted in FIG. 22 are utilized to implement one or more systems and/or processes such as those described in connection with FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. As an example, one or more systems depicted in FIG. 22 are utilized to implement one or more systems and/or processes such as those described in connection with FIGS. 1-17B and/or 23 to classify one or more log entries to obtain one or more classified log entries; to obtain combined information at least in part by combing at least the one or more classified log entries and telemetry information; to use at least one machine learning process to classify the combined information; and/or otherwise to perform operations described herein. As an example, one or more systems depicted in FIG. 22 are utilized to implement one or more systems and/or processes such as those described in connection with FIGS. 1-17B and/or 23 to encode at least one log message, at least in part, by: encoding a first type of information in the at least one log message to obtain a first encoding; encoding a second type of information in the at least one log message to obtain a second encoding; obtaining a resultant encoding at least in part by combing at least the first and second encodings; and/or otherwise performing operations described herein.

Figure 23:
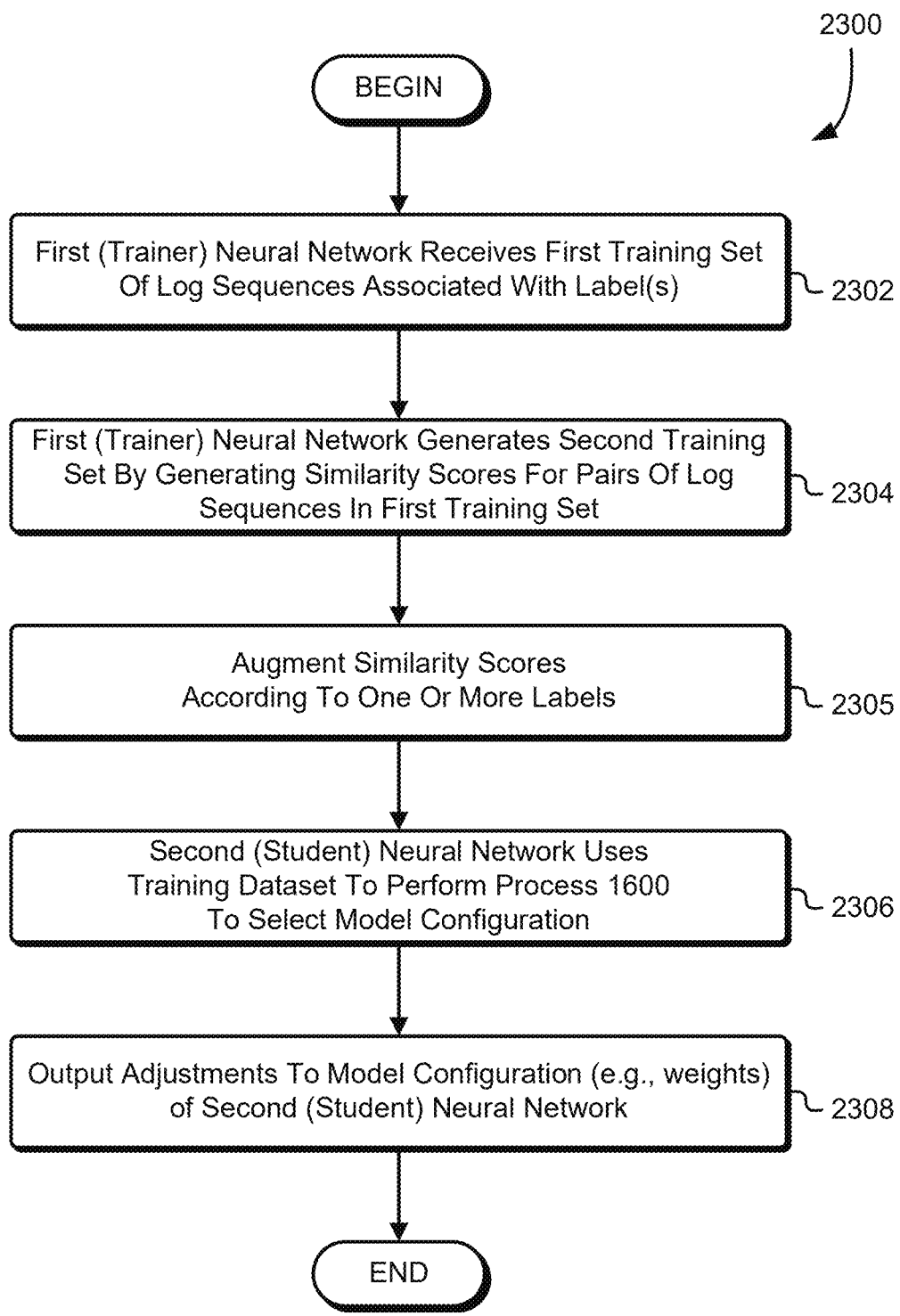
FIG. 23 is a flow diagram illustrating a process of training a second neural network to encode a log sequence based, at least in part, on a first neural network, in accordance with at least one embodiment.

FIG. 23 is a flow diagram illustrating a process 2300 of training a second neural network to encode a log sequence based, at least in part, on a first neural network, in accordance with at least one embodiment. Processor(s) 110 may perform the process 2300 to train a transformer encoder (e.g., one or more of the neural network(s) NN1, one or more of the neural network(s) NN2, and/or one or more of the classifier(s) 122). For example, the encoder functionality 115 and/or the classification functionality 116 may perform the process 2300. In at least one embodiment, process 2300 is performed by the system 600 (see FIG. 6) to train a second (student) neural network (e.g., neural network 608) based, at least in part, on a neural network (e.g., first (trainer) neural network) trained using similarity loss (e.g., encoder 1408, see FIG. 14).

In at least one embodiment, a processor performing the process 2300 trains one or more second (e.g., student) neural networks (e.g., machine learning model 604, see FIG. 6) based, at least in part, on one or more first neural networks (e.g., trainer and/or encoder 1408, see FIG. 14), such as to perform anomaly detection. As an example, one or more second neural networks may be referred to as one or more student neural networks. As another example, one or more first neural networks may be referred to as one or more trainer neural networks. Referring to FIG. 23, processor(s) performing process 2300 may cause one or more first (e.g., trainer) neural networks to receive or obtain a first training dataset including one or more first training sets of one or more log sequences associated with one or more labels at block 2302, cause the first (e.g., trainer) neural network to generate a second training dataset including one or more second training sets by generating one or more similarity scores for one or more pairs of the log sequences in the first training set in block 2304, cause the similarity score(s) to be augmented according to the label(s) in block 2305, cause one or more second (e.g., student) neural networks to use the second training set to perform process 1600 (see FIG. 16) to select a model configuration in block 2306, output, if appropriate, an adjustment to one or more model configurations (e.g., weights) of the second (e.g., student) neural network(s) in block 2308, and/or perform one or more operations described herein, or combinations thereof.

In at least one embodiment, to begin, one or more processors (e.g., processor 602, see FIG. 6) invoke(s) the process 2300 and/or receives or obtains a first training set (e.g., dataset) of one or more log sequences and associated labels as input. Process 2300 includes receiving one or more log sequences and associated labels as input in block 2302, which may include an anomaly classification label (e.g., 1 or 0) for each log sequence. An anomaly classification label may include a value indicating whether a log sequence includes an anomaly, such as a value of "1" of if the log sequence includes an anomaly, or a value of "0" otherwise. The first training dataset received or obtained as input in block 2302 may include one or more log sequences, one or more log line pairs 1504A (see FIG. 15), and/or one or more labels indicating ground truth information (e.g., an anomaly indication label of "1" if an anomaly is present, and label of "O" otherwise). As an example, a processor performing process 2300 may receive one or more log sequences (e.g., to generate, or otherwise sort, as log sequence pairs) and one or more associated (e.g., corresponding) labels, such as one or more ground truth labels (e.g., anomaly indications), as input in block 2302.

In at least one embodiment, the first (e.g., trainer) neural network receives one or more log sequences (e.g., to generate a second training set of similarity scores associated with one or more log sequence pairs, in block 2304) and associated labels, such as ground truth labels, in block 2302. One or more first (e.g., trainer) neural networks may include one or more encoders 1408 (see FIG. 14) trained using similarity loss. As an example, one or more first (e.g., trainer) neural networks may generate one or more second training sets to include one or more similarity scores for one or more pairs of log sequences in the first training set in block 2304. As an example, each of the similarity scores generated in block 2304 may be a similarity label, such as a value indicative of the similarity between the log sequence in the pair.

The first training set may include information identifying training pairs within the first training set and/or two or more log sequences received as input in block 2302 may be formed or arranged into training pairs in block 2304. The processor(s) performing the process 2300 may perform a selection process that selects one or more training pairs. In at least one embodiment, one or more first (e.g., trainer) neural networks generates the similarity label (e.g., similarity score) for each log sequence pairs identified. As an example, for each pair, the first (e.g., trainer) neural network(s) may calculate a similarity value, such as cosine similarity. Then, the processor(s) performing the process 2300 may augment (e.g., adjust) the similarity value in block 2305 to obtain the similarity score using a hyper-parameter alpha, and the ground truth anomaly label (e.g., "1" indicating an anomaly or otherwise "0"). The processor(s) performing the process 2300 and/or the first (e.g., trainer) neural network may augment one or more similarity scores according to one or more labels in block 2305.

For example, the first (e.g., trainer) neural network(s) may include a language model (e.g., an LLM) and each sequence may be transformed into raw text (e.g., using a preprocessing process described herein) and passed through the language model to produce a pair of encodings. The language model may be pre-trained to determine sentence and/or paragraph similarity. Then, the processor(s) performing the process 2300 may use a pair of encodings to generate a preliminary similarity score, which the processor(s) may adjust using alpha. As an example, if the two log sequences are associated with the same classification (e.g., ground truth labels indicate an anomaly classification of both '1' or both '0'), the processor(s) may use the preliminary similarity score as the similarity score in the second training set (e.g., as a label) if the preliminary similarity score is greater than alpha, or otherwise the processor(s) may set the similarity score in the second training set equal to alpha. If the two log sequence are associated with different classifications indicated by the ground truth labels (e.g., one is anomalous and the other one is not anomalous), the processor(s) performing the process 2300 may use the preliminary similarity score as the similarity score in the second training set (e.g., as the label) if the preliminary similarity score is less than one minus alpha (e.g., preliminary similarity score <(1-alpha)) or otherwise the processor(s) may set the similarity score in the second training set equal to alpha. In an exemplary implementation, alpha is selected based, at least in part, on ablations, such as alpha=0.7.

In at least one embodiment, process 2300 may include converting one or more labels of one or more log sequences into a similarity score (e.g., score of 1 if the label is "1," and a score of −1 if the label is "0"). As an example, converting one or more labels of one or more log sequences into a similarity score may be used in combination with or in substitution of blocks 2302, 2304, and 2305. For example, instead of performing blocks 2302-2305, processor(s) performing the process 2300 may receive the first training dataset, which includes one or more log sequences associated with one or more labels. Then, the processor(s) performing the process 2300 may select one or more pairs of log sequences as described herein and generate the second training dataset, which includes the pair(s) of the log sequences each associated with a similarity score. For each pair, the similarity score may be generated by mapping each of the labels to a similarity score. For example, the processor(s) may assign a similarity score of "1" to a log sequence associated with a label indicating an anomaly is present (e.g., assigned a label of "1") and may assign a similarity score of "−1" to a log sequence associated with a label indicating an anomaly is not present (e.g., assigned a label of "0"). Then, the similarity scores may be combined (e.g., averaged) for each of the pairs. For example, two log sequences would sum to "1" if they both have anomalies ((1+1)/2=1), they would sum to zero if only one of the log sequences has an anomaly ((1+−1)/2=0), and they would sum to "−1" if both log sequences do not have anomalies ((−1+−1)/2=−1). Thus, this mapping may be used to convert the labels to a cosine similarity score.

A second (e.g., student) neural network may use the second training set to perform process 1600 to select one or more model configurations in block 2306. As an example, selecting a model configuration in block 2306 may include using the second (e.g., student) neural network to infer encodings for the log sequences of each pair in the second training set, determining a similarity value (e.g., cosine similarity) between the encodings inferred for each pairs, using a loss function (e.g., mean squared error) to calculate a loss value between the similarity value and the similarity score (in the second training set) for each pair, aggregating loss calculated for the pairs, and selecting a model configuration (e.g., model weights) that reduce or minimize the aggregated loss. As an example, a processor performing process 2300 may use a forward pass of the student model (e.g., a second neural network) to compute the cosine similarity between respective encodings of a log sequence pair, and compare that cosine similarity to a cosine similarity label (or similarity score) generated by a trainer model (e.g., a first neural network) based, at least in part, on mean squared error (MSE) loss between the cosine similarity determined by the student model and a cosine similarity label determined by the trainer model (and included in the second training set). The processor(s) performing process 2300 may aggregate (e.g., total, average, etc.) the MSE loss calculated for the pairs in the second training set to obtain a total MSE loss for a current configuration of the second (student) neural network. The processor(s) performing process 2300 may cause the first (student) neural network(s) to process the second training set a number of time using different model configurations (e.g., different weights). Then, the processor performing process 2300 may select the model configuration that produced a minimum total MSE loss for the log sequence pairs in the second training set.

As an example, the second (e.g., student) neural network may receive one or more second training sets (e.g., log sequence pairs and one or more similarity scores) as input, such as one or more similarity scores generated by the first neural network. In at least one embodiment, once processor(s) performing process 2300 performs process 1600 to select a model configuration in block 2306 using the similarity score generated by the first neural network in block 2304, the processor(s) may output adjustments to the model configuration (e.g., weights) of second (student) neural network in block 2308. For example, if the model configuration determined by the process 1600 differs from the current model configuration of the first (student) neural networks, the processor(s) may determine and output adjustments to the model configuration in block 2308. In other words, outputting this information is appropriate. On the other hand, if the model configuration determined by the process 1600 does not differ from the current model configuration of the first (student) neural networks, block 2308 may be omitted. In at least one embodiment, the processor(s) may use the model configuration selected in block 2306 and/or the adjustments output in block 2308 to back-propagate updates to one or more model weights of the second (e.g., student) neural network in block 2308. After block 2308, processor(s) performing process 2300 may perform one or more operations described herein, and/or end.

As an example, the second (e.g., student) neural network may include one or more neural networks 608 (see FIG. 6). A second (e.g., student) neural network trained based, at least in part, using process 2300 may be used to perform one or more inferencing operations. As an example, given a query sequence (e.g., a log sequence), the second (e.g., student) neural network trained using process 2300 may generate one or more encodings (e.g., vector encoding). A processor performing the second (e.g., student) neural network trained using process 2300 may compute a similarity value (e.g., cosine similarity "s") with respect to a mean encoding of the training sequences (e.g., determined using encoding produced by the first (trainer) neural network, using encoding produced by the second (student) neural network, and/or the ground truth labels).

As an example, a mean encoding may include a vector $v_\mu$ computed by first encoding one or more "normal" training sequences with a trained model (e.g., the first (trainer) neural network and/or the second (student) neural network) and then computing the mean vector (e.g., summing all the vectors into one vector and dividing each element by the number of vectors). In at least one embodiment, a mean encoding may be calculated using the following equation:

$$v_{i,\mu} = \frac{\sum_{j=0}^{N} v_{i,j}}{N}.$$

As an example, in this equation, $v_{i,\mu}$ may be an i-th element of the mean vector $v_\mu$, $v_{i,j}$ is the i-th element of encoding vector $v_j$ (which is an encoding of the j-th normal sequence in the training set computed by the trained model), and N is a number of total normal sequences in a generated training dataset (e.g., the second training dataset).

As an example, processor(s) performing the second (student) neural network may classify a sequence as anomalous if (1−RELU)>alpha, and may classify a sequence as not anomalous if (1−RELU)<alpha, where RELU refers to Rectified Linear Unit(s). In at least one embodiment, the second (e.g., student) neural network trained based, at least in part, using process 2300 may learn even with a small number of anomalies (e.g., 100) in a training set, such as without mode collapse and achieving a desired performance (e.g., measured by F1 score). In addition, the second (e.g., student) neural network may not assume a fixed vocabulary (e.g., though embodiments may include use of a vocabulary) or rely on template extraction, which could introduce errors and/or impact model performance.

In at least one embodiment, some or all of process 2300 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 2300 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 2300 is performed at least in part on a computer system such as those described elsewhere in this disclosure. In at least one embodiment, logic (e.g., hardware, software, or a combination of hardware and software) performs process 2300.

In at least one embodiment, one or more processors uses process 2300, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, one or more processors uses process 900, such as to encode at least one vector associated with at least one log sequence using a neural network trained, at least in part, by: obtaining first, second, and third encoded vectors by encoding a first vector associated with a first log sequence, a second vector associated with a second log sequence similar to the first log sequence, and a third vector associated with a third log sequence dissimilar from the first log sequence; selecting at least one model weight that increases a likelihood that the first encoded vector is closer to the second encoded vector than the third encoded vector; and/or otherwise performing operations described herein.

In at least one embodiment, one or more processors uses process 2300, such as to classify one or more log entries to obtain one or more classified log entries; to obtain combined information at least in part by combing at least the one or more classified log entries and telemetry information; to use at least one machine learning process to classify the combined information; and/or is to otherwise perform operations described herein. In at least one embodiment, as an example, a machine readable medium (e.g., non-transitory) having stored thereon a set of instructions, which if performed by one or more processors, cause one or more processors to perform process 2300, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

In at least one embodiment, process 2300 is included in, and/or otherwise includes processes illustrated in FIGS. 1-17B and/or 23 to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, one or more systems illustrated in FIGS. 1-17B and/or 23 perform process 2300, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein. In at least one embodiment, one or more hardware illustrated in FIGS. 17-22 use process 2300, such as to encode at least one log message using at least one neural network trained, at least in part, by: obtaining a similarity score associated with a first vector and a second vectors, the first vector to be associated with one or more first log messages, and the second vector to be associated with one or more second log messages; generating at least one similarity value indicating similarity loss between the first vector and the second vector; determining a metric indicating similarity between the similarity score and the at least one similarity loss value; and/or otherwise performing operations described herein.

At least one embodiment of the disclosure can be described in view of the following clauses:

Clause 1. A method comprising:
  encoding at least one vector associated with at least one log sequence using at least one neural network trained, at least in part, by:
  obtaining first, second, and third encoded vectors by encoding a first vector associated with a first log sequence, a second vector associated with a second log sequence similar to the first log sequence, and a third vector associated with a third log sequence dissimilar from the first log sequence; and
  selecting at least one model weight that increases a likelihood that the first encoded vector is closer to the second encoded vector than the third encoded vector.

Clause 2. The method of clause 1, wherein the first encoded vector is closer to the second encoded vector than the third encoded vector if a latent space distance between the first encoded vector and the second encoded vector is less than a latent space distance between the first encoded vector and the third encoded vector.

Clause 3. The method of clause 1 or 2, further comprising:
  creating the second and third log sequences by modifying the first log sequence.

Clause 4. The method of any of clauses 1-3, wherein the second log sequence is more semantically similar to the first log sequence than the third log sequence.

Clause 5. The method of any of clauses 1-4, wherein the at least one model weight is selected using a loss function that increases a likelihood that the second encoded vector and the third encoded vector are separated from one another by at least a margin distance.

Clause 6. The method of any of clauses 1-5, wherein the at least one neural network comprises at least one transformer encoder.

Clause 7. The method of any of clauses 1-6, further comprising:
  generating the second log sequence to be similar to the first log sequence; and
  generating the third log sequence to be dissimilar from the first log sequence.

Clause 8. A processor comprising:
  one or more circuits to encode at least one vector associated with at least one log sequence using at least one neural network trained, at least in part, by:
  obtaining first, second, and third encoded vectors by encoding a first vector associated with a first log sequence, a second vector associated with a second log sequence similar to the first log sequence, and a third vector associated with a third log sequence dissimilar from the first log sequence; and
  selecting at least one model weight that increases a likelihood that the first encoded vector is closer to the second encoded vector than the third encoded vector.

Clause 9. The processor of clause 8, wherein the first encoded vector is closer to the second encoded vector than the third encoded vector if a latent space distance between the first encoded vector and the second encoded vector is less than a latent space distance between the first encoded vector and the third encoded vector.

Clause 10. The processor of clause 8 or 9, wherein the at least one neural network is to be trained, at least in part, by:
  generating the second and third log sequences by modifying the first log sequence.

Clause 11. The processor of any of clauses 8-10, wherein the second log sequence is to be more semantically similar to the first log sequence than the third log sequence.

Clause 12. The processor of any of clauses 8-11, wherein the at least one model weight is selected using a loss function that increases a likelihood that the second encoded vector and the third encoded vector are separated from one another by at least a margin distance.

Clause 13. The processor of any of clauses 8-12, wherein the at least one neural network comprises at least one transformer encoder.

Clause 14. The processor of any of clauses 8-13, wherein the at least one neural network is to be trained, at least in part, by:
  generating the second log sequence to be similar to the first log sequence; and
  generating the third log sequence to be dissimilar from the first log sequence.

Clause 15. A system comprising:
  one or more processors to encode at least one vector associated with at least one log sequence using at least one neural network trained, at least in part, by:
    obtaining first, second, and third encoded vectors by encoding a first vector associated with a first log sequence, a second vector associated with a second log sequence similar to the first log sequence, and a third vector associated with a third log sequence dissimilar from the first log sequence; and
    selecting at least one model weight that increases a likelihood that the first encoded vector is closer to the second encoded vector than the third encoded vector.

Clause 16. The system of clause 15, wherein the first encoded vector is closer to the second encoded vector than the third encoded vector if a latent space distance between the first encoded vector and the second encoded vector is less than a latent space distance between the first encoded vector and the third encoded vector.

Clause 17. The system of clause 15 or 16, wherein the at least one neural network is to be trained, at least in part, by:
  creating the second and third log sequences by modifying the first log sequence.

Clause 18. The system of any of clauses 15-17, wherein the second log sequence is to be more semantically similar to the first log sequence than the third log sequence.

Clause 19. The system of any of clauses 15-18, wherein the at least one model weight is selected using a loss function that increases a likelihood that the second encoded vector and the third encoded vector are separated from one another by at least a margin distance.

Clause 20. The system of any of clauses 15-19, wherein the at least one neural network comprises at least one transformer encoder.

Clause 21. The system of any of clauses 15-20, wherein the at least one neural network is to be trained, at least in part, by:
  generating the second log sequence to be similar to the first log sequence; and
  generating the third log sequence to be dissimilar from the first log sequence.

At least one embodiment of the disclosure can be described in view of the following clauses:

Clause 1. A method comprising:
  encoding at least one log message using at least one neural network trained, at least in part, by:
    obtaining a similarity score associated with a first vector and a second vector, the first vector to be associated with one or more first log messages, and the second vector to be associated with one or more second log messages;
    generating at least one similarity value indicating similarity between the first vector and the second vector; and
    determining a metric indicating similarity between the similarity score and the at least one similarity value.

Clause 2. The method of clause 1, wherein the similarity score is based, at least in part, on one or more events indicated in the one or more first log messages and the one or more second log messages.

Clause 3. The method of clause 1 or 2, wherein generating the at least one similarity value comprises calculating cosine similarity loss between first vector and the second vector.

Clause 4. The method of any of clauses 1-3, wherein the similarity score is based, at least in part, on semantic similarity between the one or more first log messages and the one or more second log messages.

Clause 5. The method of any of clauses 1-4, further comprising:
  configuring the at least one neural network based at least in part on the metric.

Clause 6. The method of any of clauses 1-5, wherein configuring the at least one neural network comprises selecting, based at least in part on the metric, one or more weights to be used by the at least one neural network.

Clause 7. The method of any of clauses 1-6, wherein the at least one similarity value is generated using a loss function.

Clause 8. The method of any of clauses 1-7, wherein the at least one neural network comprises at least one language encoder.

Clause 9. The method of any of clauses 1-8, wherein encoding the at least one log message produces at least one encoded log message, and the method further comprises: providing the at least one encoded log message to another neural network to detect whether any anomalies are present in the at least one encoded log message.

Clause 10. A processor comprising:
  one or more circuits to encode at least one log message using at least one neural network trained, at least in part, by:
    obtaining a similarity score associated with a first vector and a second vector, the first vector to be associated with one or more first log messages, and the second vector to be associated with one or more second log messages;
    generating at least one similarity value indicating similarity between the first vector and the second vector; and
    determining a metric indicating similarity between the similarity score and the at least one similarity value.

Clause 11. The processor of clause 10, wherein the similarity score is based, at least in part, on one or more events indicated in the one or more first log messages and the one or more second log messages.

Clause 12. The processor of clause 10 or 11, wherein generating the at least one similarity value comprises calculating cosine similarity loss between first vector and the second vector.

Clause 13. The processor of any of clauses 10-12, wherein the similarity score is based, at least in part, on semantic similarity between the one or more first log messages and the one or more second log messages.

Clause 14. The processor of any of clauses 10-13, wherein the one or more circuits are to:
  select at least one model weight based at least in part on the metric.

Clause 15. The processor of any of clauses 10-14, wherein the at least one neural network comprises at least one language encoder.

Clause 16. The processor of any of clauses 10-15, wherein encoding the at least one log message produces at least one encoded log message, and the one or more circuits are to:
provide the at least one encoded log message to another neural network to detect whether any anomalies are present in the at least one encoded log message.

Clause 17. A system comprising:
one or more processors to encode at least one log message using at least one neural network trained, at least in part, by:
obtaining a similarity score associated with a first vector and a second vector, the first vector to be associated with one or more first log messages, and the second vector to be associated with one or more second log messages;
generating at least one similarity value indicating similarity between the first vector and the second vector; and
Clause determining a metric indicating similarity between the similarity score and the at least one similarity value.

Clause 18. The system of clause 17, wherein the similarity score is based, at least in part, on one or more events indicated in the one or more first log messages and the one or more second log messages.

Clause 19. The system of clause 17 or 18, wherein generating the at least one similarity value comprises calculating cosine similarity loss between first vector and the second vector.

Clause 20. The system of any of clauses 17-19, wherein the similarity score is based, at least in part, on semantic similarity between the one or more first log messages and the one or more second log messages.

Clause 21. The system of any of clauses 17-20, wherein the one or more processors are to:
select at least one model weight for use by the at least one neural network based at least in part on the metric.

Clause 22. The system of any of clauses 17-21, wherein encoding the at least one log message produces at least one encoded log message, and the one or more processors are to:
provide the at least one encoded log message to another neural network to detect whether any anomalies are present in the at least one encoded log message.

At least one embodiment of the disclosure can be described in view of the following clauses:

Clause 1. A method comprising:
classifying one or more log entries to obtain one or more classified log entries;
obtaining combined information at least in part by combing at least the one or more classified log entries and telemetry information; and
using at least one machine learning process to classify the combined information.

Clause 2. The method of clause 1, wherein the combined information is obtained at least in part by combing at least topology information, the one or more classified log entries, and the telemetry information.

Clause 3. The method of clause 1 or 2, wherein classifying the combined information includes classifying the one or more classified log entries as one or more anomalies.

Clause 4. The method of any of clauses 1-3, wherein obtaining the combined information comprises:
obtaining a resultant encoding at least in part by combining at least the one or more classified log entries and the telemetry information.

Clause 5. The method of any of clauses 1-4, wherein the resultant encoding includes a vector encoding.

Clause 6. The method of any of clauses 1-5, wherein classifying the one or more log entries to obtain the one or more classified log entries comprises:
classifying the one or more log entries based, at least in part, on similarity between information associated with the one or more log entries and information associated with one or more previously classified log events.

Clause 7. The method of any of clauses 1-6, wherein using the at least one machine learning process to classify the combined information comprises:
classifying a particular classified log entry of the one or more classified log entries as an anomaly; and
analyzing a cause of the particular classified log entry classified as an anomaly.

Clause 8. A processor comprising:
one or more circuits to:
classify one or more log entries to obtain one or more classified log entries;
obtain combined information at least in part by combing at least the one or more classified log entries and telemetry information; and
use at least one machine learning process to classify the combined information.

Clause 9. The processor of clause 8, wherein the combined information is obtained at least in part by combing at least topology information, the one or more classified log entries, and the telemetry information.

Clause 10. The processor of clause 8 or 9, wherein the at least one machine learning process is to classify the combined information into classes indicating whether the combined information comprises one or more anomalies.

Clause 11. The processor of any of clauses 8-10, wherein the one or more circuits are to obtain the combined information by obtaining a resultant encoding based at least in part on a combination of at least the one or more classified log entries and the telemetry information.

Clause 12. The processor of any of clauses 8-11, wherein the resultant encoding includes a vector encoding.

Clause 13. The processor of any of clauses 8-12, wherein the one or more circuits are to classify the one or more log entries based, at least in part, on similarity between information associated with the one or more log entries and information associated with one or more previously classified log events.

Clause 14. The processor of any of clauses 8-13, wherein the at least one machine learning process is to classify the combined information by:
classifying a particular classified log entry of the one or more classified log entries as an anomaly; and
analyzing a cause of the particular classified log entry classified as an anomaly.

Clause 15. A system comprising:
one or more processors to:
classify one or more log entries to obtain one or more classified log entries;
obtain combined information at least in part by combing at least the one or more classified log entries and telemetry information; and
use at least one machine learning process to classify the combined information.

Clause 16. The system of clause 15, wherein the combined information is obtained at least in part by combing at least topology information, the one or more classified log entries, and the telemetry information.

Clause 17. The system of clause 15 or 16, wherein the one or more processors are to classify the combined information into classes indicating whether the combined information comprises one or more anomalies.

Clause 18. The system of any of clauses 15-17, wherein the one or more processors are to obtain the combined information by obtaining a resultant encoding based at least in part on a combination of at least the one or more classified log entries and the telemetry information.

Clause 19. The system of any of clauses 15-18, wherein the resultant encoding includes a vector encoding.

Clause 20. The system of any of clauses 15-19, wherein the one or more processors are to classify the one or more log entries
based, at least in part, on similarity between information associated with the one or more log entries and information associated with one or more previously classified log events.

Clause 21. The system of any of clauses 15-20, wherein the at least one machine learning process is to classify the combined information by:
classifying a particular classified log entry of the one or more classified log entries as an anomaly; and
analyzing a cause of the particular classified log entry classified as an anomaly.

At least one embodiment of the disclosure can be described in view of the following clauses:

Clause 1. A method comprising:
encoding at least one log message, at least in part, by:
encoding a first type of information in the at least one log message to obtain a first encoding;
encoding a second type of information in the at least one log message to obtain a second encoding; and
obtaining a resultant encoding at least in part by combing at least the first and second encodings.

Clause 2. The method of clause 1, wherein the first and second types of information include character information and categorical information.

Clause 3. The method of clause 1 or 2, wherein character information includes at least one of text information or numeric information.

Clause 4. The method of any of clauses 1-3, wherein the categorical information includes a priority associated with the at least one log message.

Clause 5. The method of any of clauses 1-4, wherein the resultant encoding includes a vector encoding.

Clause 6. The method of any of clauses 1-5, further comprising:
encoding a third type of information in the at least one log message to obtain a third encoding, the resultant encoding to be obtained at least in part by combing at least the first, second, and third encodings.

Clause 7. The method of any of clauses 1-6, wherein an attention layer is used to combine at least the first, second, and third encodings.

Clause 8. The method of any of clauses 1-7, wherein at least one neural network is used to encode at least one of the first, second, or third types of information.

Clause 9. The method of any of clauses 1-8, wherein the first and second types of information are text information and categorical information, respectively,
a first neural network comprising a text encoder is to encode the text information, and
a second neural network comprises a categorical encoder is to encode the categorical information.

Clause 10. The method of any of clauses 1-9, further comprises:
using the resultant encoding to perform anomaly detection.

Clause 11. A processor comprising:
one or more circuits to encode at least one log message, at least in part, by:
encoding a first type of information in the at least one log message to obtain a first encoding;
encoding a second type of information in the at least one log message to obtain a second encoding; and
obtaining a resultant encoding at least in part by combing at least the first and second encodings.

Clause 12. The processor of clause 11, wherein the first type of information comprises text information, the second type of information comprises categorical information, a third type of information comprises numerical information, and the one or more circuits are to encode the at least one log message, at least in part, by:
encoding the third type of information in the at least one log message to obtain a third encoding; and
obtaining the resultant encoding at least in part by combing at least the first, second, and third encodings.

Clause 13. The processor of clause 11 or 12, wherein the one or more circuits are to use an attention layer to combine at least the first, second, and third encodings.

Clause 14. The processor of any of clauses 11-13, wherein the one or more circuits are to use at least one neural network to encode at least one of the first, second, or third types of information.

Clause 15. The processor of any of clauses 11-14, wherein the resultant encoding includes a vector encoding.

Clause 16. A system comprising:
one or more processors to encode at least one log message, at least in part, by:
encoding a first type of information in the at least one log message to obtain a first encoding;
encoding a second type of information in the at least one log message to obtain a second encoding; and
obtaining a resultant encoding at least in part by combing at least the first and second encodings.

Clause 17. The system of any of clauses 16, wherein the one or more processors are to encode a third type of information in the at least one log message to obtain a third encoding, obtain the resultant encoding at least in part by combing at least the first, second, and third encodings.

Clause 18. The system of clause 16 or 17, wherein the one or more processors are to use an attention layer to combine at least the first, second, and third encodings.

Clause 19. The system of any of clauses 16-18, wherein the one or more processors are to use at least one neural network to encode at least one of the first, second, or third types of information.

Clause 20. The system of any of clauses 16-19, wherein the one or more processors are to use the resultant encoding to perform anomaly detection.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory and/or secondary storage such as those described herein. Computer programs, if executed by one or more processors, enable at least one system described herein to perform various functions in accordance with at least one embodiment. In at least one embodiment, memory, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of a CPU such as those described herein, a parallel processing system such as those described herein, an integrated circuit capable of at least a portion of capabilities of both the CPU, the parallel processing system, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, a computer system described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. In at least one embodiment, a computer system includes or refers to any devices illustrated in any of the drawings and/or described herein.

In at least one embodiment, a parallel processing system includes, without limitation, a plurality of parallel processing units ("PPUs") and associated memories. In at least one embodiment, PPUs are connected to a host processor or other peripheral devices via an interconnect and a switch or multiplexer. In at least one embodiment, a parallel processing system distributes computational tasks across the PPUs, which can be parallelizable for example, as part of distribution of computational tasks across multiple graphics processing unit ("GPU") thread blocks. In at least one embodiment, memory is shared and accessible (e.g., for read and/or write access) across some or all of the PPUs, although such shared memory may incur performance penalties relative to use of local memory and registers resident to a PPU. In at least one embodiment, operation of the PPUs is synchronized through use of a command such as _syncthreads( ), wherein all threads in a block (e.g., executed across multiple PPUs) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation includes generating one or more machine-executable instructions, operations, or other signals from source code. In at least one embodiment, an API compiled into one or more instructions, operations, or other signals, when performed, causes one or more processors, such as graphics processors, graphics cores, parallel processor, a CPU, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
  encoding at least one log message, at least in part, by:
    using at least one semantic encoder to encode a first type of information in the at least one log message to obtain a first encoding;
    using at least one numerical encoder to encode a second type of information in the at least one log message to obtain a second encoding;
    using at least one categorical encoder to encode a third type of information in the at least one log message to obtain a third encoding; and
    performing an attention layer to assign weights to feature embeddings of the first, second, and third encodings and to generate a resultant encoding by using the weights to combine the feature embeddings.

2. The method of claim 1, further comprising:
  providing the resultant encoding to at least one neural network trained using adversarial learning to generate a first encoding;
  providing the first encoding to at least one classifier to generate a second encoding; and
  combining the second encoding with at least one of topology information or telemetry information.

3. The method of claim 1, further comprising:
  identifying the first, second, and third types of information in the at least one log message before encoding the first, second, and third types of information.

4. The method of claim 1, wherein the third type of information includes a priority associated with the at least one log message.

5. The method of claim 1, wherein the resultant encoding includes a vector encoding.

6. The method of claim 1, wherein the attention layer is to generate the weights using alignment scores generated between a query vector and the first, second, and third encoding.

7. The method of claim 1, further comprising:
  using at least one other encoder to generate one or more encodings based, at least in part, on the resultant encoding and at least one of telemetry information or topology information, and
  using the one or more encodings to perform at least one of anomaly detection, incident prediction, root cause analysis, or observation generation.

8. The method of claim 1, further comprising:
  associating the at least one log message with at least one identifier of at least one network node; and
  using at least one other encoder to generate one or more encodings based, at least in part, on the resultant encoding and the at least one identifier.

9. The method of claim 1, wherein the method is performed by at least one of:
  a first system to perform neural network training operations;
  a second system to perform deep learning operations;
  a third system to generate data;
  a fourth system implemented at least partially in a data center; or
  a fifth system implemented at least partially using cloud computing resources.

10. The method of claim 1, further comprises:
  using the resultant encoding to perform anomaly detection.

11. A processor comprising:
  one or more circuits to encode at least one log message, at least in part, by:
    using at least one semantic encoder to encode a first type of information in the at least one log message to obtain a first encoding;
    using at least one numerical encoder to encode a second type of information in the at least one log message to obtain a second encoding;
    using at least one categorical encoder to encode a third type of information in the at least one log message to obtain a third encoding; and
    performing an attention layer to assign weights to feature embeddings of the first, second, and third encodings and to generate a resultant encoding by using the weights to combine the feature embeddings.

12. The processor of claim 11, wherein the one or more circuits to are to identify the first, second, and third types of information in the at least one log message before encoding the first, second, and third types of information.

13. The processor of claim 11, wherein the one or more circuits are to:
    use at least one neural network to generate one or more encodings based, at least in part, on the resultant encoding and at least one of telemetry information or topology information, and
    use the one or more encodings to perform at least one of anomaly detection, incident prediction, root cause analysis, or observation generation.

14. The processor of claim 11, wherein the one or more circuits are to use at least one neural network to implement at least one of the at least one semantic encoder, the at least one numerical encoder, or the at least one categorical encoder.

15. The processor of claim 11, wherein the resultant encoding includes a vector encoding.

16. A system comprising:
    one or more processors to encode at least one log message, at least in part, by:
    using at least one semantic encoder to encode a first type of information in the at least one log message to obtain a first encoding;
    using at least one numerical encoder to encode a second type of information in the at least one log message to obtain a second encoding;
    using at least one categorical encoder to encode a third type of information in the at least one log message to obtain a third encoding; and
    performing an attention layer to assign weights to feature embeddings of the first, second, and third encodings and to generate a resultant encoding by using the weights to combine the feature embeddings.

17. The system of claim 16, wherein the one or more processors are to:
    use at least one neural network to generate one or more encodings based, at least in part, on the resultant encoding and at least one of telemetry information or topology information, and
    use the one or more encodings to perform at least one of anomaly detection, incident prediction, root cause analysis, or observation generation.

18. The system of claim 16, wherein the one or more processors are to identify the first, second, and third types of information in the at least one log message before encoding the first, second, and third types of information.

19. The system of claim 16, wherein the one or more processors are to use at least one neural network to implement at least one of the at least one semantic encoder, the at least one numerical encoder, or the at least one categorical encoder.

20. The system of claim 16, wherein the one or more processors are to use the resultant encoding to perform anomaly detection.

* * * * *